(12) United States Patent
Tegzes et al.

(10) Patent No.: US 12,315,158 B2
(45) Date of Patent: May 27, 2025

(54) SYSTEM AND METHOD FOR VISUALIZING PLACEMENT OF A MEDICAL TUBE OR LINE

(71) Applicant: GE Precision Healthcare LLC, Wauwatosa, WI (US)

(72) Inventors: Pal Tegzes, Budapest (HU); Zita Herczeg, Szeged (HU); Hongxu Yang, Utrecht (NL); Zoltan Kiss, Budapest (HU); Balazs Peter Cziria, Budapest (HU); Poonam Dalal, Wauwatosa, WI (US); Alec Joseph Baenen, Hartland, WI (US); Gireesha Chinthamani Rao, Pewaukee, WI (US); Beth Ann Heckel, Waukesha, WI (US); Pulak Goswami, Nashville, TN (US); Dennis Wei Zhou, Jamesville, NY (US); Gopal Biligeri Avinash, Concord, CA (US); Lehel Ferenczi, Budapest (HU); Katelyn Rose Nye, Glendale, WI (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 267 days.

(21) Appl. No.: 17/993,612

(22) Filed: Nov. 23, 2022

(65) Prior Publication Data

US 2023/0162355 A1 May 25, 2023

Related U.S. Application Data

(63) Continuation-in-part of application No. 17/951,281, filed on Sep. 23, 2022.
(Continued)

(51) Int. Cl.
*G06T 7/00* (2017.01)
*G06T 7/10* (2017.01)

(52) U.S. Cl.
CPC .............. *G06T 7/0012* (2013.01); *G06T 7/10* (2017.01); *G06T 2207/20081* (2013.01)

(58) Field of Classification Search
CPC ....... G06T 7/0012; G06T 7/10; G06T 7/0016; G06T 2207/20081; G06T 2207/20084;
(Continued)

(56) References Cited

U.S. PATENT DOCUMENTS 7,630,531 B2 * 12/2009 Chui ...................... G16H 30/20
382/128
9,471,973 B2 10/2016 Enzmann et al.
(Continued)

OTHER PUBLICATIONS

"QXR: AI for Detection of Abnormal Findings on a Chest X-Ray," Qure AI | AI to Enable Accessible, Affordable & Timely Care across the Globe, Dec. 27, 2022, https://qure.ai/product/qxr/.
(Continued)

*Primary Examiner* — Prabodh M Dharia
(74) *Attorney, Agent, or Firm* — Fletcher Yoder, P.C.

(57) ABSTRACT

An image processing system is provided. The image processing system includes a display, a processor, and a memory. The memory stores processor-executable code that when executed by the processor causes receiving images of a region of interest of a patient with an enteric tube or line disposed within the region of interest, detecting the medical tube or line within the image, generating a combined image by combining the received images, and superimposing graphical markers on the combined image that indicate placement or misplacement of the enteric tube or line, and displaying the combined image on a display. In further aspects, a classification of the enteric tube or line (e.g., correctly placed tube present, malpositioned tube present, and so forth) and a detected positional change in the placement of the enteric tube or line may be determined and communicated to one or more clinicians. Additionally, the
(Continued)

outputs of the image processing system may also be provided to facilitate triage of patients, helping prioritize which tube placements require further attention and in what order.

20 Claims, 44 Drawing Sheets

Related U.S. Application Data

(60) Provisional application No. 63/282,814, filed on Nov. 24, 2021.

(58) Field of Classification Search
CPC  G06T 2207/30021; G06T 11/60; G06T 11/00
USPC .......................................... 382/128; 604/264
See application file for complete search history.

(56) References Cited

U.S. PATENT DOCUMENTS

| | | | | |
|---|---|---|---|---|
| 9,717,461 | B2* | 8/2017 | Yu ........................ | A61B 5/1121 |
| 11,410,341 | B2 | 8/2022 | Baenen et al. | |
| 2005/0129298 | A1 | 6/2005 | Warp | |
| 2012/0184924 | A1* | 7/2012 | Ejike ..................... | A61M 39/08 |
| | | | | 604/264 |
| 2015/0062153 | A1* | 3/2015 | Mihalca ............... | H04N 1/6008 |
| | | | | 345/604 |
| 2016/0361121 | A1* | 12/2016 | Reicher ................ | G06F 3/0482 |
| 2019/0021677 | A1* | 1/2019 | Grbic ....................... | G06T 7/11 |
| 2020/0138382 | A1 | 5/2020 | Cao | |
| 2020/0268252 | A1* | 8/2020 | Litvinova ............. | G01J 3/4406 |
| 2021/0059607 | A1* | 3/2021 | Gormley ................. | G06N 3/08 |
| 2022/0164996 | A1* | 5/2022 | Baenen .................. | G06T 11/00 |

OTHER PUBLICATIONS

"Annalise Enterprise CXR Comprehensive Medical Imaging AI," Usa.annalise.ai, Nov. 17, 2022, https://usa.annalise.ai/solutions/annalise-cxr/.

"FDA Clears Software to Rapidly, Accurately Confirm Placement of Lifesaving Medical Devices on X-Ray," Imaging Technology News, Oct. 3, 2021, https://www.itnonline.com/content/fda-clears-software-rapidly-accurately-confirm-placement-lifesaving-medical-devices-x-ray.

RAIQC, https://www.raiqc.com/.

"Placement of Enteric Tube," American College of Radiology, https://www.acrdsi.org/DSI-Services/Define-AI/Use-Cases/Placement-of-Enteric-Tube.

D.H. Mallon et al., "Automated detection of enteric tubes misplacedin the respiratory tract on chest radiographsusing deep learning with two centre validation," Clinical Radiology, 2022, pp. e758-e764, vol. 77, Issue 10.

Gongbo Liang et al., "Development of CNN Models for the Enteral Feeding Tube Positioning Assessment on a Small Scale Data Set," BMC Medical Imaging, 2022, vol. 22, No. 1, https://doi.org/10.1186/s12880-022-00766-w.

Varun Singh et al., "Assessment of Critical Feeding Tube Malpositions on Radiographs Using Deep Learning," Journal of Digital Imaging, 2019, pp. 651-655, vol. 32, No. 4, https://doi.org/10.1007/s10278-019-00229-9.

Xin Yi et al., "Automatic catheter detection in pediatric X-ray images using a scale-recurrent network and synthetic data," 1st Conference on Medical Imaging with Deep Learning, 2018, pp. 1-10, Amsterdam, The Netherlands.

Matthew Harwood et al. "Prediction Model for Correct Enteric Feeding Tube Placement," SiiM19 Annual Meeting, Jun. 26-28, Denver, CO.

Andres Chacon Martinez et al., "Pitfalls and Failures in Creating an Ng/Et Tube Detection Tool via CXR and Machine Learning," Chest, 2020, vol. 158, No. 4, https://doi.org/10.1016/j.chest.2020.08.1253.

Xin Yi et al., "Computer-Aided Assessment of Catheters and Tubes on Radiographs: How Good Is Artificial Intelligence for Assessment?," Radiology: Artificial Intelligence, 2020, vol. 2, No. 1, https://doi.org/10.1148/ryai.2020190082.

Hyunkwang Lee et al., "Machine Intelligence for Accurate X-ray Screening and Read-out Prioritization: PICC line Detection Study," SIIM 2017 Scientific Session, Jun. 1.

Matthew Brown et al., "Device Placement Confirmation System Aims to Bring AI into Clinical Setting," p. 3.

"RANZCR Clip—Catheter and Line Position Challenge," Kaggle, https://www.kaggle.com/c/ranzcr-clip-catheter-line-classification.

U.S. Appl. No. 17/951,281, filed Sep. 23, 2022, Pal Tegzes.

Bakar Siddique Abu et al: "Image Stitching for Chest Digital Radiography Using the SIFT and SURF Feature Extraction by RANSAC Algorithm", Journal of Physics: Conference Series, vol. 1624, No. 4, Nov. 6, 2020 (Nov. 6, 2020), XP093147109, GB, ISSN: 1742-6588, DOI: 10.1088/1742-6596/1624/4/042023.

EP application 23207102.7 filed Oct. 31, 2023—Search Report issued Apr. 22, 2024; 12 pages.

H-J Bender et al: "Reconstruction of 3D Catheter Paths from 2D X-ray Projections", Jan. 1, 2006 (Jan. 1, 2006), Medical Image Computing and Computer Assisted Intervention—MICCAI '99 : Second International Conference, Cambridge, UK, Sep. 19-22, 1999; [Lecture Notes in Computer Science ; 1679], Springer, Berlin [U.A.], pp. 981-989, XP019036125, ISBN: 978-3-540-66503-8.

Yang Fan et al: "Improvement of automated image stitching system for DR X-ray images", Computers in Biology and Medicine, New York, NY, US, vol. 71, Feb. 10, 2016 (Feb. 10, 2016), pp. 108-114, XP029461989, ISSN: 0010-4825, DOI: 10.1016/J.COMPBIOMED. 2016.01 .026.

\* cited by examiner

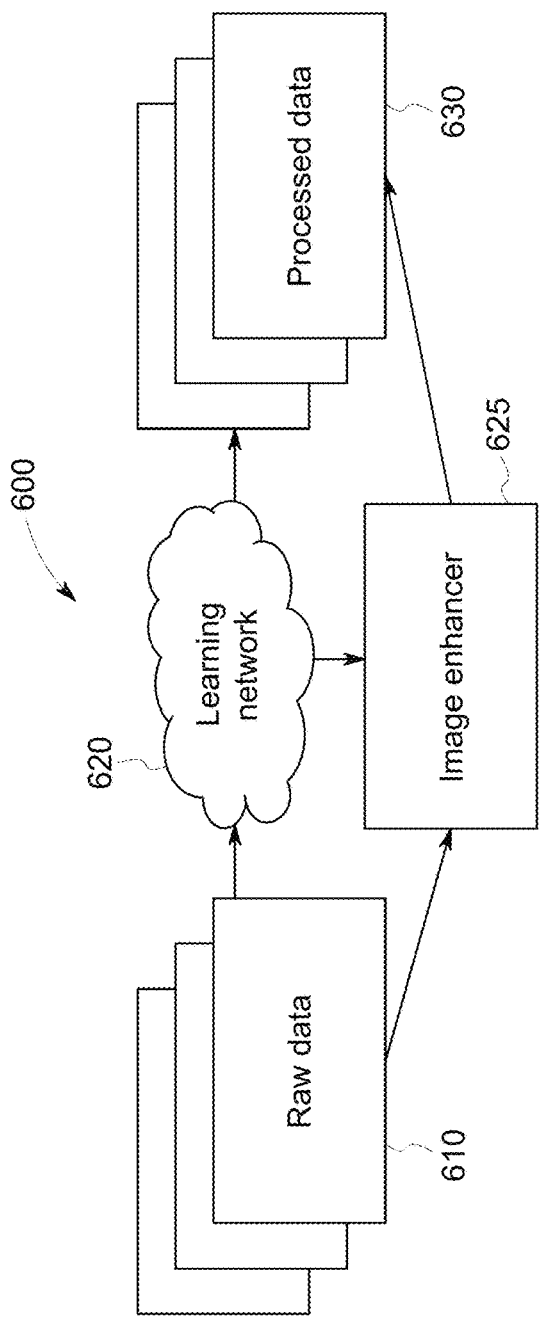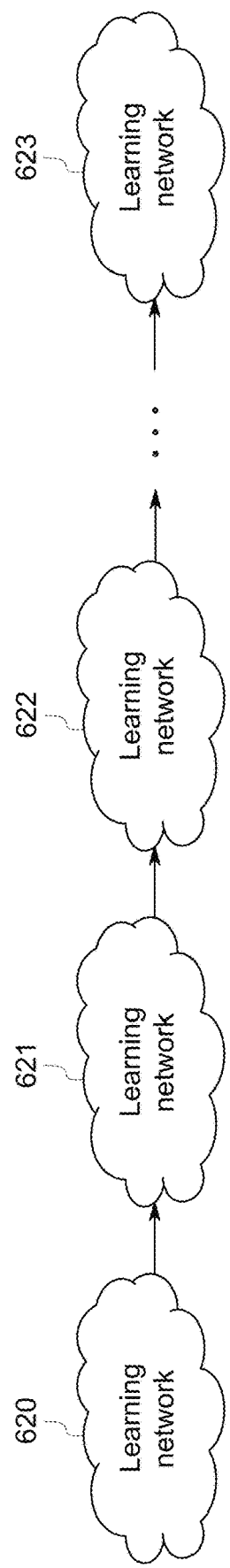
FIG. 6A
FIG. 6B

SYSTEM AND METHOD FOR VISUALIZING PLACEMENT OF A MEDICAL TUBE OR LINE

CROSS-REFERENCE TO RELATED APPLICATION

This application is a continuation-in-part application of U.S. patent application Ser. No. 17/951,281, entitled "SYSTEM AND METHOD FOR VISUALIZING PLACEMENT OF A MEDICAL TUBE OR LINE," filed Sep. 23, 2022, which claims priority to and the benefit of U.S. Provisional Application No. 63/282,814, entitled "SYSTEM AND METHOD FOR VISUALIZING PLACEMENT OF A MEDICAL TUBE OR LINE", filed Nov. 24, 2021, each of which is herein incorporated by reference in their entireties for all purposes.

TECHNICAL FIELD

The subject matter disclosed herein relates to medical image processing, and more particularly to systems and methods for visualizing placement of a medical tube or line, such as an enteric tube (e.g., a nasogastric tube).

BACKGROUND

Medical imaging may be utilized to visualize medically placed tubes or lines (e.g., chest tube, a nasogastric tube, an enteric tube, endotracheal tube, vascular line, a peripherally inserted central catheter (PICC), a catheter, etc.). However, it may be difficult for medical personnel (e.g., doctor, radiologist, technician, etc.) to visualize these medically placed tubes or lines. In addition, the medical personnel may be untrained or inexperienced, which may hinder their ability to identify the medically placed tube or line and to determine if it is properly placed. Further, medical personnel may have to manually make measurements (which may be time consuming) to determine if a medically placed tube or line is properly placed. If a medically placed tube or line is misplaced, prompt information of such misplacement may be desirable in order to take corrective action.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, in determining whether a medically placed tube or line (e.g., an enteric tube or line) is placed properly (e.g., via the deep learning networks models), techniques are provided that include comparing a measured distance between a surface of, a feature of, and/or an end of the tube or line and a reference or anatomical landmark to a desired threshold and determining if the measured distance (which may be measured, for example, as the geometrical distance of two points (e.g., along a straight line) or as a distance measured along the tube curve) is acceptable. The desired threshold may represent an acceptable range for the distance between the tube or line and the reference or anatomical landmark for the tube or line to be correctly placed. For example, for a nasogastric tube, the desired threshold may be a range of distance below the gastroesophageal junction. In some embodiments, the measured distance may change over time. Thus, the techniques provided may additionally include determining a difference between an initial value of the measured distance and a subsequent value of the measured distance (e.g., measured at a subsequent time after the initial value). The difference between the initial value and the subsequent value may then be compared to a desired difference threshold to determine if the difference is significant or negligible. The desired difference threshold may represent an acceptable range of positional deviation of the tube or line from an initial placement (e.g., position).

If the measured distance is not significant, the techniques may include providing a user-perceptible indication of misplacement on a display. In addition, if the difference between the initial value of the measured distance and the subsequent value of the measured distance is not significant, the techniques may include providing an additional user-perceptible indication of the positional deviation of the tube or line from the initial position. The indication and/or the additional indication may be provided on the display where a combined image is displayed or provided on another device (e.g., the user's device). The indication and/or the additional indication may be text stating that the tube or line is misplaced and/or has deviated from the initial position. In certain embodiments, the text may be more specific and state the tube or line is too high or too low or otherwise improper. In certain embodiments, the text may provide further instructions (e.g., to raise or lower the end of the tube or line a certain distance). In some embodiments, the text may be color coded (e.g., in orange or red) to further indicate the misplacement and/or positional deviation. In some embodiments, the indication may be provided via color coding of one or more graphical markers of the tube or line displayed on the combined image. For the example, one or more of the graphical markers (e.g., for the end of tube or line, for one or more features of the tube or line, for the reference or anatomical landmark, and/or the indication of the measured distance there between) and/or the tube or line may be color coded a specific color (e.g., red or orange) or a combination of different colors to indicate the misplacement and/or positional deviation. Alternatively or in addition, one or more of the graphical markers may flash or otherwise be visually highlighted if the tube or line is misplaced and/or has deviated from the initial position.

If the measured distance and/or if the difference between the initial value of the measured distance and the subsequent value of the measured distance is acceptable, the techniques may include providing a user-perceptible indication of proper placement of the tube or line. The indication may be provided on the display where the combined image is displayed or provided on another device (e.g., the user's device). The indication for proper placement may be text stating the tube or line is properly placed. In certain embodiments, the indication for proper placement may be provided via color coding one or more graphical markers of the tube or line displayed on the combined image (e.g., all the graphical markers and/or the tube or line may be color coded green). In certain embodiments, the indication of proper placement or misplacement may be written into a standard or private information tag (e.g., DICOM) and made visible in subsequent information systems that the image is sent too (e.g., PACS). In certain embodiments, the determination as to whether the medically placed tube or line is properly placed or positioned may be manually done by the medical personnel viewing the displayed combined image.

In the context of a nasogastric tube which may be described herein as an example, with respect to proper placement, a nasogastric tube may be inserted so as to bisect the airways and diaphragm on the X-ray projection (e.g., to be positioned substantially on the midline with respect to the airway). The inserted tip (e.g., distal tip; end of the nasogastric tube) and side ports and/or end ports (if present) are below the diaphragm when properly placed, typically positioned toward the patient's left hand side. Proper insertion and placement of the tube avoids or mitigates possible risks, such as the risk of insertion into the lungs (with the associated risk of substances entering the lungs), the risk of the tube placement being too high, e.g., in the esophagus, the risk of the tip, the side ports, and/or end ports exiting a patient's stomach after initial insertion, and the risk that loops or kinks in the inserted tube may disturb the flow and/or irritate the patient. Proper placement of the tube may be assessed using images captured upon initial insertion of the tube and/or using images captured at any subsequent time during which the tube resides within the patient.

As discussed herein, and in the context of the preceding discussion, the presently described techniques utilize an AI-based feature to facilitate and assess the placement of enteric tubes, including but not limited to nasogastric tubes. The AI-based feature may be used to detect and/or characterize the placed tube and/or the position(s) of the placed tubes, to provide a graphical summary showing the tube with respect to relevant anatomical features (e.g., in the actual anatomical context) and/or previous position(s), and to classify the tube as being placed correctly, changed (e.g., deviated) or unchanged position (e.g., undeviated), and/or needing adjustment. Use of the AI-based feature may, therefore, increase the confidence of the bedside team when placing tubes. Use of the AI-based feature may also facilitate prioritization of potentially misplaced tubes for review, such as by a radiologist, and may speed up the review process, thereby helping to avoid complications associated with misplaced tubes.

Features and benefits provided by the techniques described herein include, but are not limited to: the ability to localize particular features (e.g., the tube tip, side ports, end ports, and so forth) of the enteric tube; the ability to localize relevant anatomical features and context (e.g., diaphragm, airways, carina, lungs, patient midline, and so forth); the ability to localize other relevant devices that may be potentially confounding with enteric tubes (e.g., probes, peripherally inserted central catheter (PICC) lines, electrocardiogram (ECG) leads or lines, endotracheal (ET) tube, and so forth); the ability to assess the tube position and to provide explanation or commentary about the assessment (e.g., explaining potential problems with current tube placement, such as "the side port location is too high relative to the diaphragm"); the ability to compare subsequent tube positions to a previous tube position and to provide explanation or commentary about the assessment (e.g., explaining potential problems with detected positional deviation of the tube, such as "tube length below diaphragm is 9 cm less than tube length below diaphragm measurement calculated 1 day earlier"); the ability to assess the tube position and/or subsequent tube positions and to provide explanation or commentary regarding aspects of the placement verified to be correct or satisfactory (e.g., that the tube correctly bisects the diaphragm near the midline); the ability to provide automated measurements that are relevant for the tube assessment (e.g. the length of the tube below the diaphragm, the deviation from patient midline, the distance of the side port from the diaphragm, the vertical distance of the tube tip from the diaphragm, the distance of the tube tip, side ports, and/or end ports from the gastroesophageal junction, the measured tube diameter, etc.); the ability to show the detected tubes, the tube features, and relevant anatomical features and measurements in a graphical summary and the ability to highlight potentially problematic (or non-problematic) areas within the graphical summary); the ability to detect and indicate (e.g., display) changes in the position of the tube over time; the ability to perform triage based on the tube placement classification, allowing prioritization of attention to potentially misplaced tubes; the ability to save the graphical summary in various formats (secondary capture, structure report, Integrating the Healthcare Enterprise (IHE) AI Results (AIR), and so forth); and the ability to allow the user to edit, modify, and/or annotate the graphical summary.

In accordance with an embodiment, a medical image processing system is provided. In accordance with this embodiment, the medical image processing system may comprise: a display; a processor; and a memory storing processor-executable code. The processor-executable code, when executed by the processor, causes acts to be performed comprising: receiving a first image of a patient with an enteric tube or line disposed within a region of interest; receiving a second image of the patient with the enteric tube or line disposed within the region of interest, wherein the second image is taken at a different time than the first image; receiving first positional information associated with the enteric tube or line within the first image and second positional information associated with the enteric tube or line within the second image; comparing the first positional information to the second positional information; determining a positional change of the enteric tube or line based on the comparison of the first positional information to the second positional information; and displaying an indication of the positional change on the display.

In accordance with an embodiment, a method for medical image processing is provided. In accordance with this embodiment, the method for medical image processing may comprise: receiving, via a processor, a first image of a patient with an enteric tube or line disposed within a region of interest; receiving, via the processor, a second image of the patient with the enteric tube or line disposed within the region of interest, wherein the second image is taken at a different time than the first image; receiving, via the processor, first positional information associated with the enteric tube or line within the first image and second positional information associated with the enteric tube or line within the second image; comparing, via the processor, the first positional information to the second positional information; determining, via the processor, a positional change of the enteric tube or line based on the comparison of the first positional information to the second positional information; and causing, via the processor, display of an indication of the positional change on a display.

In accordance with an embodiment, a medical image processing system is provided. In accordance with this embodiment, the medical image processing system may comprise: a display; a processor; and a memory storing processor-executable code. The processor-executable code, when executed by the processor, causes acts to be performed comprising: receiving a first image comprising a first perspective of a patient with at least a portion of an enteric tube or line disposed within the first image; receiving a second image comprising a second perspective of the patient with at least a portion of the enteric tube or line disposed within the second image; detecting one or more features of the enteric tube or line within the first image and the second image; detecting one or more anatomic reference landmarks within the first image and the second image; generating a combined image by combining the first image and the second image, wherein the combined image comprises one or more positional indications associated with the enteric tube or line in an anatomic context derived based at least in part on a detected position of the one or more features of the enteric tube or line relative to the one or more anatomic reference landmarks in the first perspective, the second perspective, or both; and displaying the combined image on the display.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 6A is a schematic diagram of an embodiment of a configuration to apply a learning network to process and/or otherwise evaluate an image;

FIG. 6B is a schematic diagram of an embodiment of a combination of a plurality of learning networks;

DETAILED DESCRIPTION

Figure 1:
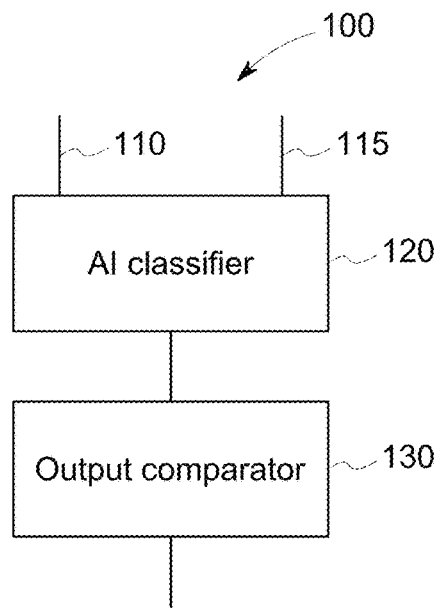
FIG. 1 is a schematic diagram of an embodiment of a condition comparator.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Imaging devices (e.g., gamma cameras, positron emission tomography (PET) scanners, computed tomography (CT) scanners, X-Ray machines, fluoroscopy machines, magnetic resonance (MR) imaging machines, ultrasound scanners, etc.) generate medical images (e.g., native Digital Imaging and Communications in Medicine (DICOM) images) representative of the parts of the body (e.g., organs, tissues, etc.) for various clinical purposes, such as to diagnose and/or treat diseases. Medical images may include volumetric data including voxels associated with the part of the body captured in the medical image. Medical image visualization software allows a clinician to segment, annotate, measure, and/or report functional or anatomical characteristics on various locations of a medical image. In some examples, a clinician may utilize the medical image visualization software to identify regions of interest within the medical image.

Acquisition, processing, quality control, analysis, and storage of medical image data play an important role in diagnosis and treatment of patients in a healthcare environment. A medical imaging workflow and devices involved in the workflow can be configured, monitored, and updated throughout operation of the medical imaging workflow and devices. Machine and/or deep learning can be used to help configure, monitor, and update the medical imaging workflow and devices.

Certain examples discussed herein provide and/or facilitate the use of imaging devices to provide improved clinical services and outcomes. Certain examples facilitate improved or modified image reconstruction and/or presentation and further processing to provide improved data and analytics for certain clinical procedures, namely insertion and placement of a medical line or tube, such as an enteric tube (e.g., a nasogastric tube), and assessment of positional changes of the medical line or tube over time.

Certain examples provide an image processing apparatus including an artificial intelligence classifier. The classifier can detect, segment, and quantify anatomic features and/or medical devices, for example. The classifier can be a discrete output of positive or negative for a finding, a segmentation, etc. For example, the classifier can instantiate machine learning and/or other artificial intelligence to detect, segment, and analyze a presence of a medical device (e.g., medically placed tube or line). By way of example, the classifier can instantiate machine learning and/or other artificial intelligence to detect an end of a medically placed tube or line (such as an enteric tube), detect a reference or anatomical landmark (e.g., diaphragm, airways), determine a position of the medically placed tube or line relative to the reference or anatomical landmark, measure a distance between the end of the medically placed tube or line and the reference landmark, and determine whether the tube or line is properly placed. In addition, the classifier may instantiate machine learning and/or other artificial intelligence to assess positional changes of the placed tube or line (e.g., and/or features of the tube or line) by comparing subsequent measurements of the placed tube or line to measurements associated with the initial placement (e.g., positioning) of the tube or line.

Machine learning techniques, whether deep learning networks or other experiential/observational learning system, can be used to locate an object in an image, understand speech and convert speech into text, and improve the relevance of search engine results, for example. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

Throughout the specification and claims, the following terms take the meanings explicitly set forth herein, unless the context dictates otherwise. The term "deep learning" is a machine learning technique that utilizes multiple data processing layers to recognize various structures in data sets and classify the data sets with high accuracy. A deep learning network can be a training network (e.g., a training network model or device) that learns patterns based on a plurality of inputs and outputs. A deep learning network can be a deployed network (e.g., a deployed network model or device) that is generated from the training network and provides an output in response to an input.

The term "supervised learning" is a deep learning training method in which the machine is provided already classified data from human sources. The term "unsupervised learning" is a deep learning training method in which the machine is given data that has not been previously classified for training. Such unsupervised learning techniques may be suitable for training that is directed to abnormality detection. The term "semi-supervised learning" is a deep learning training method in which the machine is provided a small amount of classified data from human sources compared to a larger amount of unclassified data available to the machine.

The term "representation learning" is a field of methods for transforming raw data into a representation or feature that can be exploited in machine learning tasks. In supervised learning, features are learned via labeled input.

The term "convolutional neural networks" or "CNNs" are biologically inspired networks of interconnected data used in deep learning for detection, segmentation, and recognition of pertinent objects and regions in datasets. CNNs evaluate raw data in the form of multiple arrays, breaking the data into a series of stages and examining the data for learned features.

The term "transfer learning" is a process of a machine storing the information used in properly or improperly solving one problem to solve another problem of the same or similar nature as the first. Transfer learning may also be known as "inductive learning". Transfer learning can make use of data from previous tasks, for example.

The term "active learning" is a process of machine learning in which the machine selects a set of examples for which to receive training data, rather than passively receiving examples chosen by an external entity. For example, as a machine learns, the machine can be allowed to select examples that the machine determines will be most helpful for learning, rather than relying only an external human expert or external system to identify and provide examples.

The term "computer aided detection" or "computer aided diagnosis" refer to computers that analyze medical images for the purpose of detecting an anatomic structure of interest, a physiological measurement or event of interest, and/or of suggesting a possible diagnosis.

Certain examples use neural networks and/or other machine learning architectures to implement a new workflow for image and associated patient analysis including generating alerts based on radiological findings that may be generated and delivered at the point of care of a radiology exam. Certain examples use Artificial Intelligence (AI) algorithms to process one or more imaging exams (e.g., an image or set of images), and provide an alert based on the automated exam analysis. The alert(s) (e.g., including notification(s), recommendation(s), other action(s), etc.) may be intended for the technologist performing the exam, clinical team providers (e.g., nurse, doctor, etc.), radiologist, administration, operations, and/or even the patient. The alerts may be provided to indicate a specific, or multiple, quality control issue and/or radiological finding(s) or lack thereof in the exam image data, for example.

In certain examples, the AI algorithm can be (1) embedded within an imaging device, (2) running on a mobile device (e.g., a tablet, smart phone, laptop, other handheld or mobile computing device, etc.), and/or (3) running in a cloud computing architecture (e.g., on premise or off premise) and delivers the alert via a web browser (e.g., which may appear on the radiology system, mobile device, computer, etc.). Such configurations can be vendor neutral and compatible with legacy imaging systems. For example, if the AI processor is running on a mobile device and/or in the "cloud", the configuration can receive the images (A) from the x-ray and/or other imaging system directly (e.g., set up as secondary push destination such as a Digital Imaging and Communications in Medicine (DICOM) node, etc.), (B) by tapping into a Picture Archiving and Communication System (PACS) destination for redundant image access, (C) by retrieving image data via a sniffer methodology (e.g., to pull a DICOM image off the system once it is generated), etc.

Certain examples provide apparatus, systems, methods, etc., to determine and provide, as discussed herein, clinical feedback relevant to the treatment or care of a patient, such as placement of a clinical line or tube, and/or other patient-relevant conditions based on output of an algorithm instantiated using and/or driven by an artificial intelligence (AI) model, such as a deep learning network model, machine learning network model, etc. For example, the presence of a medically placed tube or line (e.g. chest tube, an enteric tube (such as a nasogastric tube), endotracheal tube, vascular line, a peripherally inserted central catheter, a catheter, etc.) can be determined based on an output of an AI detection algorithm. In addition, the placement of a medical tube or line within a region of interest (e.g., lung, stomach, vascular system, etc.) can be determined based on an output of an AI detection (e.g., whether the medical tube or line is properly placed).

Certain examples discussed and described herein provide systems and method to detect a medically placed tube or line within a region of interest of a patient and whether the tube or line is properly placed within the region of interest based on an AI classification algorithm applied to a patient's data. Additionally, the systems and methods may detect whether a position (e.g., a placement) of the tube or line has changed over time. An example method includes detecting a presence of a medically placed tube or line in an image; detecting an one or more a terminal end and/or surface contours of the medically placed tube or line in the image; detecting a reference one or more anatomical landmarks in the image; determining whether the medically placed tube or line is properly placed relative to the reference or anatomical landmark(s); determining whether a position of the placed tube or line has changed compared to a previous position; and/or providing a notification for a caregiver as to whether the medically placed tube or line is properly placed relative to the reference or anatomical landmark(s) and/or whether the position of the medically placed tube or line has changed. In certain embodiments, the AI classification algorithm may detect the presence of the medically placed line or tube; graphically mark the medically placed line or tube with a visual (e.g., color or color-coded) graphical overlay; detect a surface, side ports and/or end ports, and/or an end (e.g., distal end) of the medically placed line or tube; graphically mark the surface, the side ports and/or end ports, and/or the end of the medically placed tube or line; detect one or more reference or anatomical landmarks (e.g., for determining the proper placement of the tube or line relative to the landmark(s)); graphically mark the reference or anatomical landmark(s); calculate a distance between the surface and/or end of the medically placed tube or line; and/or calculate and provide a confidence metric or other metric (e.g., for the calculated distance, for the determination of the presence of the medically placed tube or line, for an accuracy in detecting the end of the tube or line, for an accuracy in detecting the reference or anatomical landmark, etc.). In addition, the AI classification algorithm may compare a detected position of the medically placed tube or line with a previous detected position of the medically placed tube or line to determine if the position has changed (e.g., shifted, altered) over time (e.g., determine whether the detected position of the medically placed tube or line is the same as or different than a previously detected position). The AI classification algorithm is trained based on images with or without medically placed tubes or lines, images with properly placed tubes or lines, images with misplaced tubes or lines, images with the reference or anatomical landmark, and/or images without the reference or anatomical landmark.

For example, patients in a critical care setting receive x-rays (e.g., chest x-rays, abdominal x-rays) to monitor the placement of a medically placed tube or line. If a tube or line is misplaced and/or an initial position of the tube or line has shifted to a misplaced position, the medical team may need to conduct an intervention to properly place the medical tube or line. An artificial intelligence classifier can detect a presence of the medically placed tube or line, detect the surface, one or more ports, and/or a terminal end of the medically placed tube or line, detect a reference or anatomical landmark, and evaluate whether the tube or line is properly placed. Further, the artificial intelligence classifier can assess whether a detected position of the medically placed tube or line has changed over time by comparing the detected position of the medically placed tube or line to a previously detected position of the medically placed tube or line. An alert can be generated and output at a point of care, such as on a device (e.g., an imaging device, an imaging workstation, etc.), to notify and/or otherwise provide instructions (e.g., notification that a tube is or is not properly placed or instruction to remove the tube or line, shift the tube or line in a certain direction, etc.) to a clinical care team, for example.

The techniques describe herein provide a quick means to determine if a medically placed tube or line is improperly placed and/or if a position of the medically placed tube or line has changed over time. This enables a faster intervention to ensure the tube or line is in an appropriate location for patient care. In addition, it relieves some of the burden on the medical team providing assistance to the patient (especially those personnel who may be untrained or inexperienced).

Deep learning is a class of machine learning techniques employing representation learning methods that allows a machine to be given raw data and determine the representations needed for data classification. Deep learning ascertains structure in data sets using backpropagation algorithms which are used to alter internal parameters (e.g., node weights) of the deep learning machine. Deep learning machines can utilize a variety of multilayer architectures and algorithms. While machine learning, for example, involves an identification of features to be used in training the network, deep learning processes raw data to identify features of interest without the external identification.

Deep learning in a neural network environment includes numerous interconnected nodes referred to as neurons. Input neurons, activated from an outside source, activate other neurons based on connections to those other neurons which are governed by the machine parameters. A neural network behaves in a certain manner based on its own parameters. Learning refines the machine parameters, and, by extension, the connections between neurons in the network, such that the neural network behaves in a desired manner.

Deep learning that utilizes a convolutional neural network segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which themselves include low level features. While examining an image, for example, rather than looking for an object, it is more efficient to look for edges which form motifs which form parts, which form the object being sought. These hierarchies of features can be found in many different forms of data such as speech and text, etc.

Learned observable features include objects and quantifiable regularities learned by the machine during supervised learning. A machine provided with a large set of well classified data is better equipped to distinguish and extract the features pertinent to successful classification of new data.

A deep learning machine that utilizes transfer learning may properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given situation.

An example deep learning neural network can be trained on a set of expert classified data, classified and further annotated for object localization, for example. This set of data builds the first parameters for the neural network, and this would be the stage of supervised learning. During the stage of supervised learning, the neural network can be tested whether the desired behavior has been achieved.

Once a desired neural network behavior has been achieved (e.g., a machine has been trained to operate according to a specified threshold, etc.), the machine can be deployed for use (e.g., testing the machine with "real" data, etc.). During operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network can provide direct feedback to another process. In certain examples, the neural network outputs data that is buffered (e.g., via the cloud, etc.) and validated before it is provided to another process.

Deep learning machines using convolutional neural networks (CNNs) can be used for image analysis. Stages of CNN analysis can be used for facial recognition in natural images, computer-aided diagnosis (CAD), etc.

High quality medical image data can be acquired using one or more imaging modalities, such as x-ray, computed tomography (CT), molecular imaging and computed tomography (MICT), magnetic resonance imaging (MRI), etc. Medical images are largely interpreted by physicians, but these interpretations can be subjective, affected by the condition of the physician's experience in the field and/or fatigue. Image analysis via machine learning can support a healthcare practitioner's workflow.

Deep learning machines can provide computer aided detection support to improve their image analysis with respect to image quality and classification, for example. However, issues facing deep learning machines applied to the medical field often lead to numerous false classifications. Deep learning machines must overcome small training datasets and require repetitive adjustments, for example.

Deep learning machines, with minimal training, can be used to determine the quality of a medical image, for example. Semi-supervised and unsupervised deep learning machines can be used to quantitatively measure qualitative aspects of images. For example, deep learning machines can be utilized after an image has been acquired to determine if the quality of the image is sufficient for diagnosis. Supervised deep learning machines can also be used for computer aided diagnosis. Supervised learning can help reduce susceptibility to false classification, for example.

Deep learning machines can utilize transfer learning when interacting with physicians to counteract the small dataset available in the supervised training. These deep learning machines can improve their computer aided diagnosis over time through training and transfer learning.

FIG. 1 illustrates an example condition comparator apparatus 100 including a plurality of inputs 110, 115, an artificial intelligence (AI) classifier 120, and an output comparator 130. Each input 110, 115 is provided to the AI classifier 120, which classifies image data and/or other information in the respective input 110, 115 to identify a condition in the input 110, 115 and to generate an indication of the identified condition based on the input 110, 115. In certain embodiments, the AI classifier 120 may classify images and/or other information in the respective input 110, 115 to identify a medically placed tube or line (e.g., chest tube, enteric tube, endotracheal tube, vascular line, a peripherally inserted central catheter, a catheter, etc.) and to identify a reference or anatomical landmark relevant to the type or line and its desired placement. Using the example comparator apparatus 100, it can be determined whether the tube or line is properly placed within a region of interest of the patient relative to a reference or anatomical landmark. In particular, surfaces of, one or more ports of (e.g., side ports, end ports), and/or an end of the tube or line as well as a reference or anatomical landmark may be located and a determination made as to whether the tube or line is properly placed relative to the reference or anatomical landmark. A distance may be measured between the end of the tube or line and the reference or anatomical landmark in determining whether the end of the tube or line is properly placed. In some embodiments, a distance may be measured between the one or more ports and the reference or anatomical landmark to determine whether the one or more ports of the tube or line are properly placed (e.g., and thus the tube or line is properly placed). A confidence metric (e.g., for the calculated distance, for the determination of the presence of the medically placed tube or line, for an accuracy in detecting the end of the tube or line, for an accuracy in detecting the reference or anatomical landmark, etc.) may be calculated and/or provided via a user-perceptible notification or stored for further reference. Further, a notification or alert may be provided as to whether or not the medically placed tube or line is properly placed. If the tube or line is not properly placed, further instructions may be provided via a notification or alert (e.g., related to moving the tube or line in a certain direction).

In another instance, the example comparator apparatus 100 may be used to determine whether a detected position the tube or line has moved in relation to a previously detected position of the tube or line. In particular, as discussed above, surfaces of, one or more ports of, and/or an end of the tube or line as well as a reference or anatomical landmark may be located, one or more distances may be measured between the tube or line (e.g., one or more features of the tube or line) and the reference or anatomical landmark, and a determination made as to a detected position of the tube or line relative to the reference or anatomical landmark (e.g., determining whether the tube or line and/or one or more features of the tube or line is properly placed). A confidence metric (e.g., for the calculated distance, for the determination of the presence of the medically placed tube or line, for an accuracy in detecting the end of the tube or line, for an accuracy in detecting the reference or anatomical landmark, etc.) may be calculated and/or provided via user-perceptible notification or stored for further reference. In addition, the determined position of the tube or line may be compared to one or more previously determined positions of the tube or line to evaluate if the determined position of the tube or line has changed in relation to the one or more previously determined positions of the tube or line. Specifically, a distance may be measured between the determined position of the tube or line (e.g., determined position of particular one or more features of the tube or line) and the previously determined positon of the tube or line (e.g., previously determined position of the one or more features of the tube or line), in determining whether the position of the tube or line has changed over time. Further, a notification or alert may be provided as to whether or not the medically placed tube or line is properly placed and/or whether or not the determined position of the tube or line has changed as compared to the previous determined position of the tube or line. If the tube or line is not properly placed and/or a difference between the determined position and the previously determined position is greater than a threshold difference, further instructions may be provided via a notification or alert (e.g., related to moving the tube or line in a certain direction).

Figure 2:
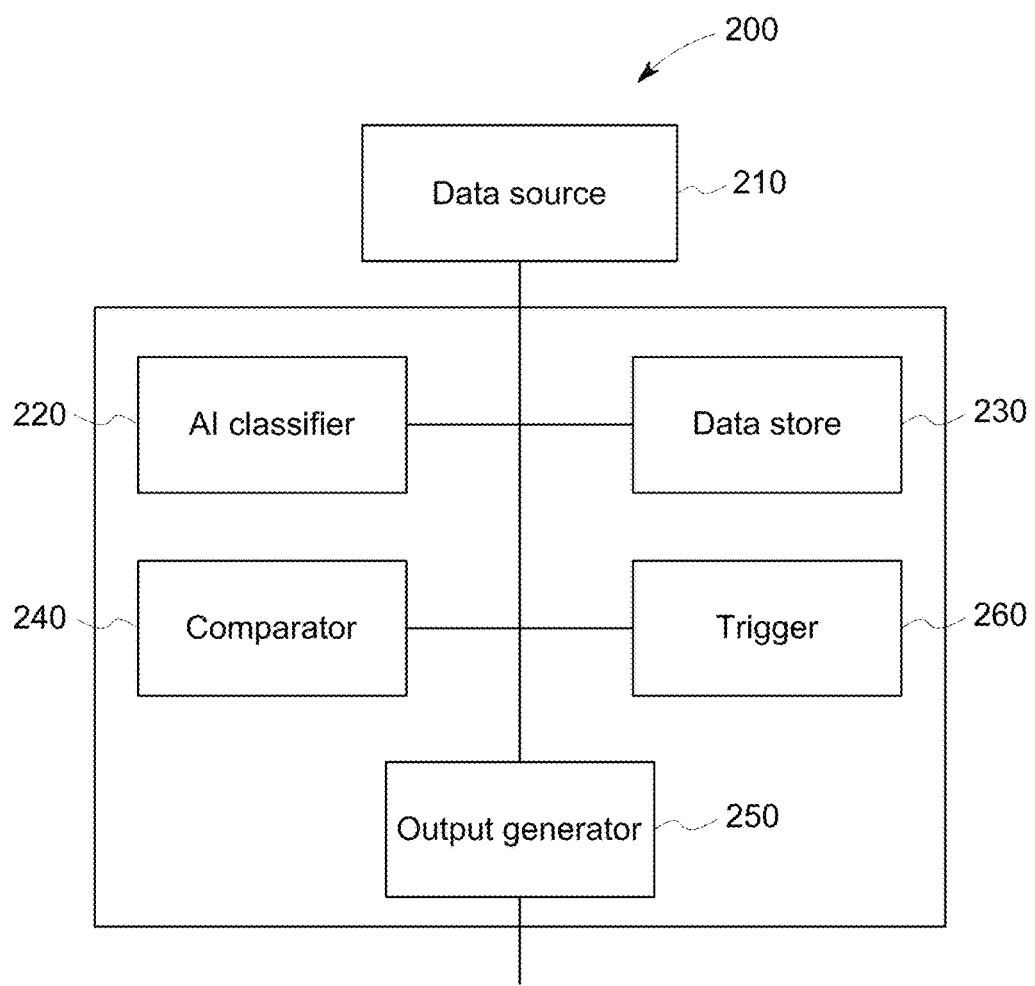
FIG. 2 is a schematic diagram of an embodiment of a clinical analysis apparatus.

FIG. 2 illustrates an example clinical progression analysis apparatus 200 that can be constructed based on the example condition comparator 100 of FIG. 1. The example apparatus 200 includes a data source 210, an artificial intelligence (AI) classifier 220, a data store 230, a comparator 240, an output generator 250, and a trigger 260. Input 110, 115 can be provided by the data source 210 (e.g., a storage device, an imaging device, etc., incorporated in and/or otherwise connected to the apparatus 200, etc.) to the AI classifier 220.

The example classifier 220 processes input over time to correlate input from the data source 210 with a classification. Thus, the AI classifier 220 processes input image data and/or other data to identify a condition in the input data and classify that condition according to one or more states (e.g., tube or line present, tube or line not present, reference or anatomical landmark present, reference or anatomical landmark not present, tube or line placed correctly, tube or line misplaced, position of tube or line deviated from a previous placement of the tube or line) as specified by an equation, a threshold, and/or other criterion. In certain embodiments, the AI classifier 220 processes input image data and/or other data to detect a medically placed tube or line and to determine whether an end and/or one or more ports of the medically placed tube or line is properly placed. In certain embodiments, the AI classifier 220 processes input image data and/or other data to detect a medically placed tube or line and to determine whether a position of the end and/or one or more ports of the medically placed tube or line has changed in relation to a previously detected position. Output of the AI classifier 220 can be stored in the data store 230, for example.

Over time, classifications made by the AI classifier 220 with respect to the same type of input 110, 115 from the data source 210 (e.g., lung MR images of the same patient taken at times t0 and t1, etc.) can be generated and stored in the data store 230. The classifications are provided to the comparator 240, which compares a classification at two or more different times (e.g., prior to insertion of the tube or line and after the insertion of the tube or line) to identify the medically placed tube or line and determine whether the medically placed tube or line is properly placed. For example, at time t0 the tube or line may not present in the region of interest and at time t1 or a later time the tube or line may be placed in a location (which may or may not be properly placed) within the region of interest.

The comparator 240 provides a result indicative of the trend/progression. In certain embodiments, the comparator 240 provides a result indicative of a placement of a medically placed tube or line. The output generator 250 transforms that result into an output that can be displayed, stored, provided to another system for further processing such as an alert, a notification or order, an adjustment in patient care, (e.g., a point of care alert system, an imaging/radiology workstation, a computer-aided diagnosis (CAD) processor, a scheduling system, a medical device, etc.), etc.

The trigger 260 coordinates actions among the data source 210, the AI classifier 220, the data store 230, the comparator 240, and the output generator 250. The trigger 260 can initiate input of data from the data source 210 to the classifier 220, comparison of results from the data store 230 by the comparator 240, output by the output generator 250. Thus, the trigger 260 serves as a coordinator among elements of the apparatus 200.

Figure 3:
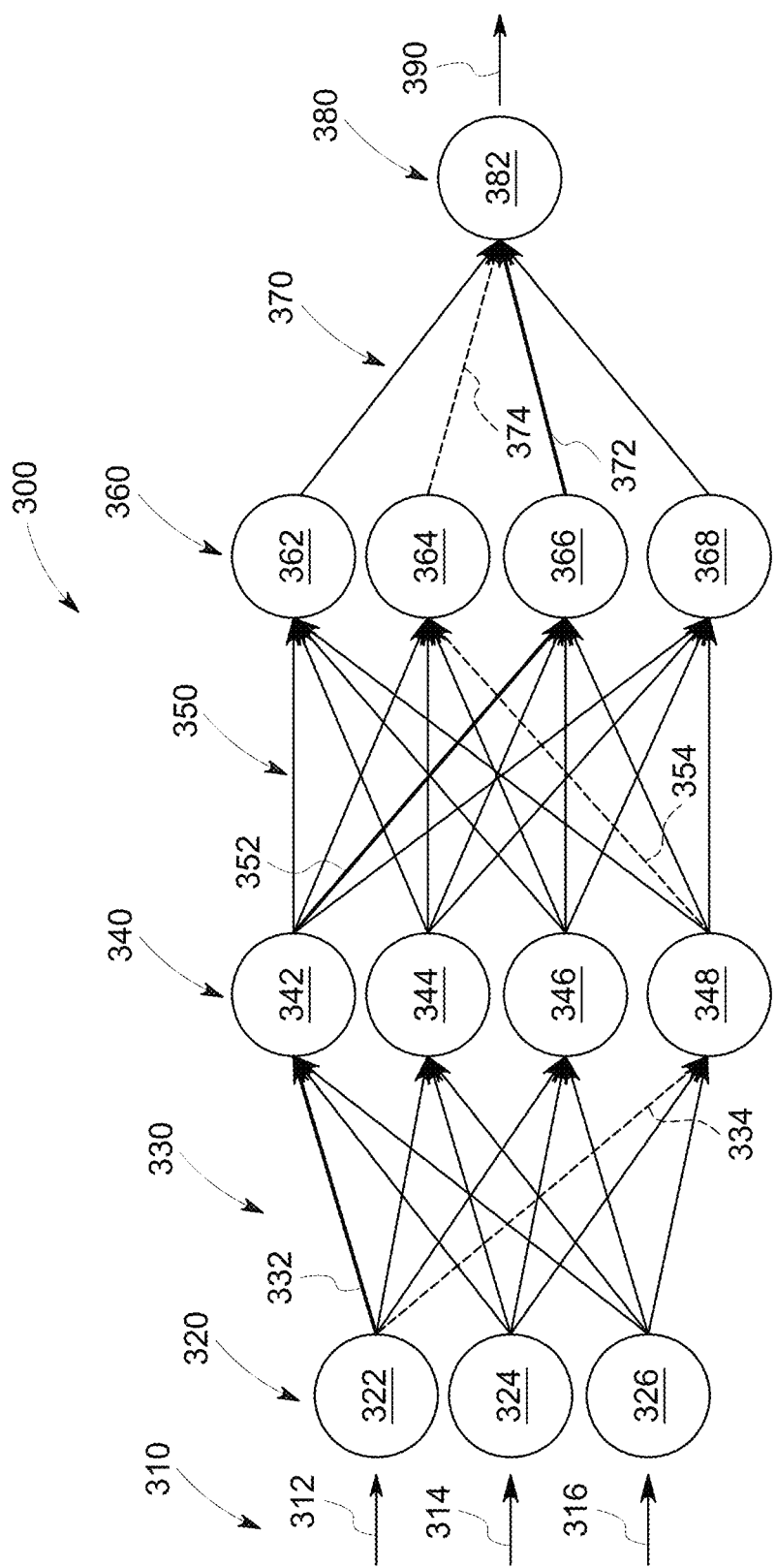
FIG. 3 is a schematic diagram of an embodiment of a learning neural network.

FIG. 3 is a representation of an example learning neural network 300. The example neural network 300 includes layers 320, 340, 360, and 380. The layers 320 and 340 are connected with neural connections 330. The layers 340 and 360 are connected with neural connections 350. The layers 360 and 380 are connected with neural connections 370. Data flows forward via inputs 312, 314, 316 from the input layer 320 to the output layer 380 and to an output 390.

The layer 320 is an input layer that, in the example of FIG. 3, includes a plurality of nodes 322, 324, 326. The layers 340 and 360 are hidden layers and include, in the example of FIG. 3, nodes 342, 344, 346, 348, 362, 364, 366, 368. The neural network 300 may include more or less hidden layers 340 and 360 than shown. The layer 380 is an output layer and includes, in the example of FIG. 3, a node 382 with an output 390. Each input 312-316 corresponds to a node 322-326 of the input layer 320, and each node 322-326 of the input layer 320 has a connection 330 to each node 342-348 of the hidden layer 340. Each node 342-348 of the hidden layer 340 has a connection 350 to each node 362-368 of the hidden layer 360. Each node 362-368 of the hidden layer 360 has a connection 370 to the output layer 380. The output layer 380 has an output 390 to provide an output from the example neural network 300.

Of connections 330, 350, and 370 certain example connections 332, 352, 372 may be given added weight while other example connections 334, 354, 374 may be given less weight in the neural network 300. Input nodes 322-326 are activated through receipt of input data via inputs 312-316, for example. Nodes 342-348 and 362-368 of hidden layers 340 and 360 are activated through the forward flow of data through the network 300 via the connections 330 and 350, respectively. Node 382 of the output layer 380 is activated after data processed in hidden layers 340 and 360 is sent via connections 370. When the output node 382 of the output layer 380 is activated, the node 382 outputs an appropriate value based on processing accomplished in hidden layers 340 and 360 of the neural network 300.

Figure 4:
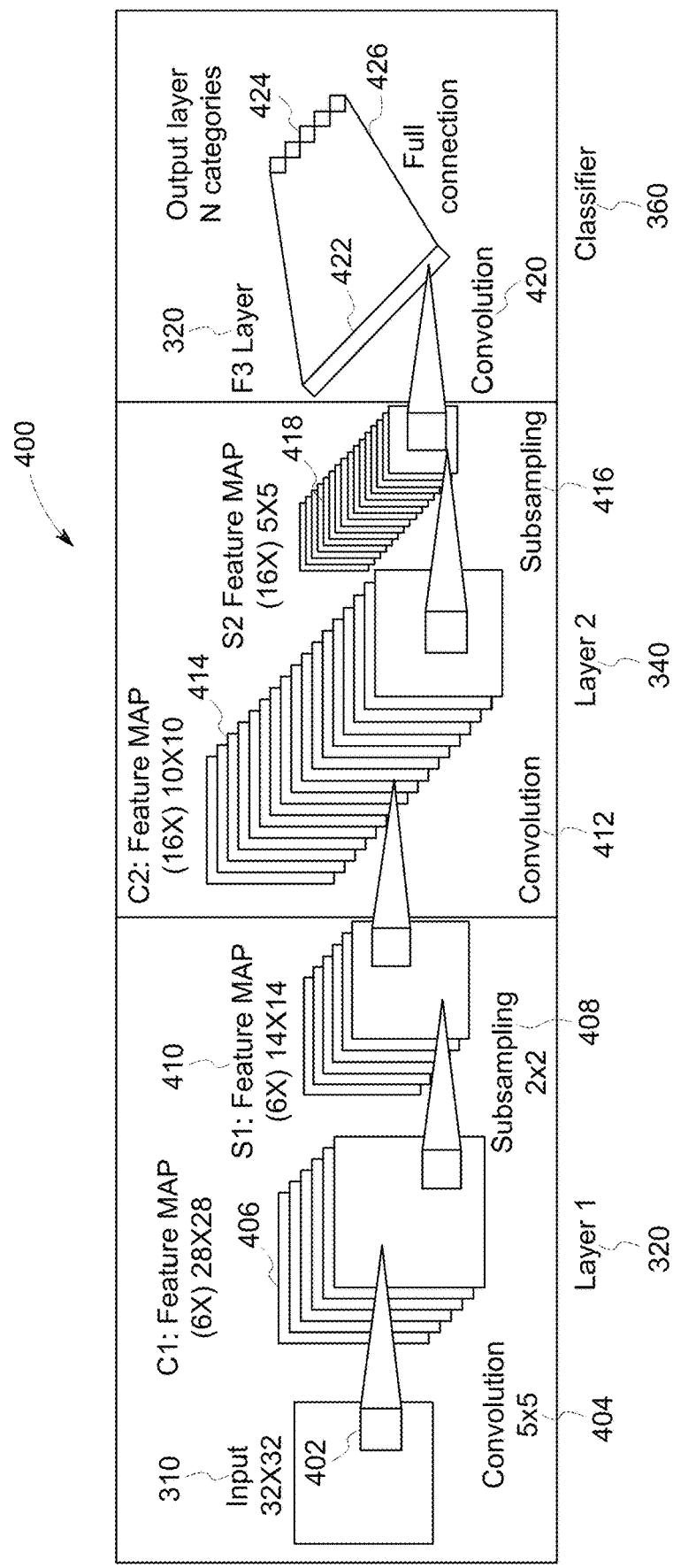
FIG. 4 is a schematic diagram of an embodiment of a particular implementation of the neural network in FIG. 3 as a convolutional neural network.

FIG. 4 illustrates a particular implementation of the example neural network 300 as a convolutional neural network 400. As shown in the example of FIG. 4, an input 310 is provided to the first layer 320 which processes and propagates the input 310 to the second layer 340. The input 310 is further processed in the second layer 340 and propagated to the third layer 360. The third layer 360 categorizes data to be provided to the output layer 380. More specifically, as shown in the example of FIG. 4, a convolution 404 (e.g., a 5×5 convolution, etc.) is applied to a portion or window (also referred to as a "receptive field") 402 of the input 310 (e.g., a 32×32 data input, etc.) in the first layer 320 to provide a feature map 406 (e.g., a (6×) 28×28 feature map, etc.). The convolution 404 maps the elements from the input 310 to the feature map 406. The first layer 320 also provides subsampling (e.g., 2×2 subsampling, etc.) to generate a reduced feature map 410 (e.g., a (6×) 14×14 feature map, etc.). The feature map 410 undergoes a convolution 412 and is propagated from the first layer 320 to the second layer 340, where the feature map 410 becomes an expanded feature map 414 (e.g., a (16×) 10×10 feature map, etc.). After subsampling 416 in the second layer 340, the feature map 414 becomes a reduced feature map 418 (e.g., a (16×) 4×5 feature map, etc.). The feature map 418 undergoes a convolution 420 and is propagated to the third layer 360, where the feature map 418 becomes a classification layer 422 forming an output layer of N categories 424 with connection 426 to the convoluted layer 422, for example.

Figure 5:
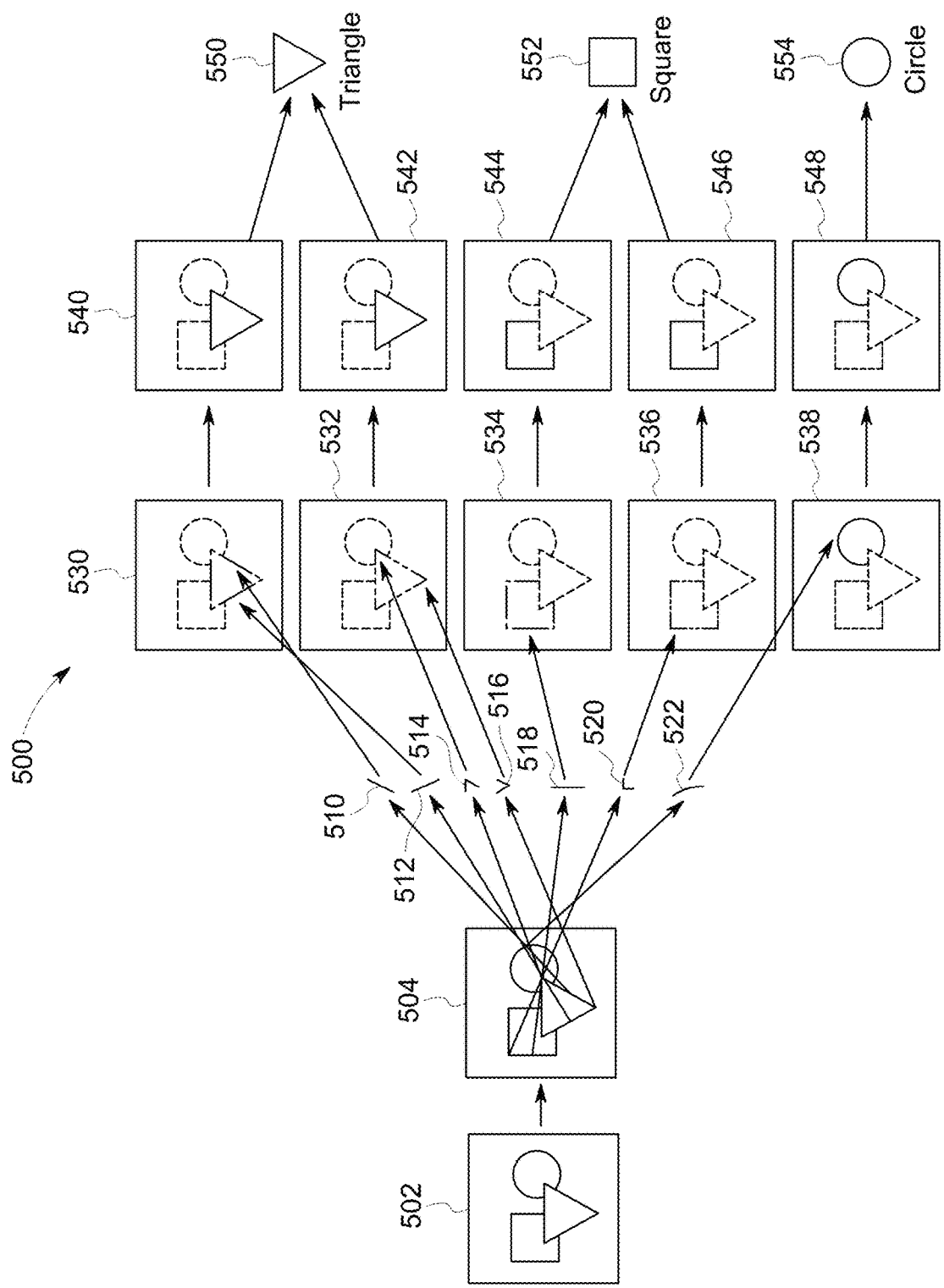
FIG. 5 is a schematic diagram of an embodiment of an image analysis convolutional neural network.

FIG. 5 is a representation of an example implementation of an image analysis convolutional neural network 500. The convolutional neural network 500 receives an input image 502 and abstracts the image in a convolution layer 504 to identify learned features 510-522. In a second convolution layer 530, the image is transformed into a plurality of images 530-538 in which the learned features 510-522 are each accentuated in a respective sub-image 530-538. The images 530-538 are further processed to focus on the features of interest 510-522 in images 540-548. The resulting images 540-548 are then processed through a pooling layer which reduces the size of the images 540-548 to isolate portions 550-554 of the images 540-548 including the features of interest 510-522. Outputs 550-554 of the convolutional neural network 500 receive values from the last non-output layer and classify the image based on the data received from the last non-output layer. In certain examples, the convolutional neural network 500 may contain many different variations of convolution layers, pooling layers, learned features, and outputs, etc.

FIG. 6A illustrates an example configuration 600 to apply a learning (e.g., machine learning, deep learning, etc.) network to process and/or otherwise evaluate an image. Machine learning can be applied to a variety of processes including image acquisition, image reconstruction, image analysis/diagnosis, etc. As shown in the example configuration 600 of FIG. 6A, raw data 610 (e.g., raw data 610 such as sonogram raw data, etc., obtained from an imaging scanner such as an x-ray, computed tomography, ultrasound, magnetic resonance, etc., scanner) is fed into a learning network 620. The learning network 620 processes the data 610 to correlate and/or otherwise combine the raw data 620 into processed data 630 (e.g., a resulting image, etc.) (e.g., a "good quality" image and/or other image providing sufficient quality for diagnosis, etc.). The learning network 620 includes nodes and connections (e.g., pathways) to associate raw data 610 with the processed data 630. The learning network 620 can be a training network that learns the connections and processes feedback to establish connections and identify patterns, for example. The learning network 620 can be a deployed network that is generated from a training network and leverages the connections and patterns established in the training network to take the input raw data 610 and generate the resulting image 630, for example.

Once the learning 620 is trained and produces good images 630 from the raw image data 610, the network 620 can continue the "self-learning" process and refine its performance as it operates. For example, there is "redundancy" in the input data (raw data) 610 and redundancy in the network 620, and the redundancy can be exploited.

If weights assigned to nodes in the learning network 620 are examined, there are likely many connections and nodes with very low weights. The low weights indicate that these connections and nodes contribute little to the overall performance of the learning network 620. Thus, these connections and nodes are redundant. Such redundancy can be evaluated to reduce redundancy in the inputs (raw data) 610. Reducing input 610 redundancy can result in savings in scanner hardware, reduced demands on components, and also reduced exposure dose to the patient, for example.

In deployment, the configuration 600 forms a package including an input definition 610, a trained network 620, and an output definition 630. The package can be deployed and installed with respect to another system, such as an imaging system, analysis engine, etc. An image enhancer 625 can leverage and/or otherwise work with the learning network 620 to process the raw data 610 and provide a result (e.g., processed image data and/or other processed data 630, etc.). The pathways and connections between nodes of the trained learning network 620 enable the image enhancer 625 to process the raw data 610 to form the image and/or other processed data result 630, for example.

As shown in the example of FIG. 6B, the learning network 620 can be chained and/or otherwise combined with a plurality of learning networks 621-623 to form a larger learning network. The combination of networks 620-623 can be used to further refine responses to inputs and/or allocate networks 620-623 to various aspects of a system, for example.

In some examples, in operation, "weak" connections and nodes can initially be set to zero. The learning network 620 then processes its nodes in a retaining process. In certain examples, the nodes and connections that were set to zero are not allowed to change during the retraining. Given the redundancy present in the network 620, it is highly likely that equally good images will be generated. As illustrated in FIG. 6B, after retraining, the learning network 620 becomes DLN 621. The learning network 621 is also examined to identify weak connections and nodes and set them to zero. This further retrained network is learning network 622. The example learning network 622 includes the "zeros" in learning network 621 and the new set of nodes and connections. The learning network 622 continues to repeat the processing until a good image quality is reached at a learning network 623, which is referred to as a "minimum viable net (MVN)". The learning network 623 is a MVN because if additional connections or nodes are attempted to be set to zero in learning network 623, image quality can suffer.

Once the MVN has been obtained with the learning network 623, "zero" regions (e.g., dark irregular regions in a graph) are mapped to the input 610. Each dark zone is likely to map to one or a set of parameters in the input space. For example, one of the zero regions may be linked to the number of views and number of channels in the raw data. Since redundancy in the network 623 corresponding to these parameters can be reduced, there is a highly likelihood that the input data can be reduced and generate equally good output. To reduce input data, new sets of raw data that correspond to the reduced parameters are obtained and run through the learning network 621. The network 620-623 may or may not be simplified, but one or more of the learning networks 620-623 is processed until a "minimum viable input (MVI)" of raw data input 610 is reached. At the MVI, a further reduction in the input raw data 610 may result in reduced image 630 quality. The MVI can result in reduced complexity in data acquisition, less demand on system components, reduced stress on patients (e.g., less breathhold or contrast), and/or reduced dose to patients, for example.

By forcing some of the connections and nodes in the learning networks 620-623 to zero, the network 620-623 builds "collaterals" to compensate. In the process, insight into the topology of the learning network 620-623 is obtained. Note that network 621 and network 622, for example, have different topologies since some nodes and/or connections have been forced to zero. This process of effectively removing connections and nodes from the network extends beyond "deep learning" and can be referred to as "deep-deep learning", for example.

In certain examples, input data processing and deep learning stages can be implemented as separate systems. However, as separate systems, neither module may be aware of a larger input feature evaluation loop to select input parameters of interest/importance. Since input data processing selection matters to produce high-quality outputs, feedback from deep learning systems can be used to perform input parameter selection optimization or improvement via a model. Rather than scanning over an entire set of input parameters to create raw data (e.g., which is brute force and can be expensive), a variation of active learning can be implemented. Using this variation of active learning, a starting parameter space can be determined to produce desired or "best" results in a model. Parameter values can then be randomly decreased to generate raw inputs that decrease the quality of results while still maintaining an acceptable range or threshold of quality and reducing runtime by processing inputs that have little effect on the model's quality.

Figure 7:
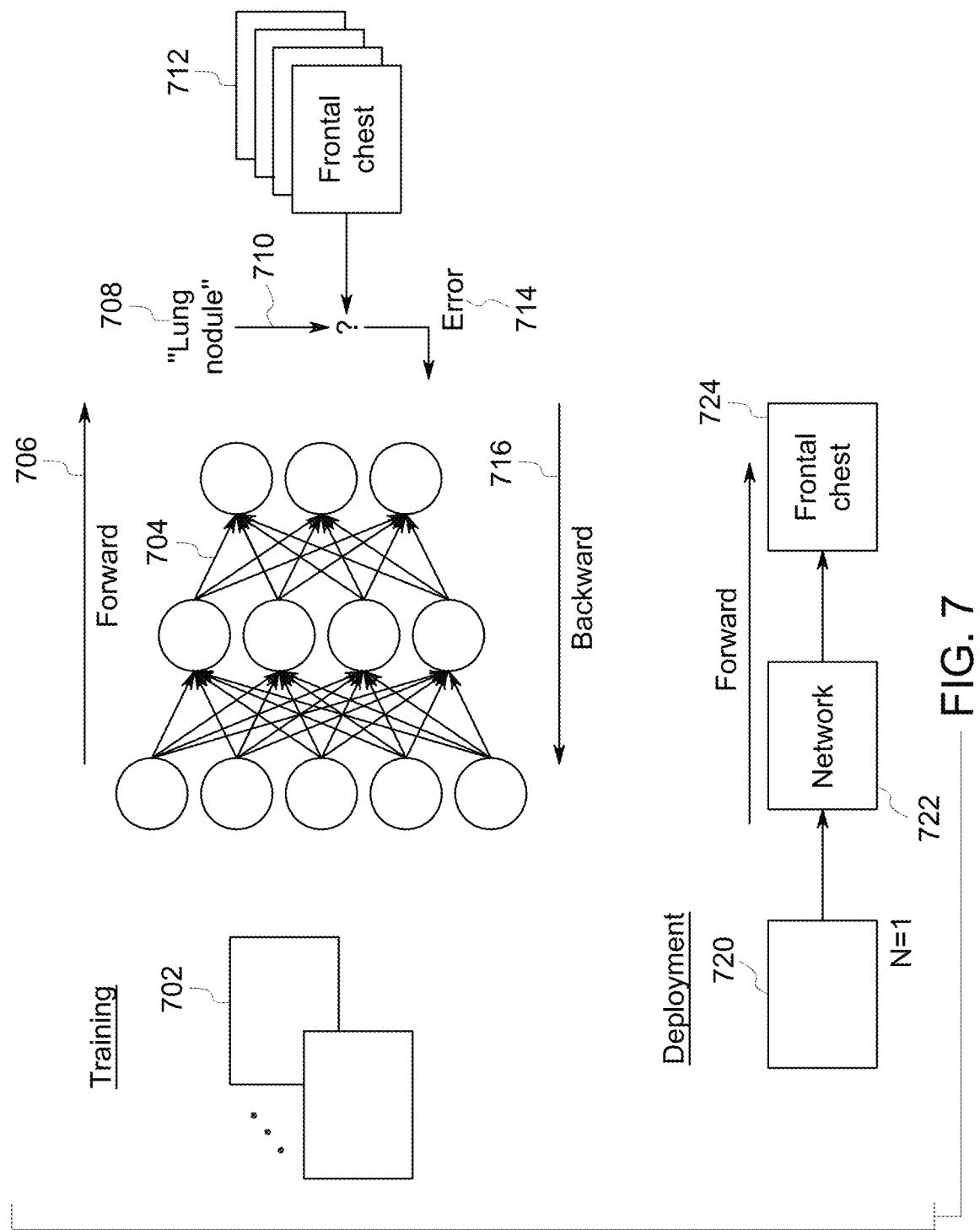
FIG. 7 is a schematic diagram of an embodiment for training and deployment phases of a learning network.

FIG. 7 illustrates example training and deployment phases of a learning network, such as a deep learning or other machine learning network. As shown in the example of FIG. 7, in the training phase, a set of inputs 702 is provided to a network 704 for processing. In this example, the set of inputs 702 can include features of an image to be identified. The network 704 processes the input 702 in a forward direction 706 to associate data elements and identify patterns. The network 704 determines that the input 702 represents a lung nodule 708. In training, the network result 708 is compared 710 to a known outcome 712. In this example, the known outcome 712 is a frontal chest (e.g., the input data set 702 represents a frontal chest identification, not a lung nodule). Since the determination 708 of the network 704 does not match 710 the known outcome 712, an error 714 is generated. The error 714 triggers an analysis of the known outcome 712 and associated data 702 in reverse along a backward pass 716 through the network 704. Thus, the training network 704 learns from forward 706 and backward 716 passes with data 702, 712 through the network 704.

Once the comparison of network output 708 to known output 712 matches 710 according to a certain criterion or threshold (e.g., matches n times, matches greater than x percent, etc.), the training network 704 can be used to generate a network for deployment with an external system. Once deployed, a single input 720 is provided to a deployed learning network 722 to generate an output 724. In this case, based on the training network 704, the deployed network 722 determines that the input 720 is an image of a frontal chest 724. This same approach may be utilized in determining a tube or line, a reference or anatomical landmark, the proper placement of the tube or line, and/or whether a position of the tube or line has changed over time.

Figure 8:
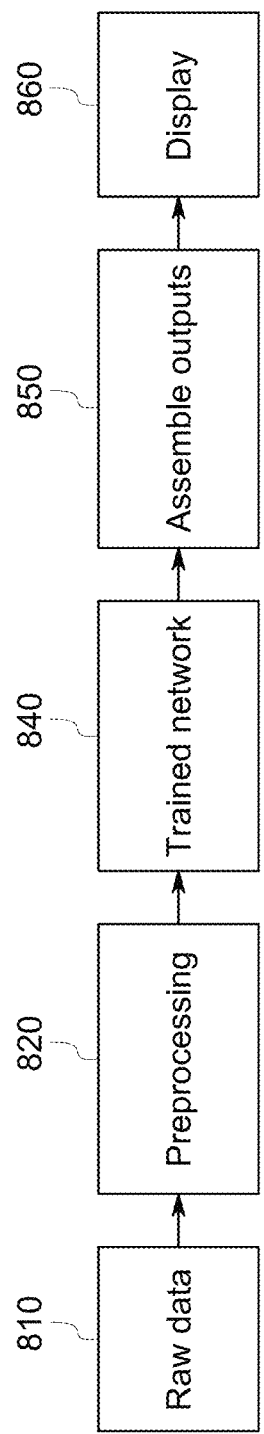
FIG. 8 is a schematic diagram of an embodiment of a product leveraging a trained network package to provide a deep learning product offering.

FIG. 8 illustrates an example product leveraging a trained network package to provide a deep and/or other machine learning product offering. As shown in the example of FIG. 8, an input 810 (e.g., raw data) is provided for preprocessing 820. For example, the raw input data 810 is preprocessed 820 to check format, completeness, etc. Once the data 810 has been preprocessed 820, it is fed into a trained network 840 for processing. Based on learned patterns, nodes, and connections, the trained network 840 determines outputs based on the input patches. The outputs are assembled 850 (e.g., combined and/or otherwise grouped together to generate a usable output, etc.). The output is then displayed 860 and/or otherwise output to a user (e.g., a human user, a clinical system, an imaging modality, a data storage (e.g., cloud storage, local storage, edge device, etc.), etc.).

Figure 9A:
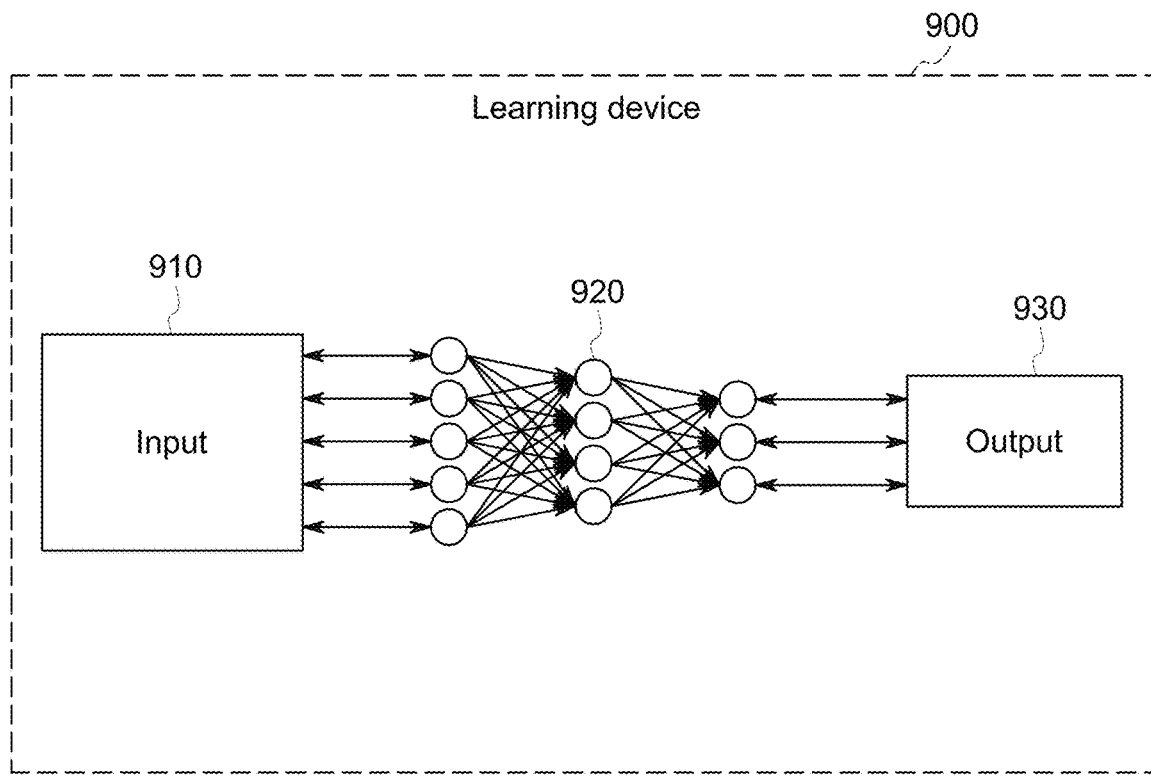
FIGS. 9A-9C are schematic diagrams of respective embodiments of various deep learning device configurations.
Figure 9B:
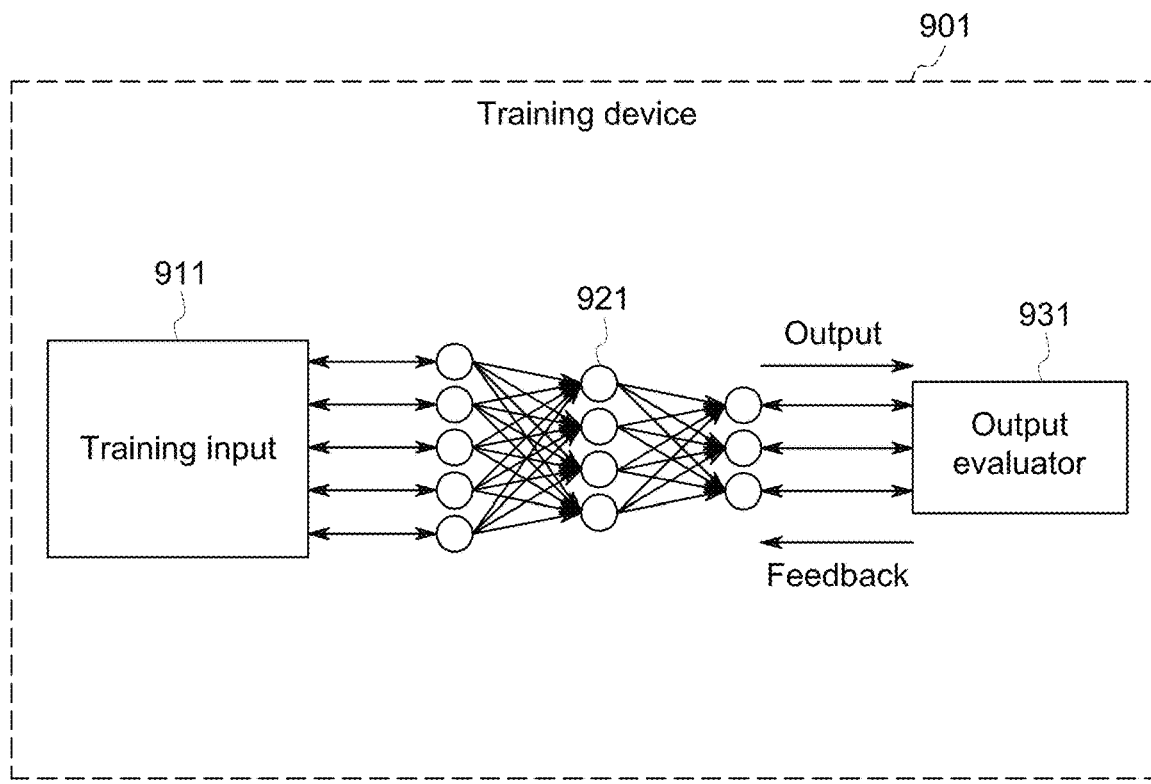
Figure 9C:
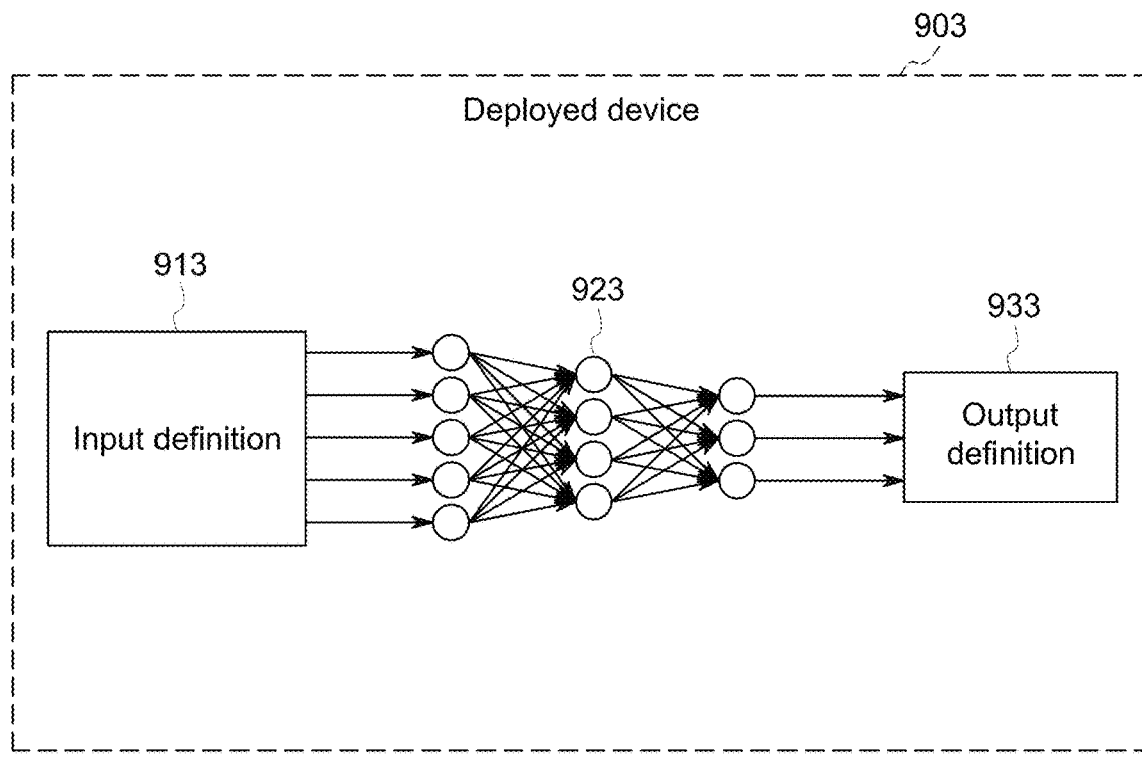

As discussed above, learning networks can be packaged as devices for training, deployment, and application to a variety of systems. FIGS. 9A-9C illustrate various learning device configurations. For example, FIG. 9A shows a general learning device 900. The example device 900 includes an input definition 910, a learning network model 920, and an output definition 930. The input definition 910 can include one or more inputs translating into one or more outputs 930 via the network 920.

FIG. 9B shows an example training device 901. That is, the training device 901 is an example of the device 900 configured as a training learning network device. In the example of FIG. 9B, a plurality of training inputs 911 are provided to a network 921 to develop connections in the network 921 and provide an output to be evaluated by an output evaluator 931. Feedback is then provided by the output evaluator 931 into the network 921 to further develop (e.g., train) the network 921. Additional input 911 can be provided to the network 921 until the output evaluator 931 determines that the network 921 is trained (e.g., the output has satisfied a known correlation of input to output according to a certain threshold, margin of error, etc.).

FIG. 9C depicts an example deployed device 903. Once the training device 901 has learned to a requisite level, the training device 901 can be deployed for use. While the training device 901 processes multiple inputs to learn, the deployed device 903 processes a single input to determine an output, for example. As shown in the example of FIG. 9C, the deployed device 903 includes an input definition 913, a trained network 923, and an output definition 933. The trained network 923 can be generated from the network 921 once the network 921 has been sufficiently trained, for example. The deployed device 903 receives a system input 913 and processes the input 913 via the network 923 to generate an output 933, which can then be used by a system with which the deployed device 903 has been associated, for example.

In certain examples, condition identification (e.g., placement of a tube or line) and progression can be determined through AI-driven analysis of associated image data for a patient.

Figure 10:
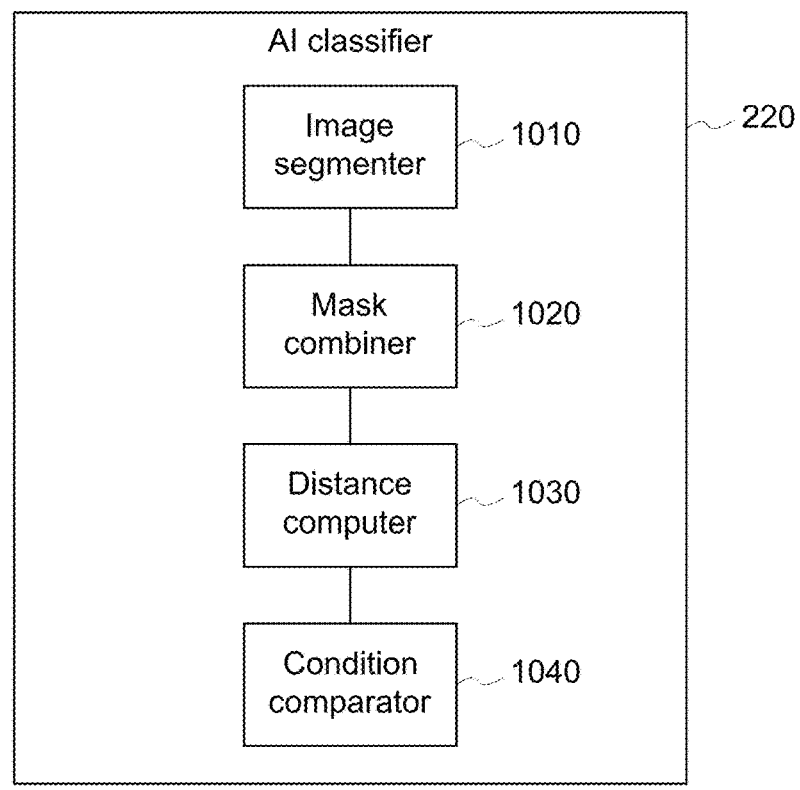
FIG. 10 is a schematic diagram of an embodiment of an implementation of the artificial intelligence classifier of FIG. 2 to process image data to be used by an artificial intelligence model to quantify a condition.

FIG. 10 illustrates an example implementation of the AI classifier 220 to process image data to be used by an AI model to quantify a condition (e.g., placement of a tube or line and/or positional changes of a placed tube or line). The example implementation of the classifier 220 enables annotation of one or more images including an organ region and a region of interest within the organ region. The example classifier 220 of FIG. 10 includes an image segmenter 1010, a mask combiner 1020, and a condition comparator 1040.

The example image segmenter 1010 is to identify a first mask and a second mask in an input image. For example, the image segmenter 1010 processes the image to segment a region of interest within an organ region identified in the image to obtain a first mask. The first mask is a segmentation mask and may be embodied as a filter that includes the region of interest in the image and excludes the remainder of the image. The mask can be applied to image data to exclude all but the region of interest, for example. The mask can be obtained using a convolutional neural network model, for example, such as the network 400, 500 shown in FIGS. 4-5, a generative adversarial network, etc. The image segmenter 1010 further processes the image to segment the organ region according to one or more criterion to obtain a second mask. For example, the second mask can represent the organ region, an area of the organ region outside the region of interest, etc.

For example, if the organ region is a lung (and the surrounding area such as the trachea), and the region of interest is a tube or line identified in the trachea, the first mask is generated to identify the medically placed tube or line, and the second mask is generated to identify the entire organ region. In another embodiment, if the organ region is a stomach, and the region of interest is a tube or line identified in the in the stomach, the first mask is generated to identify the medically placed tube or line, and the second mask is generated to identify the entire organ region. In a further embodiment, if the organ region is a heart (and the surrounding area such as veins or other vasculature), and the region of interest is a tube or line identified in a vein or other vasculature near the heart, the first mask is generated to identify the medically placed tube or line, and the second mask is generated to identify the entire organ region. Thus, in regards to a medically placed tube or line, a first mask is generated for the tube or line and a second mask is generated for the entire organ region where the tube or line is placed (e.g., vasculature system, heart, lung, stomach, trachea, chest, pleural space, etc.). It should be appreciated that, in some embodiments, the first mask and the second mask of two or more of the example embodiments above may be combined so as to identify multiple medically placed tubes or lines (e.g., two or more medically placed tubes or lines) within one or more region of interests. In some embodiments, the first mask may include identification of one or more medically placed tubes and the second mask may be generated to identify the region of interest (e.g., organ of interest). The example combiner 1020 combines the first mask and the second mask and associated areas with annotation terms in the image. Annotations can be relative qualification terms to produce quantification. For example, mask areas can be combined with descriptive terms such as foggy, patchy, dense, etc., to compute relative density values for the region of interest and organ region in the image. Image areas (e.g., areas of frontal and lateral images, etc.) can be combined to produce a volume metric, for example.

The example distance computer 1030 determines a distance between a surface of, one or more ports of, and/or an end of an identified tube or line and a reference or anatomical landmark (or determines a position of the tube or line relative to the landmark). The example condition comparator 1040 compares the distance or measured positions to a preset distance or desired position for the type of tube or line and/or region of interest where the tube or line is placed (e.g., in accordance with predetermined rules). Based on this comparison, the condition comparator 1040 can determine whether the tube or line (e.g., one or more features of the tube or line) is properly placed relative to the reference or anatomical landmark.

The example distance computer 1030 may determine a distance between a current detected position of the identified tube or line and a previously detected position of the identified tube or line. For instance, the example distance computer 1030 may determine a distance between a surface of, one or more ports of, and/or an end of an identified tube or line and a surface of, one or more ports of, and/or an end of a previously identified tube or line (or determines a position of the tube or line relative to a previous position of the tube or line). The example condition comparator 1040 compares the distance or measured positions to a preset distance or desired position for the type of tube or line and/or region of interest where the tube or line is placed (e.g., in accordance with predetermined rules). Based on this comparison, the condition comparator 1040 can determine whether the position of the tube or line (e.g., one or more features of the tube or line) has changed (e.g., moved, shifted) relative to the previous position of the tube or line.

Thus, the AI classifier 220 can be configured to annotate a medical image or set of related medical image(s) for AI/machine learning/deep learning/CAD algorithm training, to quantify conditions. Such methods are consistent, repeatable methodologies which could replace common subjective methods of today, enabling automatic, accurate detection of the presence of a medically placed tube or line, its placement (e.g., position), and changes in its position over time.

While example implementations are illustrated in conjunction with FIGS. 1-10, elements, processes and/or devices illustrated in conjunction with FIGS. 1-10 can be combined, divided, re-arranged, omitted, eliminated and/or implemented in any other way. Further, components disclosed and described herein can be implemented by hardware, machine readable instructions, software, firmware and/or any combination of hardware, machine readable instructions, software and/or firmware. Thus, for example, components disclosed and described herein can be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the components is/are hereby expressly defined to include a tangible computer readable storage device or storage disk such as a memory, a digital versatile disk (DVD), a compact disk (CD), a Blu-ray disk, etc. storing the software and/or firmware.

Figure 11:
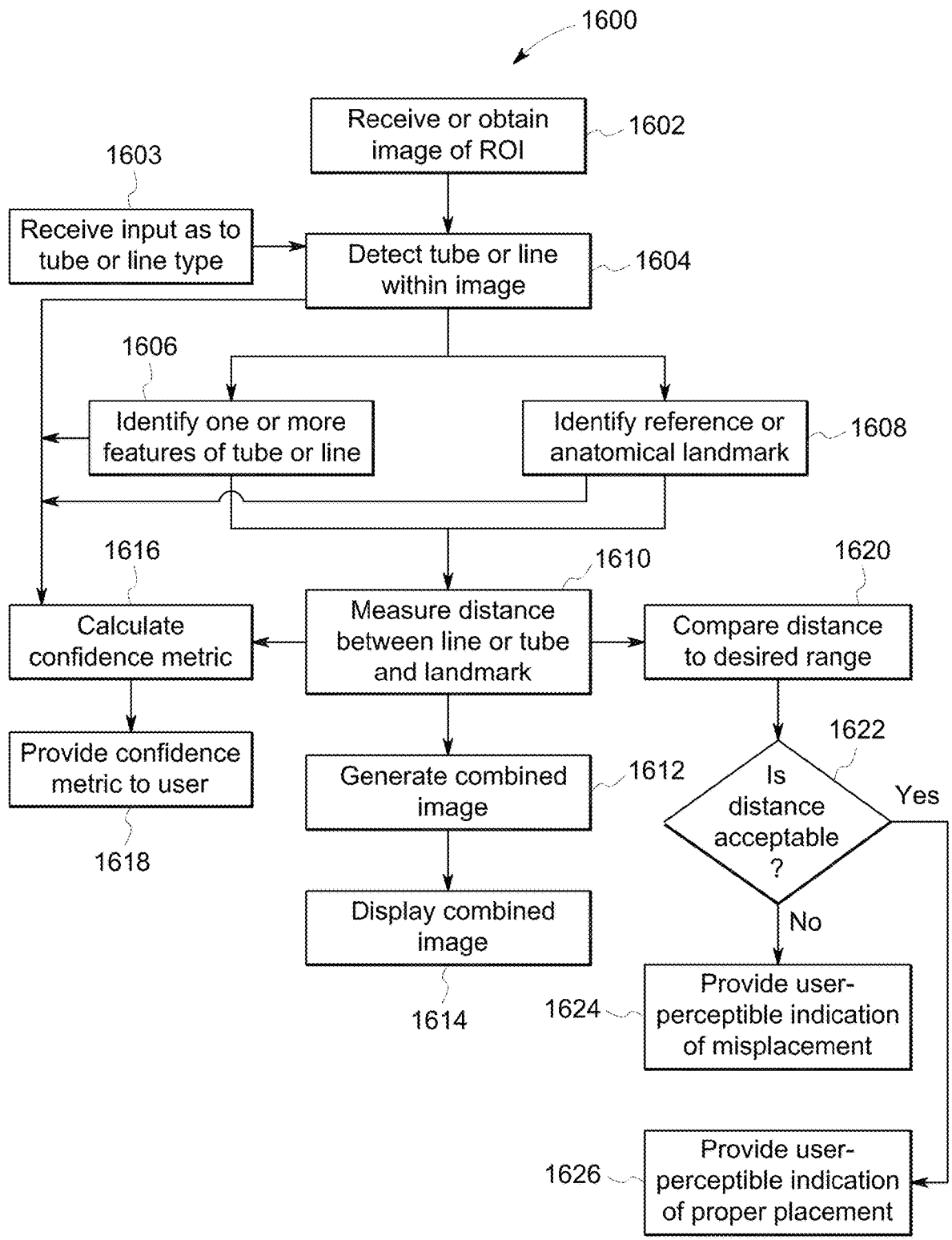
FIG. 11 is a flow diagram of an embodiment of a method for determining a placement of a medically placed tube or line within a region of interest.

A flowchart representative of example machine readable instructions for implementing aspects or embodiments of the presently disclosed techniques described herein are shown in conjunction with at least FIG. 11. In the examples, the machine readable instructions include a program for execution by a processor such as the processor 1312 shown in the example processor platform 1300 discussed below in connection with FIG. 35. The program may be embodied in machine readable instructions stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in conjunction with at least FIG. 11, many other methods of implementing the components disclosed and described herein may alternatively be used. For example, the order of execution of the blocks may be changed, and/or some of the blocks described may be changed, eliminated, or combined. Although the flowchart of at least FIG. 11 depicts an example operation in an illustrated order, these operations are not exhaustive and are not limited to the illustrated order. In addition, various changes and modifications may be made by one skilled in the art within the spirit and scope of the disclosure. For example, blocks illustrated in the flowchart may be performed in an alternative order or may be performed in parallel.

As mentioned above, the example processes of at least FIG. 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of at least FIG. 11 can be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. In addition, the term "including" is open-ended in the same manner as the term "comprising" is open-ended.

As mentioned above, these techniques may be utilized to identify a medically placed tube or line and to determine if medically placed tube or line is properly placed. For example, the medically placed tube or line may be an enteric tube and the proper placement of the enteric tube may be determined. Such examples are intended to be non-limiting, and any other tube or line inserted within a region of interest of the body may be identified and its proper placement determined.

FIG. 11 is a flow diagram of an embodiment of a method 1600 for determining a placement of a medically placed tube or line within a region of interest. One or more steps of the method may be performed by the processor platform 1300 in FIG. 35. One or more steps of the depicted steps may be performed simultaneously or in a different order from what is illustrated in FIG. 11. The method 1600 includes receiving or obtaining one or more images (e.g., chest image, abdominal image, frontal image, lateral image) of a patient that includes a region of interest (ROI) (block 1602). The one or more images may include a medically placed tube or line inserted within the region of interest. The one or more images may be provided while the patient has the tube or line inserted. Furthermore, in some embodiments, when receiving two or more images, the two or more images may be combined into a single image or overlaid into a composite image of the two or more images. The images may depict one or more regions of interest of a patient, such as an abdominal image or a chest image, where the medically placed tube or line may be located. In particular, the medically placed tube or line may extend over multiple anatomical areas, and each image of two or more images may include a depiction of a portion of the medically placed tube or line and/or a portion of the one or more features of the medically placed tube or line. Thus, each image of the two or more images may contain partial information (e.g., data, assessments, measurements) associated with the tube placement. For example, a chest image may depict a portion of the medically placed tube or line that bisects the airways and/or include information associated with determine whether the medically placed tube or line bisects the airways. Thus, the chest image and associated information may be used to confirm that the tube is not located in the airways. Whereas, an abdominal image may depict a portion of the medically placed tube or line below the diaphragm and/or include information associated with determining whether one or more features of the tube or line (e.g., side ports, end ports, tip and/or end of the tube or line) are located at an acceptable distance below the diaphragm. Therefore, in combining the chest and abdominal images and/or the information associated with the chest and abdominal images into a signal image and/or a composite image may provide for a more complete assessment of the placement of the medically placed tube or line.

As discussed with reference to FIG. 12, when combining a chest image and an abdominal image, a portion of the chest image may be combined with a portion of the abdominal image. For example, a portion of the chest image including a region above diaphragm may be combined with a portion of the abdominal image including a region below diaphragm. In some instances, an elastic transformation may be applied on the chest image and/or the abdominal image to enable a detected tube or line (e.g., one or more features of the tube or line) and/or detected references or anatomical landmarks (e.g., one or more features of the references or anatomical landmarks) to visually align. For example, elastic transformation may be applied to the portion of the chest image such that a detected diaphragm of the portion chest image visually aligns with a detected diaphragm of the abdominal image. As illustrated in FIG. 13, the portions of two or more images may then be combined (e.g., concatenated) at the detected tube or line (e.g., one or more features of the tube or line) and/or the detected references or anatomical landmarks (e.g., one or more features of the references or anatomical landmarks) to produce the combined image.

Additionally, the images may depict varying perspectives (e.g., frontal, lateral, abdominal, chest) of the one or more regions of interest. Combining or overlaying the two or more images may enhance a view of the tube or line within the region of interest, improve subsequent measurement accuracy, and provide more information regarding a position of the tube or line for a more complete assessment of the tube or line placement. Furthermore, one or more visual adjustments of the images may be implemented to produce a combined display of the images that enhances the view of the tube or line with in the region of the interest. In particular, when combining one or more images of varying perspectives of a region of interest, the images may be aligned according to one or more detected features of the tube or line and/or one or more anatomical features detected within the images. For example, when combining a frontal image and a lateral image of a region of interest, the frontal and lateral images may be displayed side by side and visually aligned such that a height of the respective detected diaphragms of each image are relatively the same in the displayed image. Additionally or alternatively, a geometrical magnification of one or more images of varying perspectives may be adjusted such that when the combined image is displayed, the geometrical magnification of each image of the combined image is visually similar (e.g., relatively the same, equal). For example, a geometrical magnification of a respective frontal image and/or chest image may be adjusted, such that the display of the combined frontal image and a lateral images disposed next to each other may have corresponding (e.g., similar, equal) geometrical magnifications. The one or more visual adjustments to the combined frontal and lateral images may enable improved view and/or comparison of the images and thus provide for a more accurate assessment of the placement of the tube or line within the region of interest.

The method 1600 also includes receiving or obtaining an input regarding the type of tube or line to be detected (e.g., a nasogastric or other enteric tube) and/or the region of interest for tube or line to be inserted within (e.g., trachea, stomach, gastrointestinal tract) (block 1603). The input may be a user defined distance or rules for defining the proper placement of the end of the medically placed tube or line relative to a reference or anatomical location. In certain embodiments, the input may simply be the type of tube or line and/or the desired region of interest for the tube or line to be properly placed within. Based on this input, certain defined distances or rules (e.g., left, right, above, and/or below a specific anatomical location) may be utilized that define a proper placement of the one or more features of the tube or line (e.g., surfaces, one or more ports, and/or distal end of the specific tube or line) within a specific region of interest. The method 1600 also includes detecting the tube or line within the image (block 1604) utilizing the techniques described herein. The method 1600 includes identifying one or more features of the tube or line, such as a surface, one or more ports (e.g., side ports, end ports), and/or an end (e.g., distal end) of the tube or line within the region of interest in the image (block 1606). The method 1600 also includes identifying a reference or anatomical landmark within the image (block 1608). The reference or anatomical landmark will vary based on the type of tube or line utilized and the region of interest that the tube or line is disposed within. For example, for a nasogastric tube, the reference or anatomical landmark(s) may include, but are not limited to a patient's airway and diaphragm and/or a location within the stomach below the gastroesophageal junction.

Upon identifying the surfaces, the one or more ports, and/or distal end of the tube or line and the reference or anatomical landmark(s), the method 1600 may include measuring a distance (e.g., between the end of the tube or line and the reference or anatomical landmark) (block 1610) that may be reported to a user and/or used in automated placement evaluation. The method 1600 includes generating a combined image with indications of the tube or line, the reference or anatomical landmark(s), and/or the measured distance (block 1612). Generating the combined image may include image processing, such as Contrast Limited Adaptive Histogram Equalization (CLAHE), unsharp masking, or another contrast or line enhancement techniques to enhancing (e.g., increasing, adjusting, changing) the contrast of the detected tube or line and/or the reference or anatomical landmarks to enhance visibility of these features in the combined image. In addition, generating the combined image includes superimposing various markers on the received image of the patient. In particular, a color coding (e.g., color coded graphical overlay) may be superimposed on the detected tube or line and/or one or more portions of the detected tube or line. For example, a portion of the detected tube or line below the diaphragm may be color coded (e.g., highlighted) in a first color different than a second color used to color coded a portion of the detected tube or line located above the diaphragm. In certain embodiments, the patient may include more than one tube or line and the tube or line of interest is color coded. Enhancing the contrast and/or utilizing one or more color coding (e.g., highlighting) may enable greater distinction between particular features of the tube or line in the combine image. Thus, the enhanced contrast and/or color coding may aid in clarifying relevant image elements of the combined image utilized to access placement of the tube or line.

Graphical markers may be superimposed on the image to indicate the end of the tube or line and/or the one or more ports of the tube or line (e.g., side ports, end ports). Other graphical markers may be superimposed on the image to indicate the reference or anatomical landmark. The graphical markers may include the same shape or different shapes. Non-limiting examples of the shapes may be an open circle or other elliptical shape, open rectilinear shape, open triangular shape, or another shape. The graphical marker(s)

and/or the tube may be color coded with different colors. For example, the graphical marker for the tube or line, the graphical marker for the reference or anatomical landmark, and the tube or line may be green, blue, and yellow, respectively. A graphical marker may also be superimposed on the image indicating a distance, such as between the one or more features of the tube or line (e.g., distal end of the tube or line, the one or more ports, proximal end of the tube) and the reference or anatomical landmark when a distance is calculated. The graphical marker for the distance may also include the measurement value. The method 1600 further includes displaying the combined image on a display (block 1614). The combined image may be displayed in real-time to the medical personnel enabling them to adjust the placement of the tube or line if need be. In certain embodiments, the combined image may be displayed as a DICOM image.

In addition, as discussed herein, generating the combined image may include combining two or more images (e.g., received images) into a single image or overlaid into a composite image of the two or more images. The images may depict one or more regions of interest of a patient, such as an abdominal image or a chest image, where the medically placed tube or line may be located. Additionally, the images may depict varying perspectives (e.g., frontal, lateral, abdominal, chest) of the one or more regions of interest. Combining or overlaying (e.g., displaying) the two or more images may enhance a view of the tube or line within the patient, improve subsequent measurement accuracy, and provide more information regarding a position of the tube or line for a more complete assessment of the tube or line placement.

Figure 12:
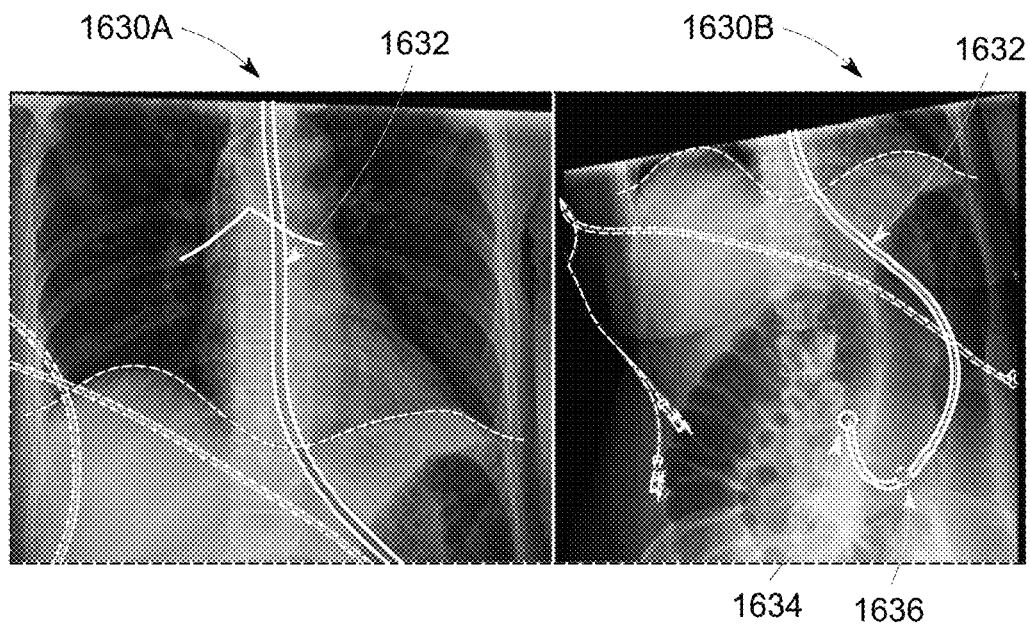
FIG. 12 is an example of images of varying regions of interest identifying a tube or line within a patient.
Figure 13:
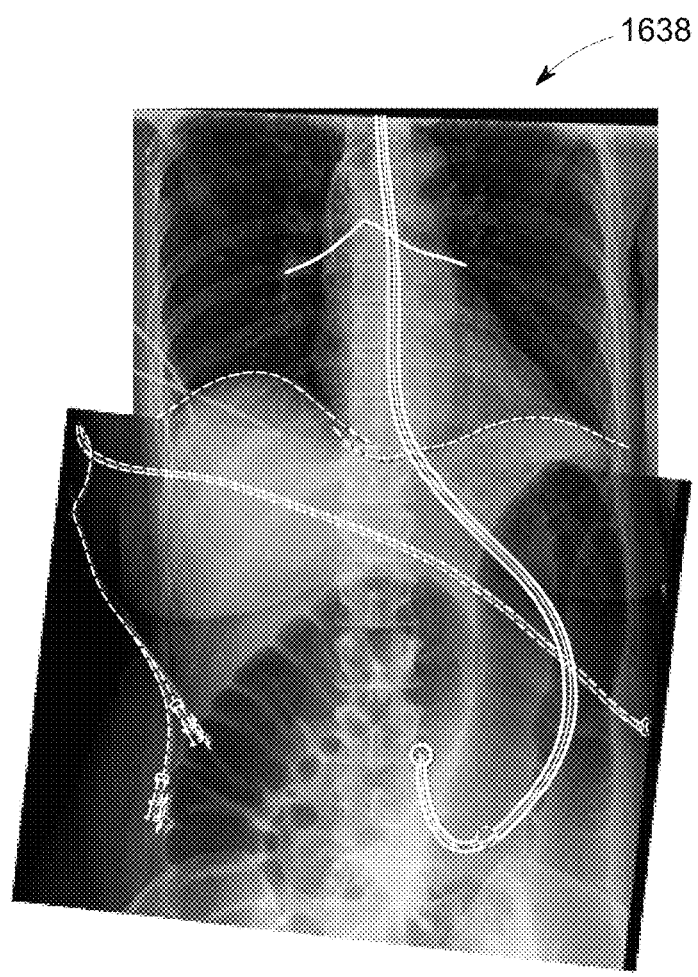
FIG. 13 is an example of a composite image identifying a tube or line within a patient.

By way of example, FIG. 12 depicts a chest image 1630A and an abdominal image 1630B of a patient taken in a relatively short time frame (e.g., within the same examination or scanning session) where a medically placed tube or line 1632 is identified (e.g., highlighted, color-coded, detected) using the techniques discusses herein. In particular, a proximal most portion of the tube or line 1632 (e.g., above the diaphragm) may be viewed in the chest image 1630A and the distal most portion of the tube or line 1632 (e.g., below the diaphragm) including the end and/or tip 1634 and a side port 1636 of the tube or line 1632 may be in the abdominal image 1630B. The two images depicting different regions of interest may be combined into a single composite image 1638, as illustrated by FIG. 13, to enhance a view of the tube or line within the patient, improve subsequent measurement accuracy, and provide more information regarding a position of the tube or line for a more complete assessment of the tube or line placement. In some embodiments, respective information (e.g., data, measurements, assessments, tube placement characterizations) associated with each of the two or more images may be combined to provide more accurate information regarding a position of the tube or line for a more complete assessment of the tube or line placement.

Figure 14:
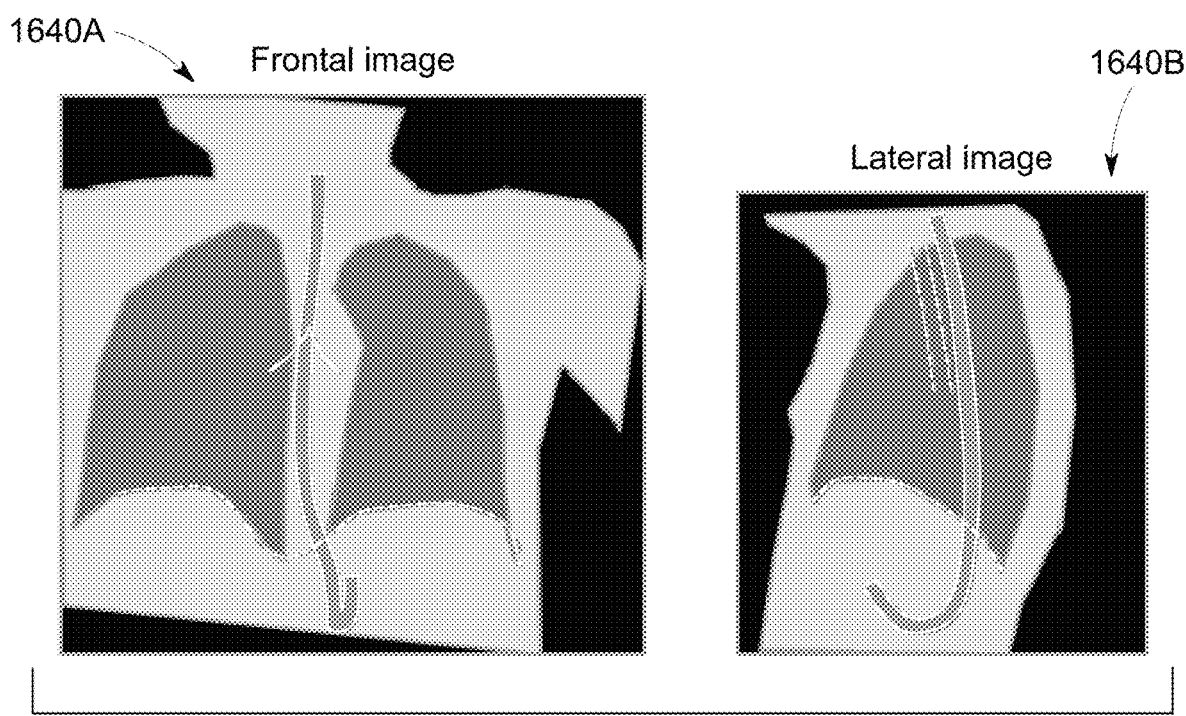
FIG. 14 is an example of images of varying perspectives of a region of interest of a patient.

In addition, two or more images taken in a relatively short time frame of varying perspectives, such as a frontal image of the chest region 1640A and a lateral image of the chest region 1640B illustrated in FIG. 14, may be combined into a three-dimensional (3D) composite image. In particular, two or more images taken of varying perspectives of a region of interest and/or associated information (e.g., data, measurements, assessments) of the images may be combined and enable reconstruction of a pathway of the tube or line (e.g., a 3D pathway) to enable more precise and/or accurate distance measurements, such as length estimation of the curve of the tube or line below the diaphragm. In addition, as discussed herein, the two or more images may be aligned based on respective diaphragm levels. Combining or overlaying (e.g., displaying) the two or more images may enhance a view of the tube or line within the patient by creating a more precise depth assessment (e.g., via a 3D image). In particular, certain features of the tube or line and/or the references or anatomical landmarks within the region of interest may be more accurately accessed in the composite 3D image, which includes a combination of respective varying views (e.g., perspectives) of the images. For example, an estimation of an intersection point where the tube or line bisects the diaphragm may be less accurate from a frontal image alone due to a curvature of the diagram. However, combining the frontal image with a lateral image may enable a more precise estimation of the intersection point, and additionally improve subsequent measurement accuracy, and provide more information regarding a position of the tube or line for a more complete assessment of the tube or line placement. In some embodiments, respective information (e.g., data, measurements, assessments, tube placement characterizations) associated with each of the two or more images of varying perspectives may be combined to provide more accurate information regarding a position of the tube or line for a more complete assessment of the tube or line placement.

Returning to FIG. 11, in certain embodiments, the method 1600 includes calculating one or more respective confidence metrics (block 1616). The confidence metrics may be for the calculated distance, for the determination of the presence of the medically placed tube or line, for an accuracy in detecting the placement of the tube or line, and/or for an accuracy in detecting the reference or anatomical landmark. The confidence metric may include a confidence level or confidence interval. The confidence metric may be stored for future reference. In certain embodiments, the method 1600 may include providing one or more of the confidence metrics to a user (block 1618). For example, the confidence metrics may be displayed on the combined image or provided on a separate device (e.g., user's device). In certain embodiments, the confidence metrics may be written into a standard or private information tag (e.g., DICOM) and made visible in subsequent information systems that the image is sent too (e.g., PACS).

In certain embodiments, in determining whether the medically placed tube or line is placed properly (e.g., via the deep learning networks models), the method 1600 includes comparing the measured distance between the one or more features of the tube or line (e.g., the surface, the one or more ports, and/or end of the tube or line) and the reference or anatomical landmark to a desired threshold (block 1620) and determining if the distance is acceptable (block 1622). The desired threshold may represent an acceptable range for the distance between the tube or line and the reference or anatomical landmark for the tube or line to be correctly placed. For example, for a nasogastric tube, the desired threshold may be a range of distance below the gastroesophageal junction. If the measured distance is not acceptable, the method 1600 includes providing a user-perceptible indication of misplacement (block 1624). The indication may be provided on the display where the combined image is displayed or provided on another device (e.g., the user's device). The indication may be text stating that the tube or line is misplaced. In certain embodiments, the text may be more specific and state the tube or line is too high or too low or otherwise improper. In certain embodiments, the text may provide further instructions (e.g., to raise or lower the end of the tube or line a certain distance). In some embodiments, the text may be color coded (e.g., in orange or red) to further indicate the misplacement. In some embodiments, the indication may be provided via color coding of one or more graphical markers of the one or more features of the tube or line or via color coding of the reference or anatomical landmark displayed on the combined image. For the example, one or more of the graphical markers (e.g., for the end of tube or line, for the one or more ports, for a portion of the tube or line, for the reference or anatomical landmark, and/or the indication of the measured distance there between) and/or the tube or line may be color coded a specific color (e.g., red or orange) to indicate the misplacement. Alternatively or in addition, one or more of the graphical markers may flash or otherwise be visually highlighted if the tube or line is misplaced. If the measured distance is acceptable, the method 1600 includes providing a user-perceptible indication of proper placement of the tube or line (block 1626). The indication may be provided on the display where the combined image is displayed or provided on another device (e.g., the user's device). The indication for proper placement may be text stating the tube or line is properly placed. In certain embodiments, the indication for proper placement may be provided via color coding one or more graphical markers of the one or more features of the tube or line displayed on the combined image (e.g., all the graphical markers and/or the tube or line may be color coded green). In certain embodiments, the indication of proper placement or misplacement may be written into a standard or private information tag (e.g., DICOM) and made visible in subsequent information systems that the image is sent too (e.g., PACS). In certain embodiments, the determination as to whether the medically placed tube or line is properly placed or positioned may be manually done by the medical personnel viewing the displayed combined image.

As mentioned above, these techniques may be utilized to identify a medically placed tube or line and to determine if medically placed tube or line is properly placed. For example, the medically placed tube or line may be an enteric tube and the proper placement of the enteric tube may be determined. In addition, these techniques may be utilized to identify changes in a position and/or placement of the medically placed tube or line over time. Such examples are intended to be non-limiting, and any other tube or line inserted within a region of interest of the body may be identified and its proper placement determined.

Figure 15:
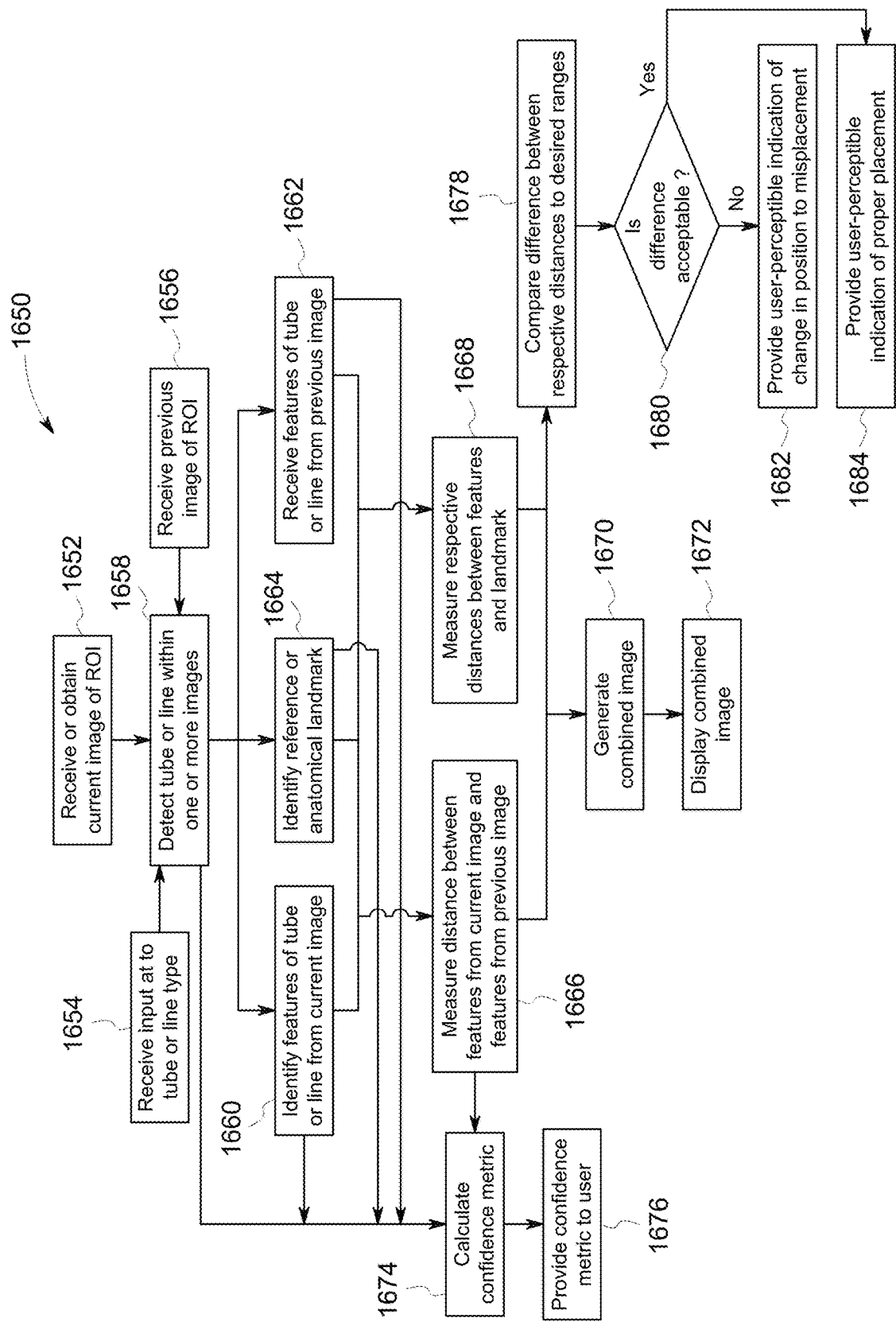
FIG. 15 is a flow diagram of an embodiment of a method for determining positional changes of a medically placed tube or line within a region of interest.

FIG. 15 is a flow diagram of an embodiment of a method 1650 for determining a change (e.g., shift, movement, migration) in a position of a medically placed tube or line within a region of interest over time. One or more steps of the method may be performed by the processor platform 1300 in FIG. 49. One or more steps of the depicted steps may be performed simultaneously or in a different order from what is illustrated in FIG. 15. The method 1650 includes receiving or obtaining one or more current images (e.g., chest image, abdominal image, frontal image, lateral image) of a patient that includes a region of interest (ROI) (block 1652). The one or more current images may include a medically placed tube or line inserted within the region of interest. The one or more current images may be provided while the patient has the tube or line inserted. Furthermore, in some embodiments, when receiving two or more current images, the two or more current images may be combined into a single current image or overlaid into a composite current image of the two or more current images. Combining or overlaying the two or more current images may enhance a view of the tube or line within the region of interest, improve subsequent measurement accuracy, and provide more information regarding a position of the tube or line for a more complete assessment of the tube or line placement.

The method 1650 also includes receiving or obtaining an input regarding the type of tube or line to be detected (e.g., a nasogastric or other enteric tube) and/or the region of interest for tube or line to be inserted within (e.g., trachea, stomach, gastrointestinal tract) (block 1654). The input may be a user defined distance or rules for defining the proper placement of the end of the medically placed tube or line relative to a reference or anatomical location. In certain embodiments, the input may simply be the type of tube or line and/or the desired region of interest for the tube or line to be properly placed within. Based on this input, certain defined distances or rules (e.g., left, right, above, and/or below a specific anatomical location) may be utilized that define a proper placement of the one or more features of the tube or line (e.g., surfaces, one or more ports, and/or distal end of the specific tube or line) within a specific region of interest. The method 1650 also includes receiving one or more previously stored images of the patient that include the medically placed tube or line as previously placed within the region of interest (block 1656). The one or more previously stored images may be received or accessed from a local memory 1313 (e.g., a cache), and/or a main memory including a volatile memory 1314 and a non-volatile memory 1316 via a bus 1318, as illustrated in the processor platform 1300 of FIG. 35. Information (e.g., images, data, measurements) associated with the one or more previously stored images may also be received and include a previously detected position (e.g., placement) of the tube or line, one or more previously calculated measurements, and/or a characterization of the detected position (e.g., properly positioned, malpositioned, deviated, undeviated etc).

The method 1650 also includes detecting the tube or line within the current image(s) (block 1658) utilizing the techniques described herein. The method 1650 includes identifying one or more features of the tube or line, such as a surface, one or more ports (e.g., side ports, end ports), and/or an end (e.g., distal end) of the tube or line within the region of interest in the image (block 1660). The method 1650 also includes receiving identifying information (e.g., data) for one or more features of the previously placed tube or line (e.g., surfaces, one or more ports, and/or an end of the previously detected tube or line) in the one or more previously stored images (block 1662). The identifying information may be received in combination with receiving the one or more previously stored images (at block 1656) associated with the patient that include the tube or line as previously placed. In some embodiments, the processor platform 1300 may identify the one or more features (e.g., surfaces, one or more ports, and/or an end of the previously detected tube or line) of the previously placed tube or line in the one or more previously stored images. Upon identifying the surfaces, the one or more ports and/or distal end of the tube or line of the current image(s) and identifying and/or receiving identifying information regarding the surfaces, the one or more ports and/or distal end of the previously placed tube or line of the one or more previously stored images, the method 1600 may include measuring a distance (e.g., between the one or more features of the tube or line of the current image(s) and the one or more features of the previously placed tube or line of the one or more previously stored images) (block 1666) that may be reported to a user and/or used in automated placement evaluation.

Additionally, the method 1650 may also include identifying a reference or anatomical landmark within the current image(s) and/or within the one or more previously stored images (block 1664). In some embodiments, identifying information regarding the reference or anatomical landmark within the one or more previously stored images may be received in combination with the receiving the one or more previously stored images (at block 1656) associated with the patient that include the previously placed tube or line. The reference or anatomical landmark will vary based on the type of tube or line utilized and the region of interest that the tube or line is disposed within. For example, for a nasogastric tube, the reference or anatomical landmark(s) may include, but are not limited to a patient's airway and diaphragm and/or a location within the stomach below the gastroesophageal junction. Upon identifying and/or receiving identifying information regarding the reference or anatomical landmark(s) of the respective current image(s) and/or the one or more previously stored images, the method 1650 may include measuring a respective distance (e.g., between the one or more features of the tube or line and the reference or anatomical landmark of the current image(s), and between the one or more features of the previously placed tube or line and the reference or anatomical landmark identified within the one or more previously stored images) (block 1668) that may be reported to a user and/or used in automated placement evaluation.

The method 1650 includes generating a combined image with indications of the currently placed tube or line, the previously placed tube or line, the reference or anatomical landmark(s) of the current image, the reference or anatomical landmark(s) of the one or more previously stored images, and/or the respective measured distances (block 1670). Generating the combined image includes combining the current image (e.g., combined and/or composite image of the one or more current images) and the one or more previously stored images. Generating the combined image may also include enhancing (e.g., increasing) the overall contrast of the image, the detected tube or line, the previously placed tube or line, and/or the reference or anatomical landmarks to enhance visibility of these features in the combined image. Additionally, the combined image includes superimposing various markers on the combined image of the current image(s) and the one or more previously stored images. For example, a color coding (e.g., color coded graphical overlay) may be superimposed on the detected tube or line, the previously placed tube or line, and/or one or more portions of the detected tube or line and/or the previously placed tube or line. For example, a portion of the detected tube or line below the diaphragm may be color coded (e.g., highlighted) in a first color different than a second color used to color coded a portion of the detected tube or line located above the diaphragm. In certain embodiments, the patient may include more than one tube or line and the tube or line of interest is color coded. Enhancing the contrast and/or utilizing one or more color coding (e.g., highlighting) may enable greater distinction between particular features of the tube or line and/or the previously placed tube or line in the combine image. Thus, the enhanced contrast and/or color coding may aid in clarifying relevant image elements of the combined image utilized to access placement of the tube or line and/or a change in position of the tube or line over time.

As discussed herein, graphical markers may be superimposed on the image to indicate the one or more features (e.g., the end, the one or more ports, the surfaces) of the tube or line and/or of the previously placed tube or line. Other graphical markers may be superimposed on the image to indicate the reference or anatomical landmark(s). The graphical markers may include the same shape or different shapes. Non-limiting examples of the shapes may be an open circle or other elliptical shape, open rectilinear shape, open triangular shape, or another shape. The graphical marker(s) and/or the tube may be color coded with different colors. For example, the graphical marker for the tube or line, the graphical marker for the reference or anatomical landmark, and the tube or line may be green, blue, and yellow, respectively. A graphical marker may also be superimposed on the image indicating a measured distance, such as between the end of the tube or line and the reference or anatomical landmark, when a distance is calculated. The graphical marker for the measured distance may also include the measurement value. The method 1650 further includes displaying the combined image on a display (block 1672). The combined image may be displayed in real-time to the medical personnel enabling them to adjust the placement of the tube or line if need be. In certain embodiments, the combined image may be displayed as a DICOM image.

As discussed herein with reference to FIGS. 12-14, generating the combined image may include combining two or more images (e.g., received images) into a single image or overlaid into a composite image of the two or more images. The images may depict one or more regions of interest of a patient, such as an abdominal image or a chest image, where the medically placed tube or line may be located. Additionally, the images may depict varying perspectives (e.g., frontal, lateral, abdominal, chest) of the one or more regions of interest. Combining or overlaying (e.g., displaying) the two or more images may enhance a view of the tube or line within the patient, improve subsequent measurement accuracy, and provide more information regarding a position of the tube or line for a more complete assessment of the tube or line placement.

Figure 16:
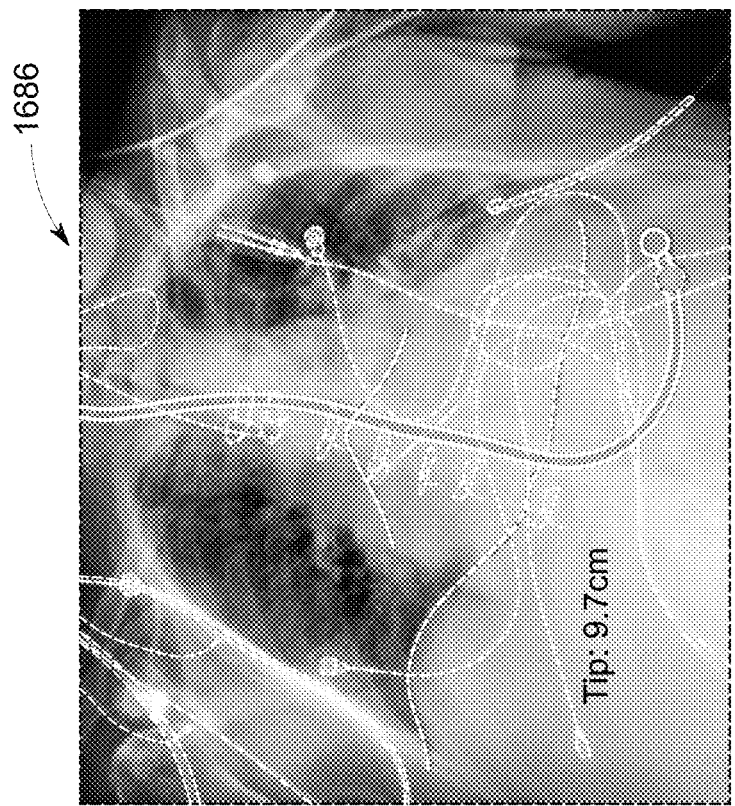
FIG. 16 is an example of image frames for a display of a combined image for visualizing positional changes of a medically placed tube or line within a region of interest.
Figure 16:
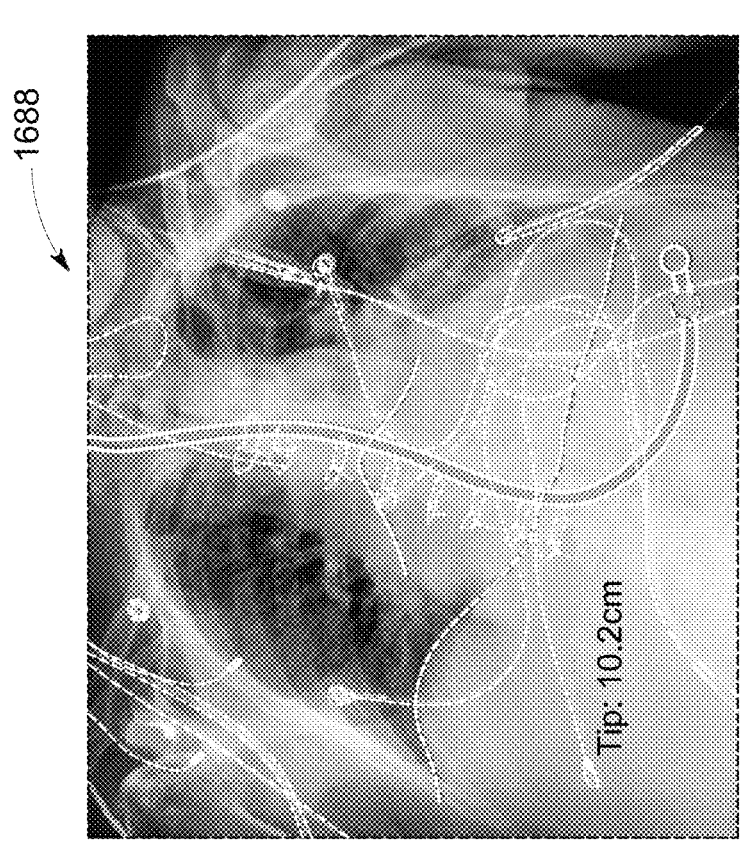

In some embodiments, to enhance visualization and detection of changes in the position (e.g., placement) of the medically placed tube or line, the combined image may be composed of one or more images taken at different time instances (e.g., t0, t1, t2) within a duration of time that the tube or line is within the region of interest. Furthermore, a display of the combined image may be a multi-frame display including one or more image frames, where each image frame may include a respective image of the region of interest taken at the different time instances. Additionally, each image frame may include indications of the currently placed tube or line, the previously placed tube or line, the reference or anatomical landmark(s) of the current image, the reference or anatomical landmark(s) of the one or more previously stored images, the respective measured distances, and/or the graphical representations (e.g., graphical markers) of the aforementioned features. For example, FIG. 16 depicts a first image frame 1686 that may be displayed (e.g., a previously stored image taken at t0) including information and graphical markers of one or more features of a tube or line as previously placed (e.g., in a previous position) in the region of interest and information and graphical markers of the references or anatomical landmarks. Further, a second image frame 1688 may be displayed (e.g., a current image taken at t1) including information and graphical markers of one or more features of the tube or line as currently placed (e.g., in a current position) in the region of interest and information and graphical markers of the references or anatomical landmarks. In some embodiments, the first and second image frames 1686, 1688 may be displayed as a movie, such that each image frame may be consecutively displayed for a set duration of time. In some embodiments, the one or more image frames may be overlaid to form a composite image to enable changes in positioning (e.g., placement) of the tube or line to be easily visualized. Furthermore, in some embodiments, the multi-frame display may enable the medical personnel to step through the one or more image frames (e.g., the first image frame 1686 and the second image frame 1688) of the combined image to selectively view the aforementioned features of each of the one or more image frames.

In certain embodiments, the method 1650 includes calculating one or more respective confidence metrics (block 1674). The confidence metrics may be for one or more of the respective calculated distances, for the determination of the presence of the medically placed tube or line, for an accuracy in detecting the placement of the tube or line, for an accuracy in detecting the reference or anatomical landmark, and/or for an accuracy of detecting a change in position (e.g., placement) of the tube or line. The confidence metric may include a confidence level or confidence interval. The confidence metric may be stored for future reference. In certain embodiments, the method 1650 may include providing one or more of the confidence metrics to a user (block 1676). For example, the confidence metrics may be displayed on the combined image or provided on a separate device (e.g., user's device). In certain embodiments, the confidence metrics may be written into a standard or private information tag (e.g., DICOM) and made visible in subsequent information systems that the image is sent too (e.g., PACS).

In certain embodiments, in determining whether the position (e.g., placement) of the medically placed tube or line has changed to over time (e.g., via the deep learning networks models), the method 1650 includes comparing a difference between the respective measured distances (e.g., measured distance(s) between the one or more features of the tube or line of the current image(s) and the one or more features of the previously placed tube or line of the one or more previously stored images; measured distance(s) between the one or more features of the tube or line and the reference or anatomical landmark of the current image(s) and the one or more features of the previously placed tube or line and the reference or anatomical landmark identified within the one or more previously stored images) to a desired threshold difference (e.g., desired threshold difference range) (block 1678) and determining if the difference is significant (block 1680).

The desired threshold difference may represent an acceptable range for the difference between the respective measured distance(s) of the current image(s) compared to measured difference(s) of the one or more previously stored images. Differences that fall within the acceptable range may represent nominal positional changes of the tube or line over time. For example, for a nasogastric tube, the desired threshold difference may be a range of difference values that indicate a position of the nasogastric tube has not significantly changed compared to a previously detected position and/or the initial position (e.g., placement) of the nasogastric tube. If the difference is not acceptable, the method 1650 includes providing a user-perceptible indication of a change in the position (e.g., placement) of the tube or line (block 1682). The indication may be provided on the display where the combined image is displayed or provided on another device (e.g., the user's device). The indication may be text stating that the position of the tube or line has changed. In certain embodiments, the text may be more specific and state the position of the tube or line is higher or lower or otherwise improper as compared to a previously detected position. In certain embodiments, the text may provide further instructions (e.g., to raise or lower the end of the tube or line a certain distance). In some embodiments, the text may be color coded (e.g., in orange or red) to further indicate the change in position. In some embodiments, the indication may be provided via color coding of one or more graphical markers of the one or more features of the tube or line or via color coding of the reference or anatomical landmark displayed on the combined image. For the example, one or more of the graphical markers (e.g., for the end of tube or line, for the one or more ports, for a portion of the tube or line, for the respective reference or anatomical landmark, and/or the indication of the respective measured distance(s) there between) and/or the tube or line may be color coded a specific color (e.g., red or orange) to indicate the change in position. Alternatively or in addition, one or more of the graphical markers may flash or otherwise be visually highlighted (e.g., color coded, shown in outline, and so forth) if the position of the tube or line has changed.

If the difference is acceptable, the method 1650 includes providing a user-perceptible indication of no significant change in the position (e.g., placement) of the tube or line (block 1684). The indication may be provided on the display where the combined image is displayed or provided on another device (e.g., the user's device). The indication for no significant positional change may be text stating the position of the tube or line has not changed. In certain embodiments, the indication for no positional changes may be provided via color coding one or more graphical markers of the one or more features of the tube or line displayed on the combined image (e.g., all the graphical markers and/or the tube or line may be color coded green). In certain embodiments, the indication of no significant positional change or a change in the positon may be written into a standard or private information tag (e.g., DICOM) and made visible in subsequent information systems that the image is sent too (e.g., PACS). In certain embodiments, the determination as to whether a position of the medically placed tube or line has changed as compared to a previous position may be manually done by the medical personnel viewing the displayed combined image.

Although methods 1600 and 1650 are illustrated and described separately above, it should be understood that the techniques of methods 1600 and 1650 may be performed separately and/or in combination (e.g., in parallel) with one another for determining a placement of a medically placed tube or line within a region of interest and/or for determining whether the placement has changed over time.

Figure 17:
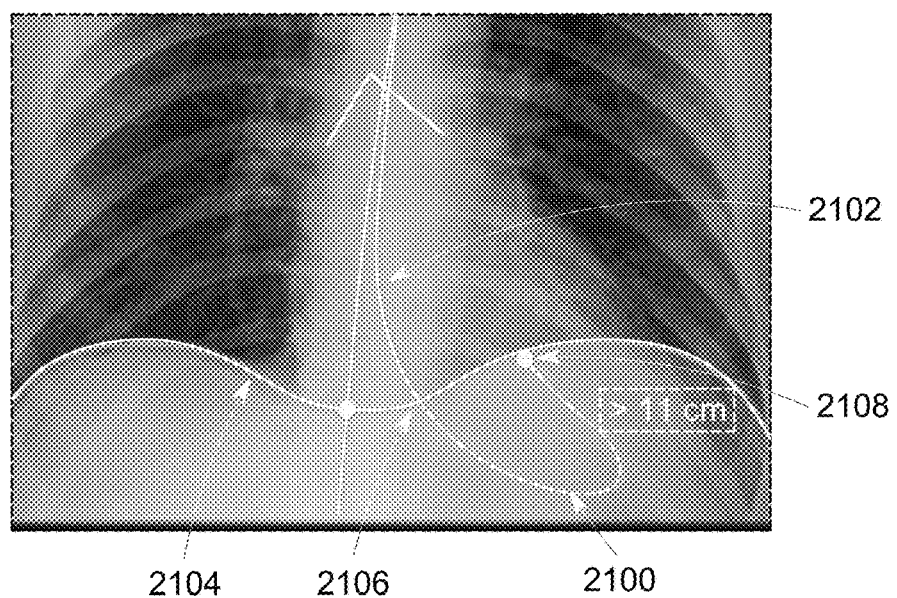
FIG. 17 is an example of a length measurement of a portion of an identified tube or line within a region of interest.
Figure 18:
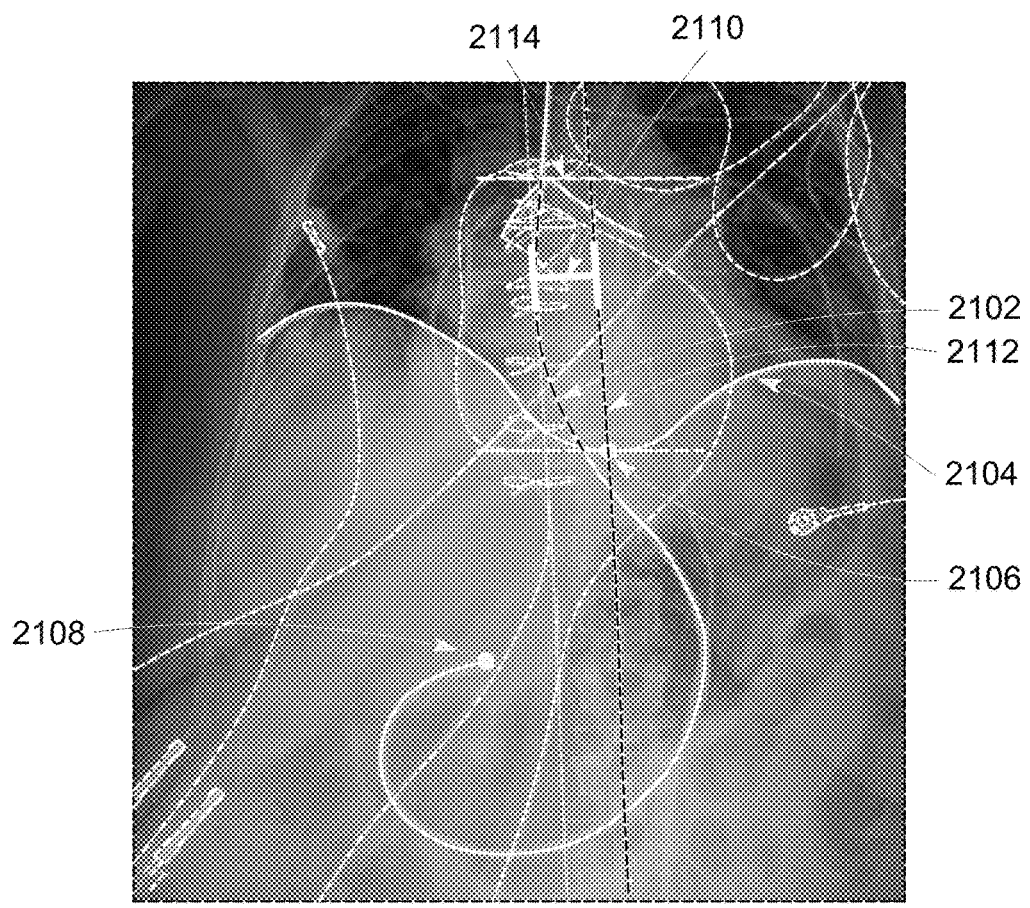
FIG. 18 is an example of a distance measurement of an identified tube or line with respect to a reference or anatomical landmark within a region of interest.

By way of providing examples, distance measurements are described below with referenced to FIGS. 17-21 that illustrate various distance measurements that may be determined (e.g., calculated) by the distance computer 1030. Turning to FIG. 17, a length 2100 of a portion of the medically placed tube or line 2102 below the diaphragm 2104 may be measured to aid in determining whether sufficient length of the tube or line is in a stomach of a patient. In particular, the length 2100 may be measured from an intersection point 2106 of the tube or line 2102 with the diaphragm 2104 to a tip and/or end 2108 of the tube or line 2102. FIG. 18 depicts a midline deviation measurement 2110 indicating a deviation of the tube or line 2102 from the midline 2112 of a patient. In particular, the midline deviation measurement 2110 may be taken between a carina level 2114 of the tube or line 2102 and the intersection point 2106 of the tube or line 2102 with the diaphragm 2104 at a point of greatest distance (e.g., horizontal distance, deviation, separation) of the tube or line 2102 from the midline 2112. The midline deviation measurement 2110 may aid in determining whether the tube or line has been inserted into the trachea, airways, and/or lungs of the patient.

Figure 19:
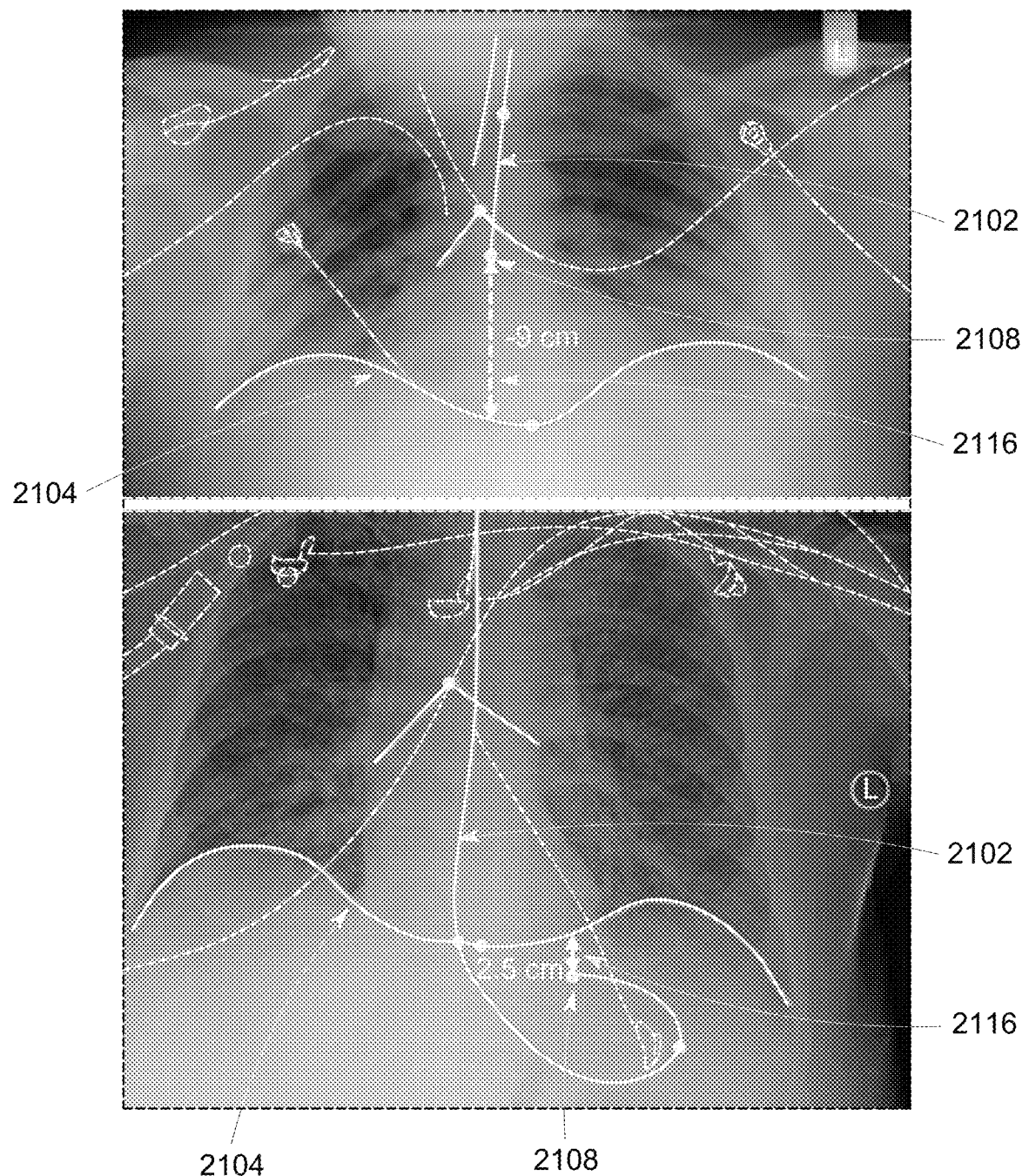
FIG. 19 is an example of a distance measurement of an identified tube or line with respect to a reference or anatomical landmark within a region of interest.
Figure 20:
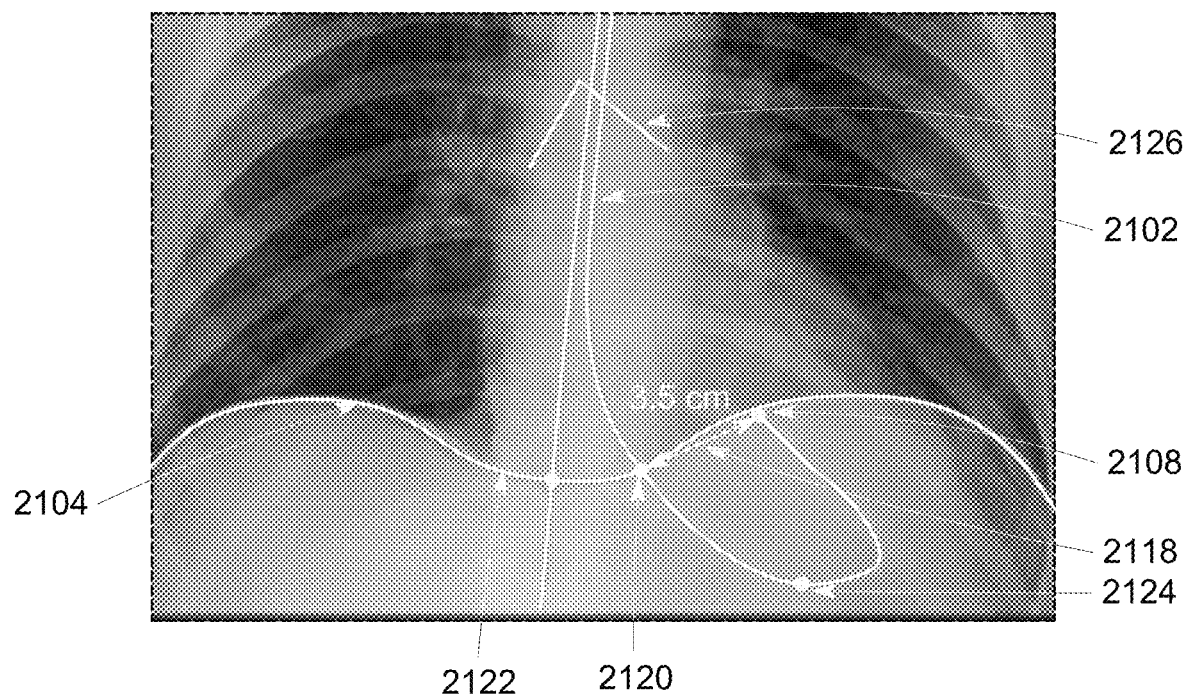
FIG. 20 is an example of a distance measurement of an identified tube or line with respect to a reference or anatomical landmark within a region of interest.

FIG. 19 depicts a vertical distance measurement 2116 of the tube or line 2102 from the diaphragm 2104. The vertical distance measurement 2116 may be taken as a vertical distance from the tip and/or end 2108 of the tube or line 2102 to the diaphragm 2104. In some embodiments, the vertical distance measurement 2116 may be a positive value when the tip and/or end 2108 of the tube or line 2102 is below the diaphragm 2104, and a negative value when the tip and/or end 2108 of the tube or line 2102 is above the diaphragm 2104. The vertical distance measurement 2116 may aid in determining the depth of the tube or line 2012 in relation to the diaphragm, and whether the tube or line 2102 needs to be inserted further into the patient. FIG. 20 depicts a tip distance from gastroesophageal (GE) junction measurement 2118. The tip distance from GE junction measurement 2118 may be taken as a Euclidean distance measured from the end and/or tip 2108 of the tube or line 2102 to a point of intersection 2120 of the tube or line 2102 with the diaphragm 2104. In some embodiments, the point of intersection 2120 may be estimated by a diaphragm midpoint 2122. Additionally, in some embodiments, the point of intersection 2120 may be a negative value if the end and/or tip 2108 of the tube or line 2102 is above the diaphragm 2104, one or more ports 2124 of the tube or line 2102 is above the diaphragm, the tube or line 2102 does not bisect airways 2126 of the patient, or any combination thereof. The tip distance from GE junction measurement 2118 may aid in determining if the end and/or tip of the tube or line 2102 is close to the GE junction and poses a risk of exiting the stomach of a patient.

Figure 21:
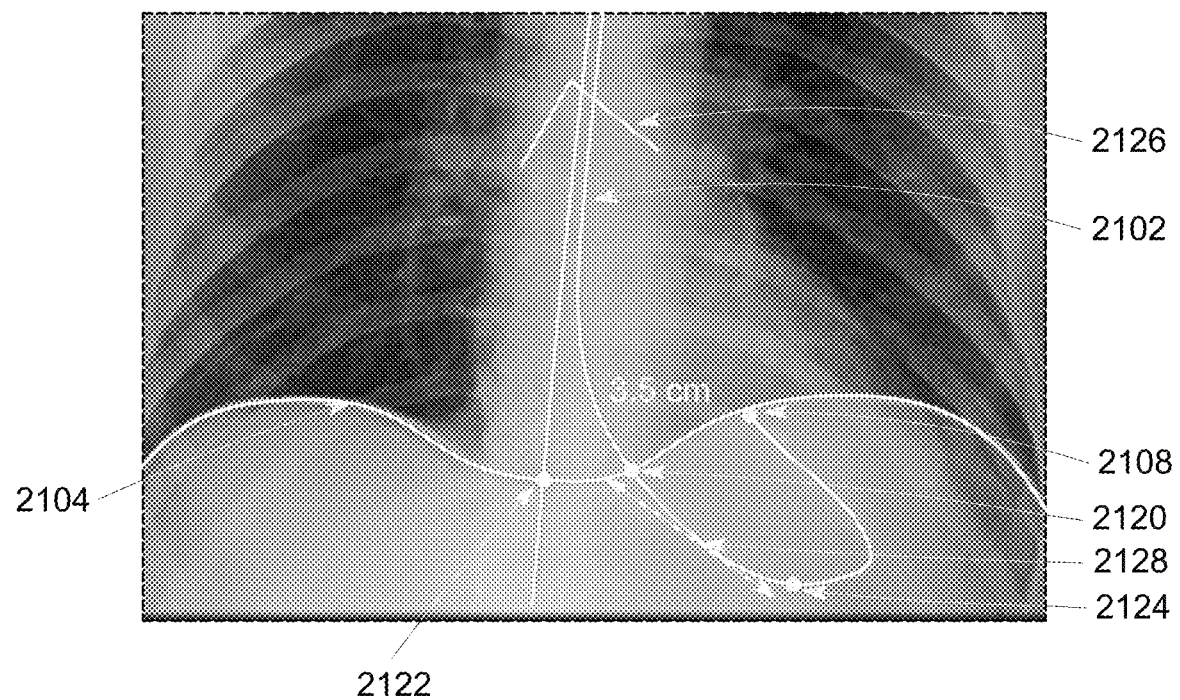
FIG. 21 is an example of a distance measurement of an identified tube or line with respect to a reference or anatomical landmark within a region of interest.

Furthermore, FIG. 21 depicts a port distance from GE junction measurement 2128. The port distance from GE junction measurement 2128 may be taken as a Euclidean distance measured from one or more ports 2124 of the tube or line 2102 to the point of intersection 2120 of the tube or line 2102 with the diaphragm 2104. In some embodiments, the point of intersection 2120 may be estimated by a diaphragm midpoint 2122. Additionally, in some embodiments, the point of intersection 2120 may be a negative value if the end and/or tip 2108 of the tube or line 2102 is above the diaphragm 2104, one or more ports 2124 of the tube or line 2102 is above the diaphragm 2104, the tube or line 2102 does not bisect airways 2126 of the patient, or any combination thereof. The port distance from GE junction measurement 2128 may aid in determining if the one or more ports of the tube or line 2102 are close to the GE junction and pose a risk of exiting the stomach of a patient.

With the preceding in mind, and by way of a real-world context and example to facilitate explanation, further illustration of an enteric tube implementation is described below. As used herein, enteric tubes may be understood to be thin flexible hollow catheters that course into the stomach and beyond. In practice, such enteric tubes may or may not include one or more ports (e.g., a side port, an end port). As may be appreciated, the phrase "enteric tube" may be understood to encompass an array of tube types differentiated by their insertion point (e.g., in the nose (naso-) or mouth (oro-) and by their endpoint (e.g., in the stomach (-gastric), in the duodenum (-duodenal), or in the jejunum (-jejunal). For the purpose of illustration, many of the following examples are presented in the context of a nasogastric tube so as to provide a real-world context. However it should be understood that such examples and discussion may be equally applicable to the other types of enteric tubes and, indeed, to other suitable medical tubes in general.

In the context of a nasogastric tube, it may be understood that the use of such tubes may raise particular issues which may be addressed as explained and shown herein. By way of context, such tubes may typically be implemented as plastic (or other biocompatible material) tubes that are designed to be passed through the nose and into the stomach of a patient. Once properly placed, a nasogastric tube may be used to administer nutrients, medication, and/or contrast to the patient. In addition or in the alternative, the placed tube may be used to remove liquids and/or air from the stomach.

With respect to proper placement, a nasogastric tube may be inserted so as to bisect the airways and diaphragm on the X-ray projection (e.g., to be positioned substantially on the midline with respect to the airway). The inserted tip (e.g., distal tip; end of the nasogastric tube) and side ports and/or end ports (if present) are below the diaphragm when properly placed, typically positioned toward the patient's left hand side. Proper insertion and placement of the tube avoids or mitigates possible risks, such as the risk of insertion into the lungs (with the associated risk of substances entering the lungs), the risk of the tube placement being too high, e.g., in the esophagus, the risk of the tip, the side ports, and/or end ports exiting a patient's stomach after initial insertion, and the risk that loops or kinks in the inserted tube may disturb the flow and/or irritate the patient.

As discussed herein, and in the context of the preceding discussion, the presently described techniques utilize an AI-based feature to facilitate and assess the placement of enteric tubes, including but not limited to nasogastric tubes. The AI-based feature may be used to detect and/or characterize the placed tube and/or the position(s) of the placed tubes, to provide a graphical summary showing the tube with respect to relevant anatomical features (e.g., in the actual anatomical context) and/or previous position(s), and to classify the tube as being placed correctly, changed or unchanged position, and/or needing adjustment. Use of the AI-based feature may, therefore, increase the confidence of the bedside team when placing tubes. Use of the Ai-based feature may also facilitate prioritization of potentially misplaced tubes for review, such as by a radiologist, and may speed up the review process, thereby helping to avoid complications associated with misplaced tubes.

Features and benefits provided by the techniques described herein include, but are not limited to: the ability to localize particular features (e.g., the tube tip, side port, end port, and so forth) of the enteric tube; the ability to localize relevant anatomical features and context (e.g., diaphragm, airways, carina, lungs, patient midline, and so forth); the ability to localize other relevant devices that may be potentially confounding with enteric tubes (e.g., probes, peripherally inserted central catheter (PICC) lines, electrocardiogram (ECG) leads or lines, endotracheal (ET) tube, and so forth); the ability to assess the tube position and to provide explanation or commentary about the assessment (e.g., explaining potential problems with current tube placement, such as "the side port location is too high relative to the diaphragm"); the ability to compare subsequent tube positions to a previous tube position and to provide explanation or commentary about the assessment (e.g., explaining potential problems with detected positional deviation of the tube, such as "tube length below diaphragm is 9 cm less than tube length below diaphragm measurement calculated 1 day earlier"); the ability to assess the tube position and/or subsequent tube positions and to provide explanation or commentary regarding aspects of the placement verified to be correct or satisfactory (e.g., that the tube correctly bisects the diaphragm near the midline); the ability to provide automated measurements that are relevant for the tube assessment (e.g. the length of the tube below the diaphragm, the deviation from patient midline, the distance of the side port from the diaphragm, the vertical distance of the tube tip from the diaphragm, the distance of the tube tip, side ports, and/or end ports from the gastroesophageal junction, the measured tube diameter, etc.); the ability to show the detected tubes, the tube features, and relevant anatomical features and measurements in a graphical summary and the ability to highlight potentially problematic (or non-problematic) areas within the graphical summary); the ability to detect and indicate (e.g., display) changes in the position of the tube over time; the ability to perform triage based on the tube placement classification, allowing prioritization of attention to potentially misplaced tubes; the ability to save the graphical summary in various formats (secondary capture, structure report, Integrating the Healthcare Enterprise (IHE) AI Results (AIR), and so forth); and the ability to allow the user to edit, modify, and/or annotate the graphical summary.

It may be noted that the present techniques, as applied to enteric tubes, may address additional complexity as compared to approaches that relate primarily to endotracheal tubes or other medical tubes. By way of example, the present techniques as applied to enteric tubes must address or allow for the acquisition and use of chest and abdominal images (as opposed to only chest images) taken from various perspectives of a patient (e.g., frontal, lateral, abdominal, chest). Further, enteric tubes have a variety of tube types which must be taken into account. By way of example, nasogastric tubes encompass standard nasogastric tubes (e.g., Levin tubes, Ryle's tubes), Salem sump tubes, small-bore silicone rubber feeding tubes (e.g., Keofeed tubes, Duo-tubes, Dobbhoff tubes), and other special purpose tubes (e.g., Ewald tubes, Cantor tubes, Miller-Abbott tubes, Sengstaken-Blakemore tubes, Minnesota tubes, Linton-Nachlas tubes, Nutrivent tubes). In addition, enteric tubes, unlike endotracheal tubes, may form loops and complex curves when inserted and may allow for many potential trajectories. Correspondingly, enteric tubes may have many placement requirements (relative to other medical tube insertions) and may be subject to many and varied types of misplacement. Due to their length, certain types of enteric tubes may also exit and/or re-enter the acquired images, posing a further distinct complexity to be addressed.

Figure 22:
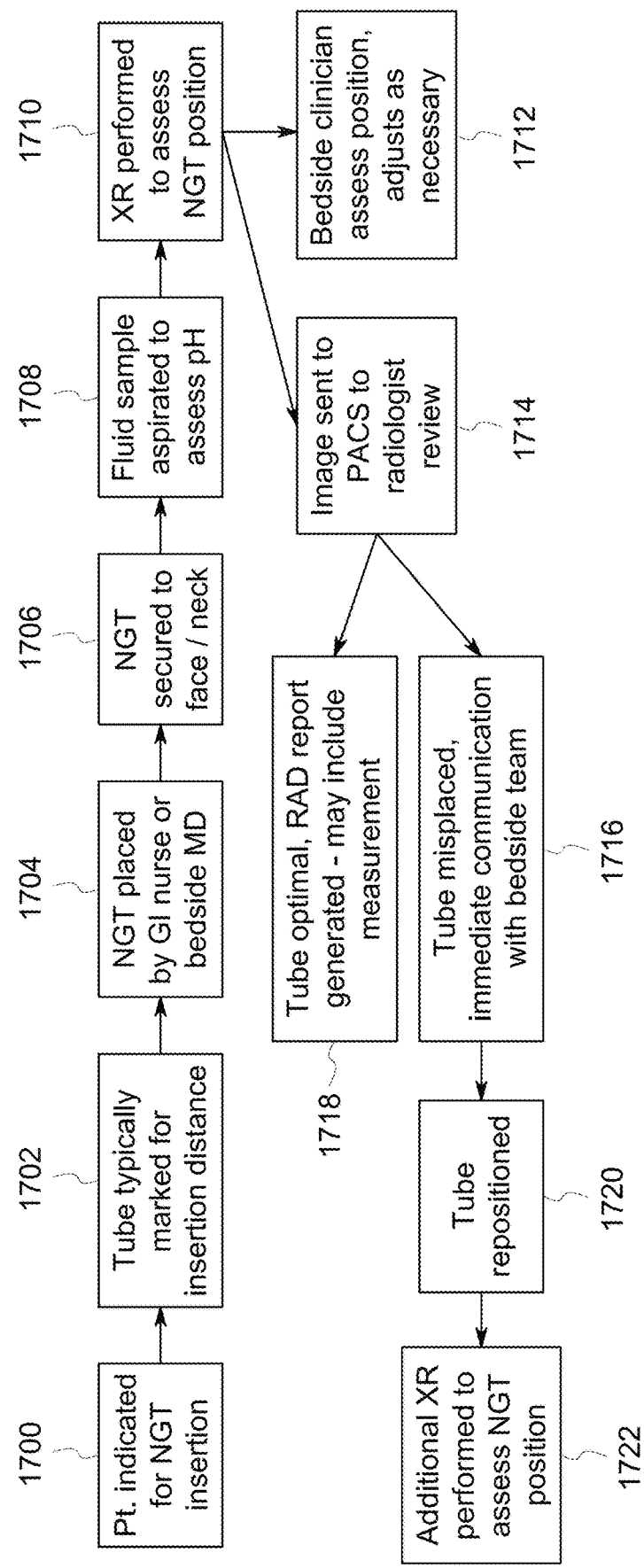
FIG. 22 is an example of a process flow of steps taken in the placement and assessment of a nasogastric tube.

By way of context, a high level workflow for an enteric tube (here a nasogastric tube (NGT)) placement is illustrated in FIG. 22. In this example, at step 1700 a point (e.g., an anatomical point) is indicated for insertion of the nasogastric tube. The nasogastric tube may then be marked for the appropriate insertion distance (step 1702). The nasogastric tube may then be inserted or otherwise placed (step 1704) by medical personnel, such as a gastrointestinal nurse or bedside doctor. Once inserted, the nasogastric tube may be secured (step 1706) to the face and/or neck of the patient. To verify placement in the stomach, a fluid sample may be aspirated and tested for pH (step 1708). An X-ray imaging operation may be performed (step 1710) to assess positioning of the nasogastric tube. The X-ray image data may be assessed and/or presented in accordance with the techniques discussed herein. The outputs of the analysis of the X-ray image data, as shown in FIG. 21 may be provided to the bedsides clinician(s) (step 1712) to assess the position of the nasogastric tube and to make any needed adjustments.

The outputs of the analysis of the X-ray image data, as shown in FIG. 22 may, in addition or in the alterative, be provided (step 1714) to a pictures archiving systems (PACS) for review by a radiologist. In the depicted example, two outcomes are illustrated with respect to radiologist review. In the first (step 1718), the tube placement is determined to be optimal or satisfactory and a radiologist report is generated to this effect, which may include measurement data. In the second (step 1716), the tube is determined to be misplaced and this information is communicated to the bedside team. The tube may then be repositioned (step 1720) by the bedside team and additional X-rays acquired (step 1722) to assess tube placement. In some embodiments, additional outcomes may be presented for radiologist review. For example, a position of the tube may be determined to have not significantly changed with respect to a previous position of the tube that was determined to be properly placed and a radiologist report is generated to this effect, which may include measurement data. In an alternative outcome, a position of the tube may be determined to have changed with respect to the previous proper position and this information is communicated to the beside team. The tube may then be repositioned by the bedside team and additional X-rays acquired to asses tube placement. Benefits of utilizing the techniques as discussed herein with respect to this workflow include, but are not limited to: providing increased confidence in tube placement, providing alerts as to misplaced tubes, movement in positions of tubes, and/or suboptimal image quality, prioritizing cases of suspected tube misplacement, providing automated measurements that might not otherwise be generated, and speeding up report creation. Thus, as described herein, the presently described technique helps detect the presence and/or number of enteric tubes, helps determine if the enteric tube is malpositioned, helps determine if a position of the enteric tube has changed (e.g., deviated) relative to a previous proper position, provides an immediate bedside alert for malpositioned and/or deviated tubes, provides PACS prioritization for suspected malpositioned and/or deviated tubes, and provides visualization of the tube and anatomical context and features. In terms of clinical benefits, these may include immediate bedside intervention in critical cases based on the decision of the bedside clinician, faster intervention in critical cases based on the radiology report, and higher confidence for the bedside team for appropriately placed tubes.

Figure 23:
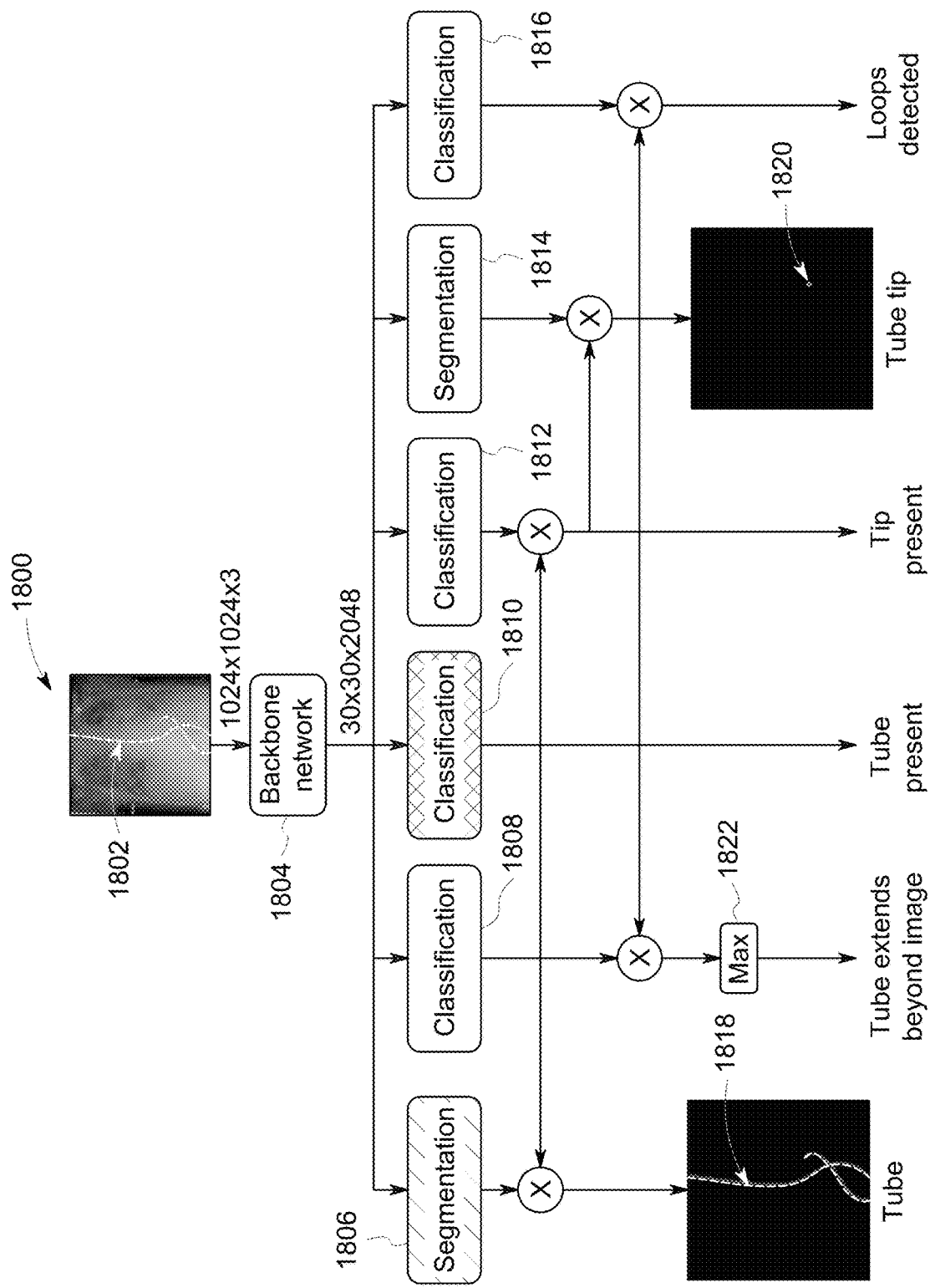
FIG. 23 depicts a model architecture for segmenting and classifying an enteric tube placement.

Turning to FIG. 23, a brief overview of a model architecture for segmenting and classifying an enteric tube (e.g., a nasogastric tube). In this example, an image 1800 or sequence of images (e.g., frontal and/or lateral) of the anatomic region of interest (e.g., chest and abdomen) is acquire and provided to a backbone network 1804. In the depicted example, the image(s) 1800 include an enteric tube 1802 as part of the image. Image data and operations are shown as being performed in the context of the network 1804. A segmentation operation 1806 may be performed to identify and segment the tube 1802 within each image 1800 so as to generate a segmented object or representation 1818 of the tube 1802.

Classification logic (such as AI-based classification operations) may operate on the segmented representation 1818 to generate a series of classification outputs. By way of example, classification logic 1800 may make an initial determination as to whether a tube 1802 is present in the image 1800 based on the provided inputs. In addition, assuming a tube 1802 is determined to be present, further classification logic 1812 and segmentation logic 1814 may be performed to determine if a tube tip and/or one or more ports are present and, correspondingly, to localize and segment the tube tip 1820 and/or the one or more ports within the image(s) 1800. Further classification logic 1808 may determine, based upon the segmented representation and in combination with a specified maximum value or threshold 1822, whether the tube 1802 extends beyond the image 1800. Classification logic 1816 may also be applied to detect whether loops are present in the tube 1802 based upon the segmented representation 1818. In view of this architecture, each image or sequence of images 1800 may be processed as described herein to provide information to the bedside clinicians and/or to radiologists viewing the images and outputs via PACS.

As discussed herein, outputs of the AI-based logic may be used to assess or otherwise evaluate placement of an enteric tube. For example, outputs of the AI-based logic may be utilized to characterize a placement or position as expected or satisfactory (e.g., side port okay, no side port long, tip outside long), as having a loop or kink (e.g., loop then down, kink, too deep), as being borderline (e.g., tip outside short, sideport borderline, tube length borderline), as being malpositioned so as to pose an airways risk (e.g., above carina, in airways), as being malpositioned so as to be too high (e.g., in esophagus, no side port short, side port high), as being malpositioned so as to be high with loops (e.g., loop above diaphragm, returns to esophagus), or as having a limited field-of-view or otherwise out-of-scope (e.g., tip outside short, below diaphragm short, below diaphragm exit up). Additionally, in some embodiments, the AI-based logic may be utilized to characterize a change in position of the enteric tube as changed (e.g., deviated from a previously detected position) or unchanged (e.g., not significantly changed, undeviated from a previously detected position). In practice, and with the preceding in mind, there may be a number of varied and suitable options for grouping the potential tube positions into possible classification outputs for a given implementation including, but not limited to: (1) malpositioned tube present/no malpositioned tube present, (2) no tube present/correctly placed tube/malpositioned tube, (3) no tube present/correctly placed tube/tube position needs verification, (4) no tube present/correctly placed tube/malpositioned tube/borderline placement/partially visualized tube/loops or kinks present/out of scope due to limited field of view, (5) no tube present/correctly placed tube/correctly placed tube with side port/malpositioned tube in airways/malpositioned tube in esophagus/malpositioned tube too high/borderline placement/loops or kinks present/partially visualized tube/uncertain/out of scope due to limited field of view/and so forth.

Figure 24:
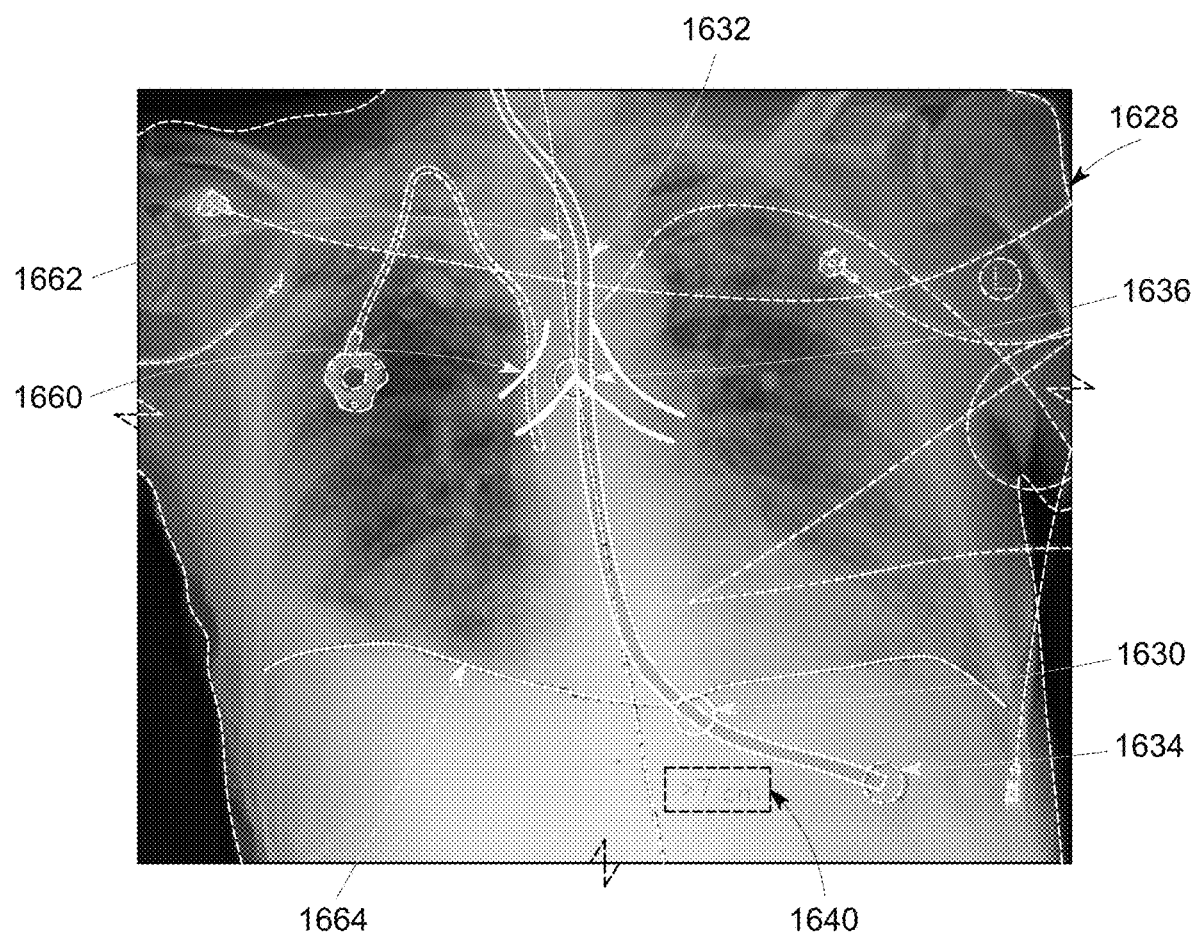
FIG. 24 is an example of a combined image identifying a tube or line within a patient.
Figure 25:
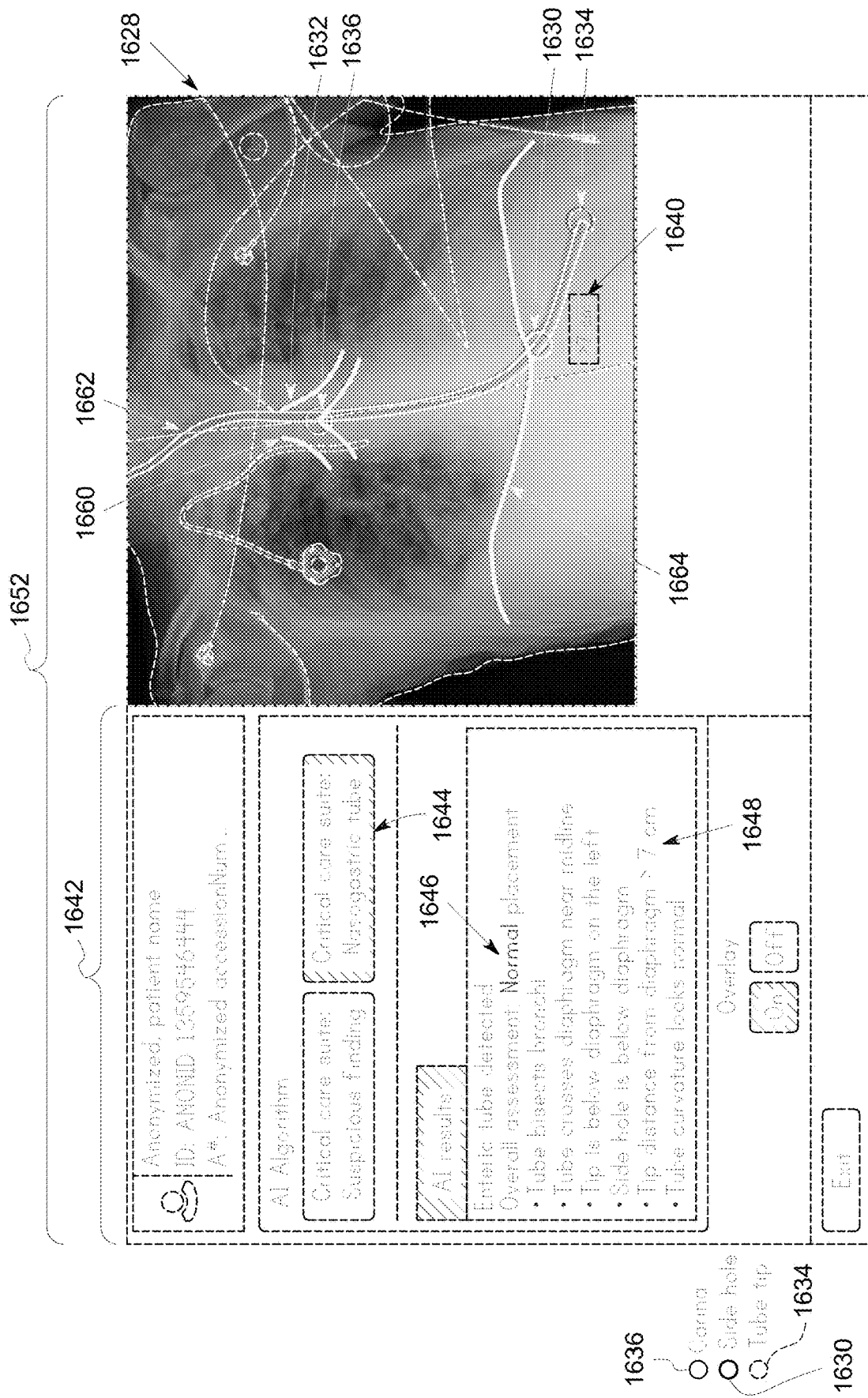
FIG. 25 is a schematic diagram of a user interface having a combined image identifying a tube or line within a patient.

With regard to the presented or displayed information, and turning to FIGS. 24 and 25, an example of a combined image 1900 (e.g., DICOM image) identifying an enteric tube or line within a patient that may be displayed on a display. As depicted, the combined image 1900 of a patient shows a nasogastric tube 1902 positioned within the patient. As part of the combined image, one or more anatomical references or features may be indicated via overlay of dashed lines or other visual references to facilitate user visualization of the tube 1902 relative to the anatomic context. By way of example, in the depicted image solid line 1904 is overlaid to illustrate the bronchi, dashed line 1906 is overlaid to illustrate the patient midline, and dashed line 1908 is overlaid to illustrate the diaphragm.

In the depicted example, a graphical marker 1910 (e.g., circle or color-coded circle) overlaid on the combined image 1900 indicates the location of the end (i.e., tube tip) of the nasogastric tube 1902. A graphical marker 1912 (e.g., circle or color-coded circle) overlaid on the chest image indicates a reference or anatomical location (e.g., carina). A graphical marker 1914 (e.g., circle, color-coded circle, dashed circle, and so forth) overlaid on the image indicates a side hole or side port, if present, of the nasogastric tube 1902. A numerical value 1916 indicates a measured distance (e.g., a tube length distance) between the tip of the nasogastric tube 1902 and a reference or anatomical location, here the diaphragm. In certain embodiments, a confidence metric in the measured distance generated by the artificial intelligence is also displayed (e.g., as depicted a confidence level). In certain embodiments, the tube 1902, portions of the tube, the graphical markers 1910, 1912, and/or 1914 may be color coded (e.g., blue, yellow, green, and red) or otherwise visually coded (e.g., solid line, dashed line, double lines, lines of distinctive thickness, variations of shading, hatching, and/or stippling).

FIG. 25 is a schematic diagram of a user interface 1920 having a combined image 1900 identifying a tube or line within a patient that may be displayed on a display. As shown in FIG. 25, the combined image 1900 may also include or be displayed alongside a header or other information block or section 1922 that includes information related to the image 1900. For example, as depicted, the information block 1922 (a portion of which is expanded as an inset to improve visibility) includes the type of tube or line 1924 (e.g., a nasogastric tube), whether the placement of the tube is proper or not 1926, and the calculated distance 1928 between the tip of the tube and the reference or anatomical marker.

In certain embodiments, the information block 1922 may include an indication as to whether the tube or line was detected, such as by the AI-based logic discussed herein. In certain embodiments, one or more confidence metrics may be displayed on the image 1900 (e.g., for the calculated distance, for the determination of the presence of the medically placed tube or line, for an accuracy in detecting the tip of the tube or line, and/or for an accuracy in detecting the reference or anatomical landmark). As shown in the example, in certain embodiments the information block may also include other relevant placement information determined by the AI-based logic. By way of example, in the depicted information block 1922 of FIG. 25 information about whether the tube bisect the bronchi, whether the tube crosses the diaphragm near midline, whether the tip is below the diaphragm on the left, whether the side hole is below the diaphragm, the tube length below the diaphragm, and whether the tube curvature appears normal are all displayed. That is, in certain embodiments, the depicted indication may indicate whether the tube or line is placed properly, misplaced, provide an indication of what is wrong with the placement, or provide instructions for correcting the placement. An option to turn the image overlay on or off is also provided in the depicted example. In some embodiments, an overall assessment of whether the placement of the tube is proper or not 1926 may not be displayed. For example, the depicted information block 1922 may not include the overall assessment of the placement of the tube, shown as "Normal" in FIG. 25. Instead, information associated with determining the overall assessment (e.g., whether the tube 1902 bisect the bronchi, whether the tube crosses the diaphragm near midline, whether the tip is below the diaphragm on the left, whether the side hole is below the diaphragm, the tube length below the diaphragm, whether the tube curvature appears normal, etc.) may be displayed and a medical professional may be prompted to verify the information and determine whether the tube is properly placed.

Figure 26:
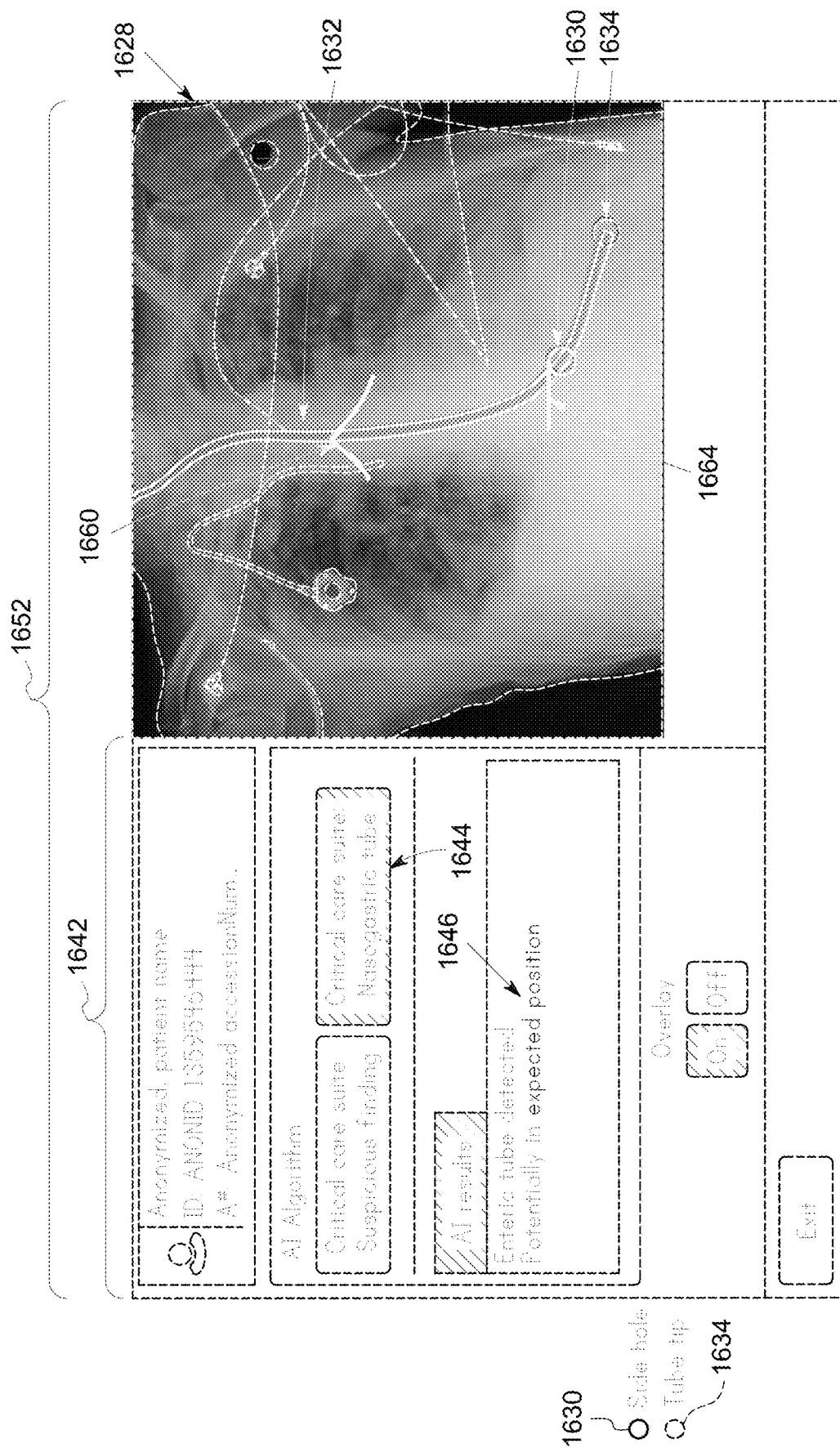
FIGS. 26-30 depict further schematic diagrams of a user interface having a combined image identifying a tube or line within a patient in a context where the tube is in an expected position.
Figure 27:
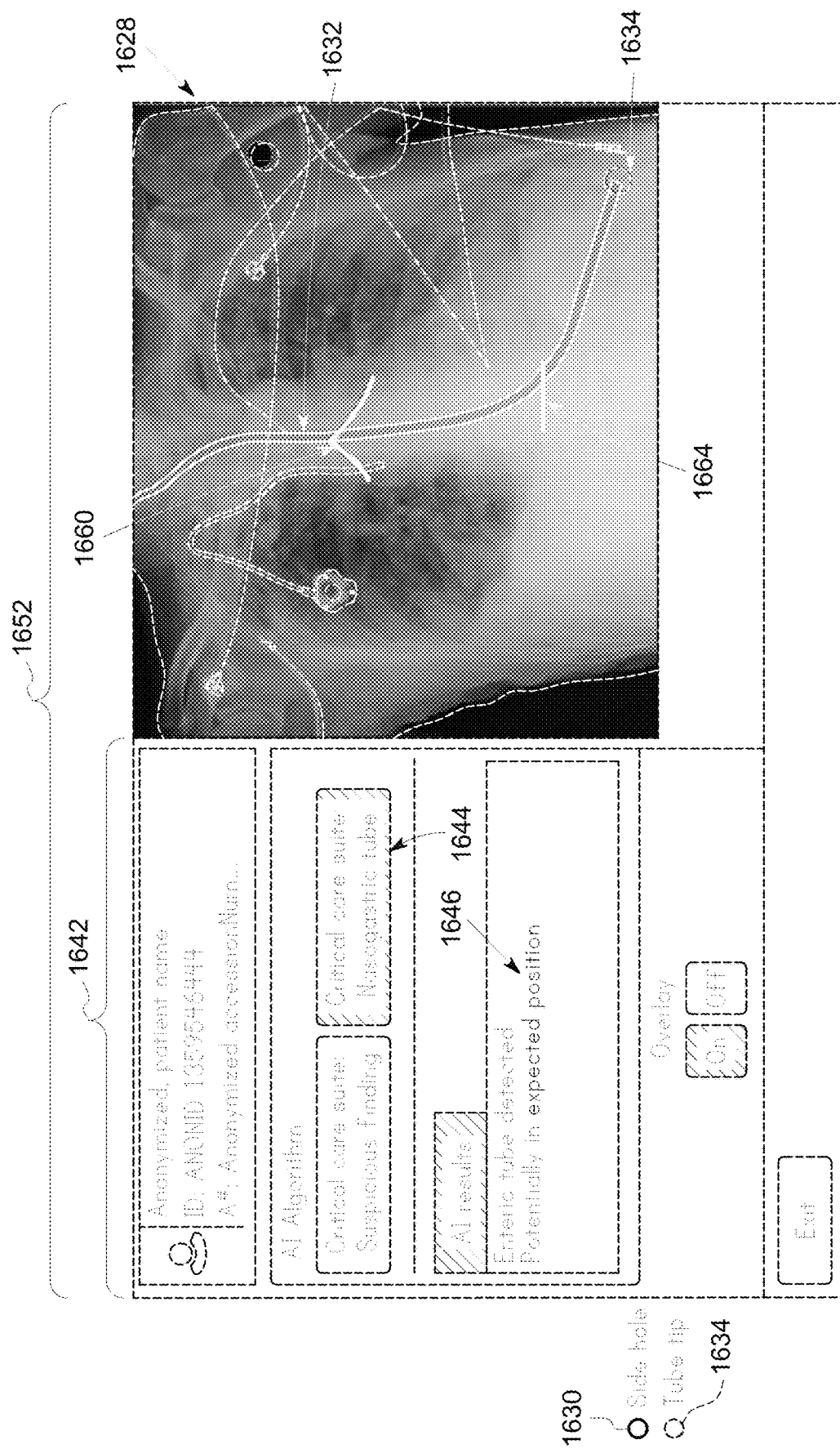
Figure 28:
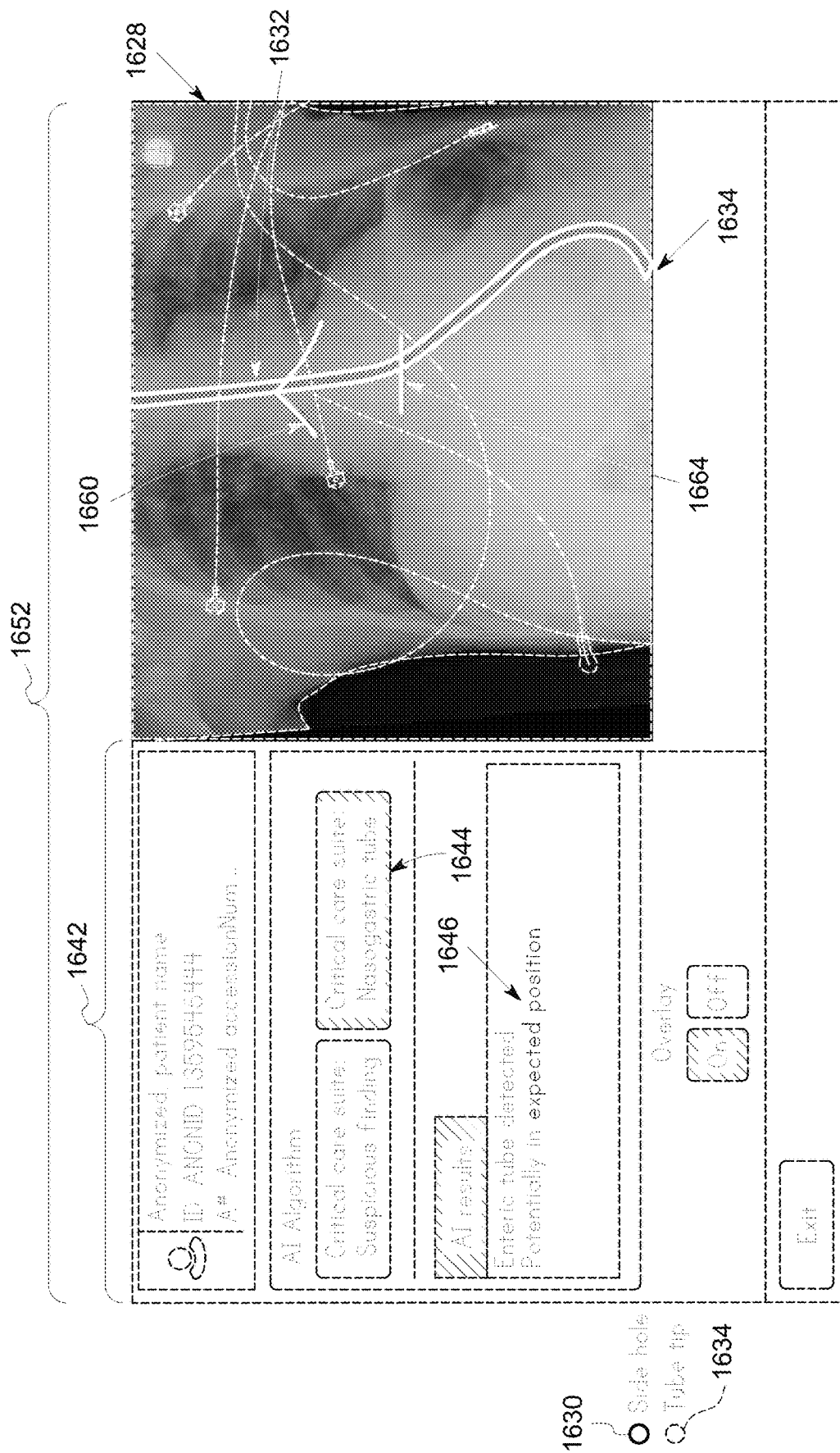
Figure 29:
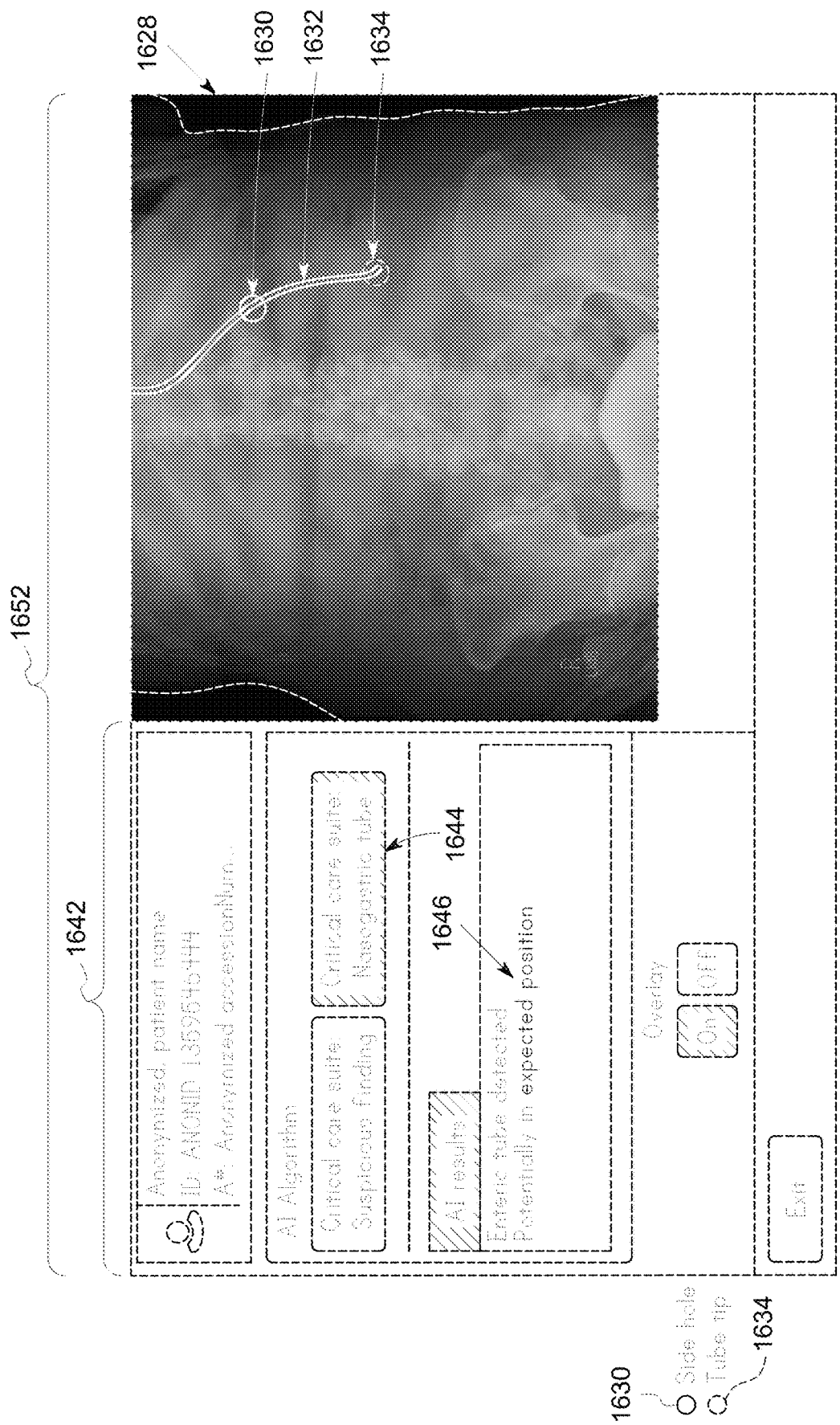
Figure 30:
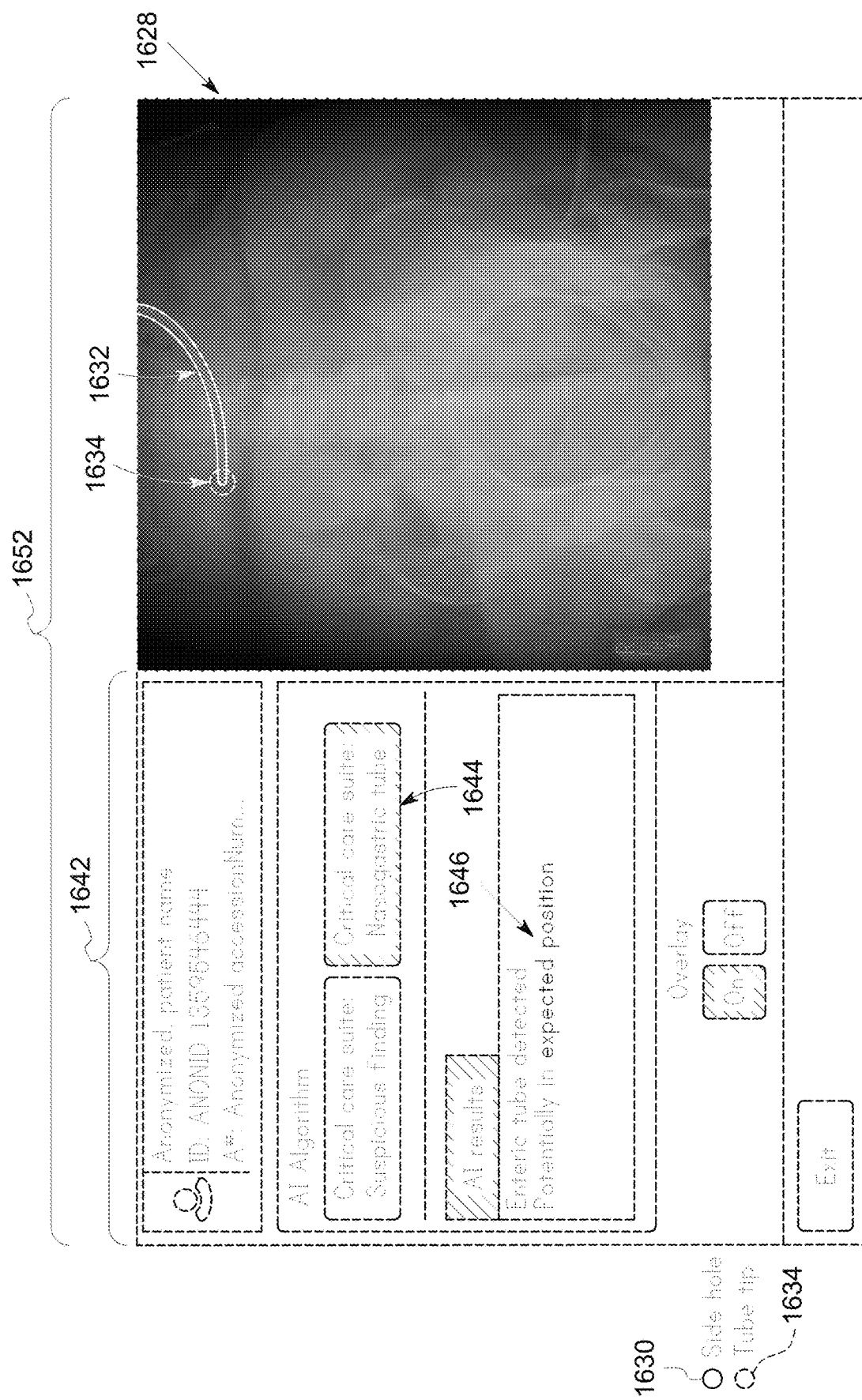

By way of providing further examples, additional user interfaces 1652 are described below that illustrate different tube placements and AI outcomes and how such placements and outcomes might be presented to a user. By way of example, and turning to FIG. 26, an example is displayed of results and visualization provided for a normal or expected tube placement with a side port present. FIG. 27 depicts an example of results and visualization for a normal or expected tube placement where no side port is present and with a long placement with respect to the tip extending beyond the diaphragm. FIG. 28 depicts an example of results and visualization for a normal or expected tube placement where no side port is present and with a long placement where the tip is at the edge of or outside the image. FIG. 29 depicts an example of results and visualization for a normal or expected tube placement where the tube 1632 is in a long placement below the diaphragm. FIG. 30 depicts an example of results and visualization for a normal or expected tube placement where the tube 1632 is placed deep but only a short portion of the tube is visible.

Figure 31:
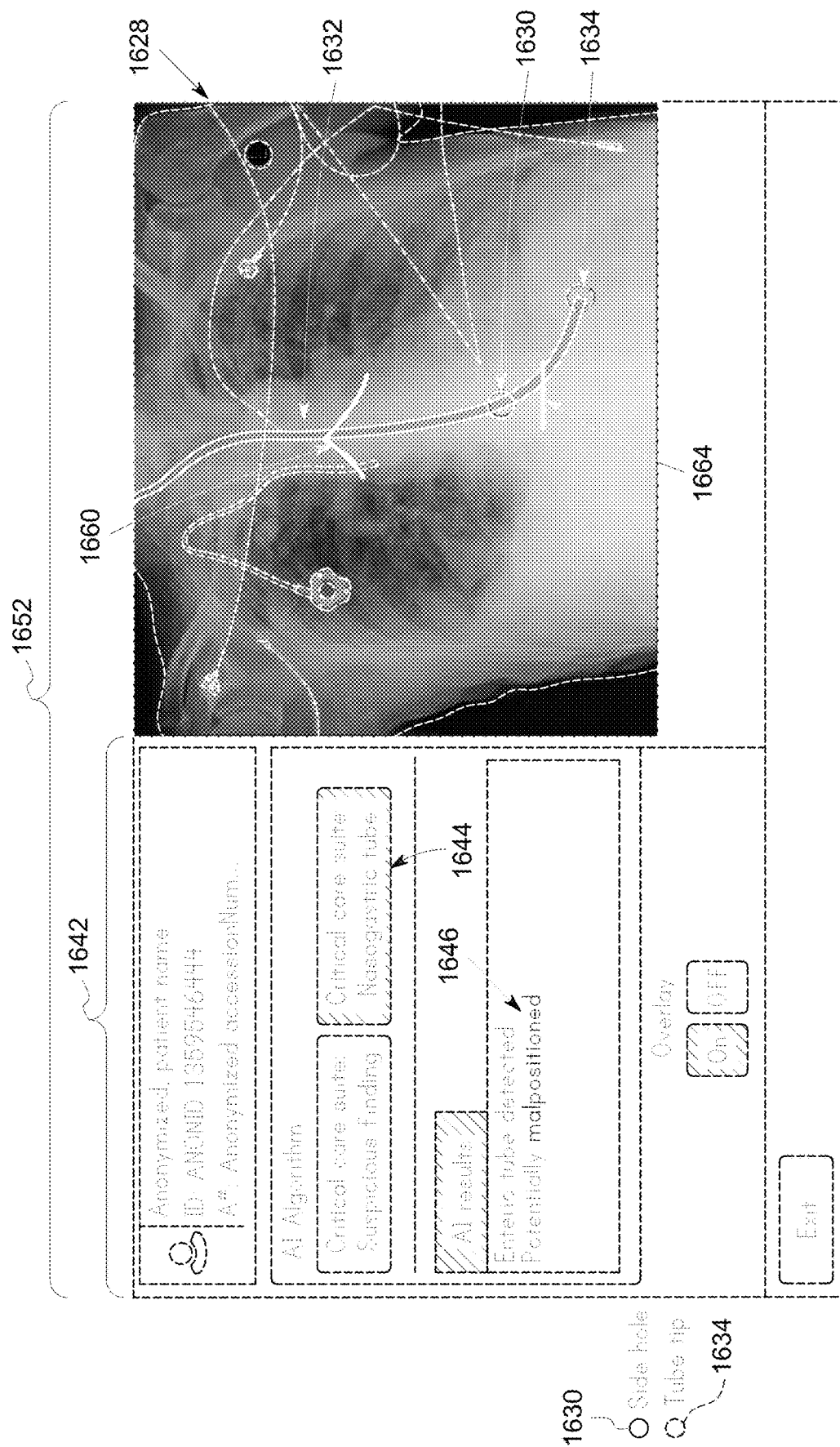
FIGS. 31-38 depict further schematic diagrams of a user interface having a combined image identifying a tube or line within a patient in a context where the tube is malpositioned.
Figure 32:
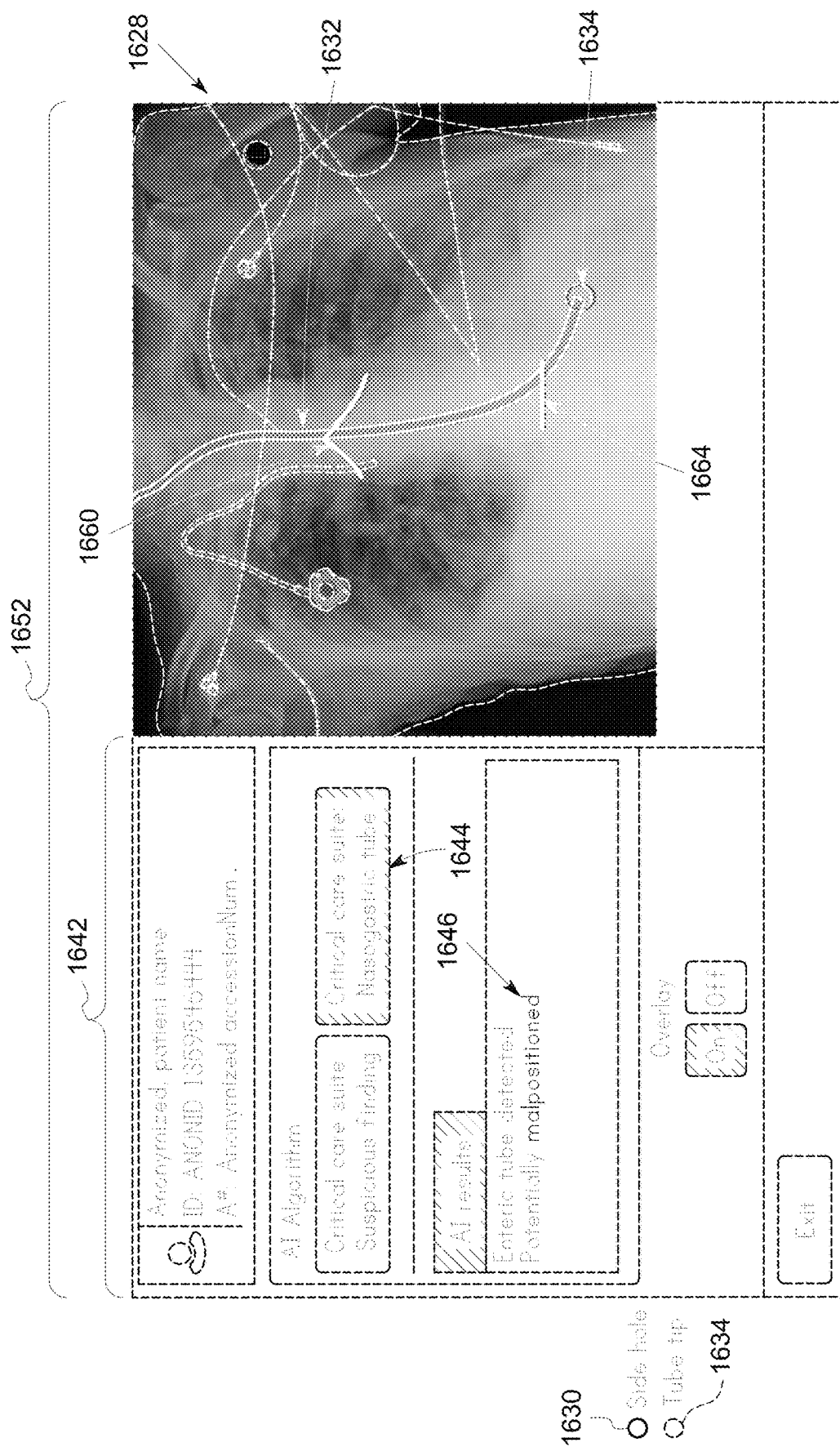
Figure 33:
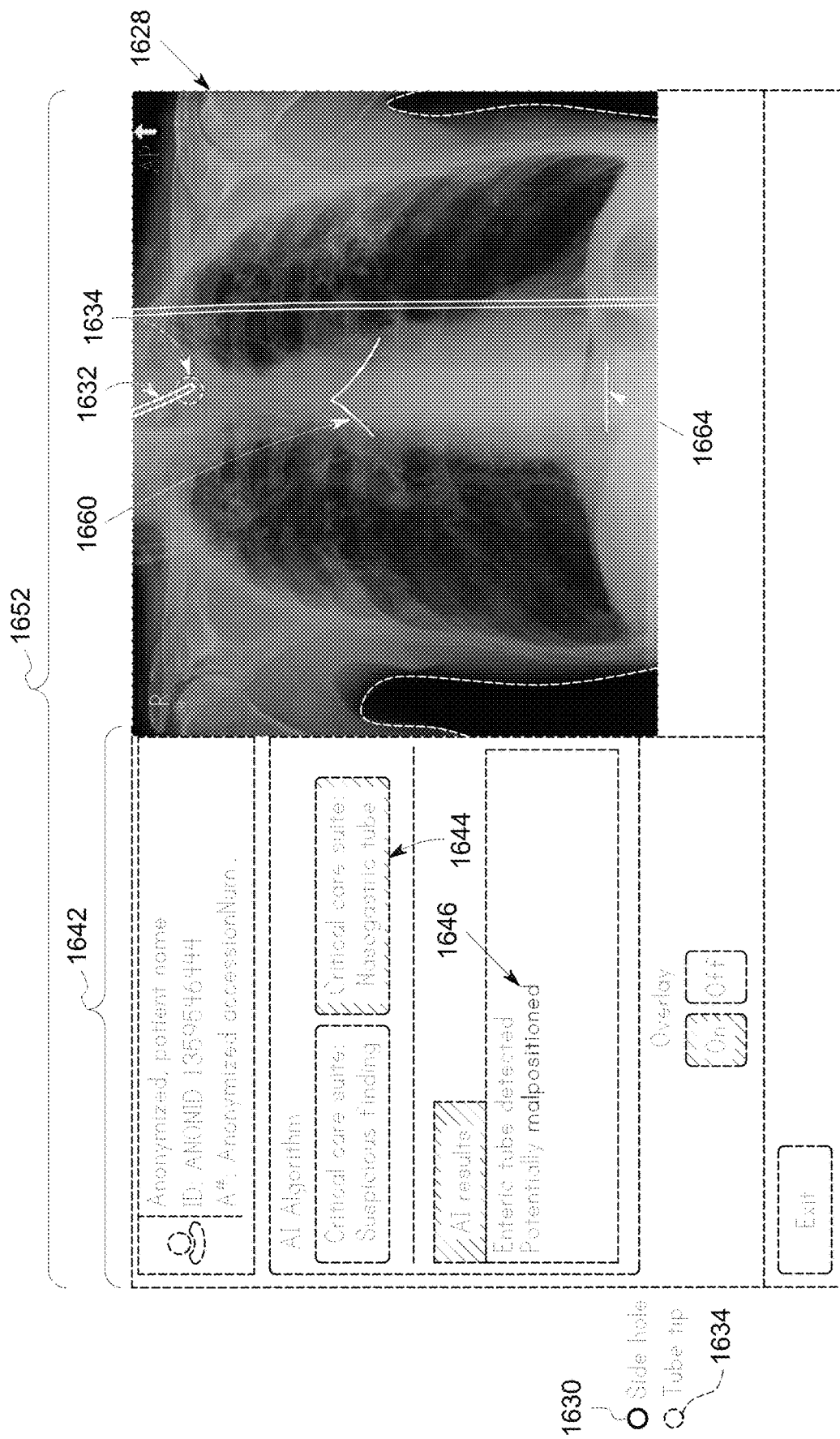
Figure 34:
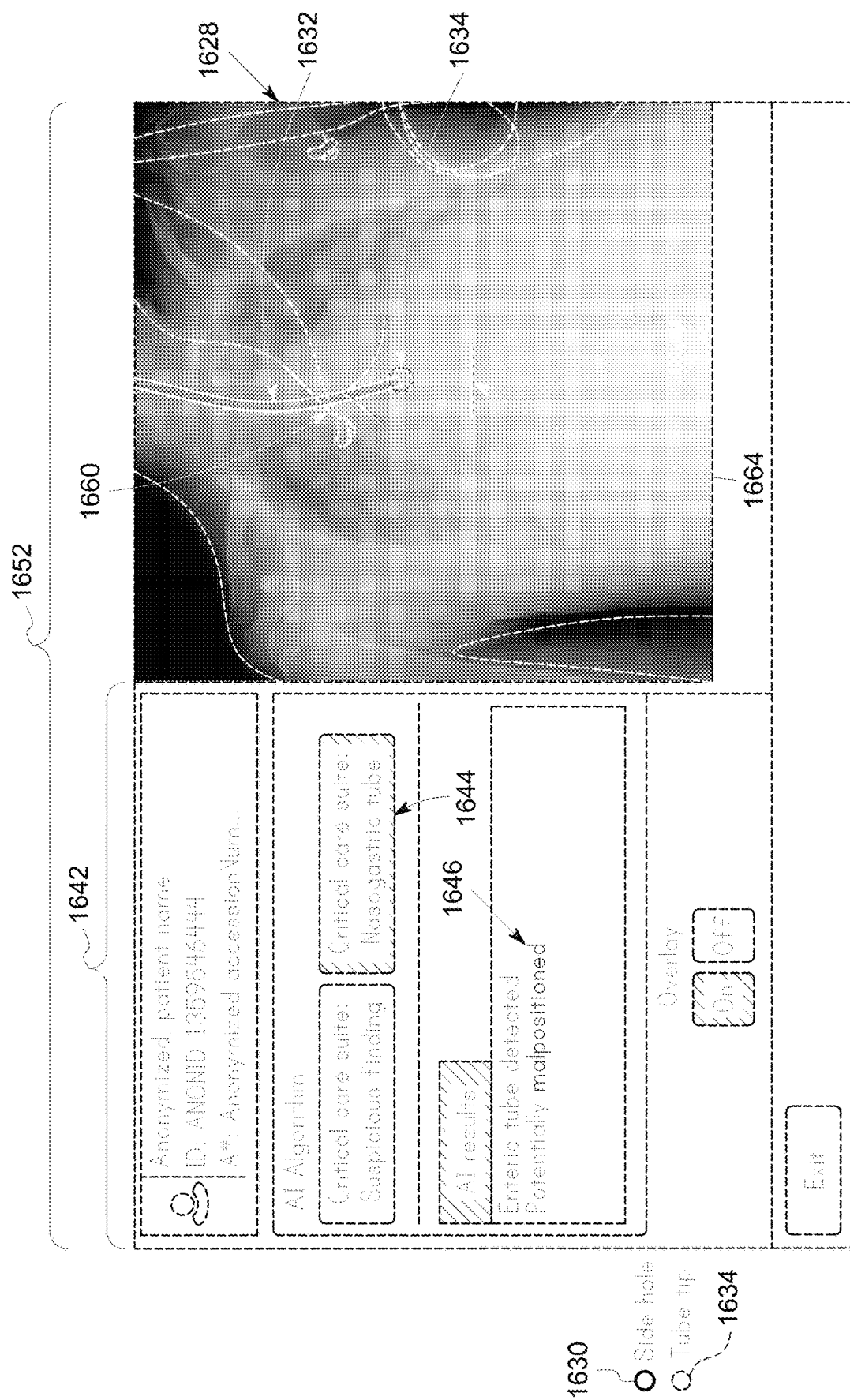
Figure 35:
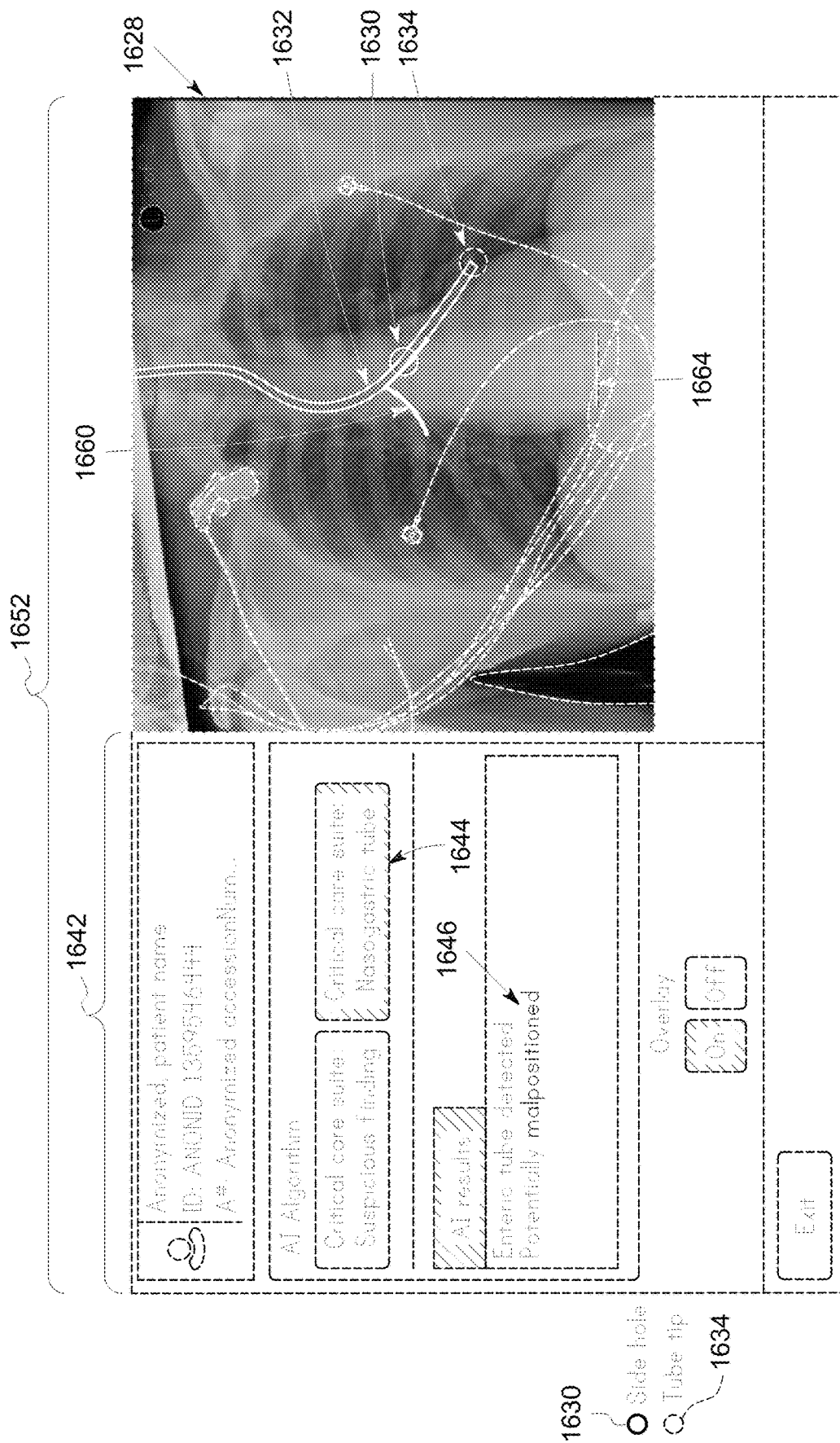
Figure 36:
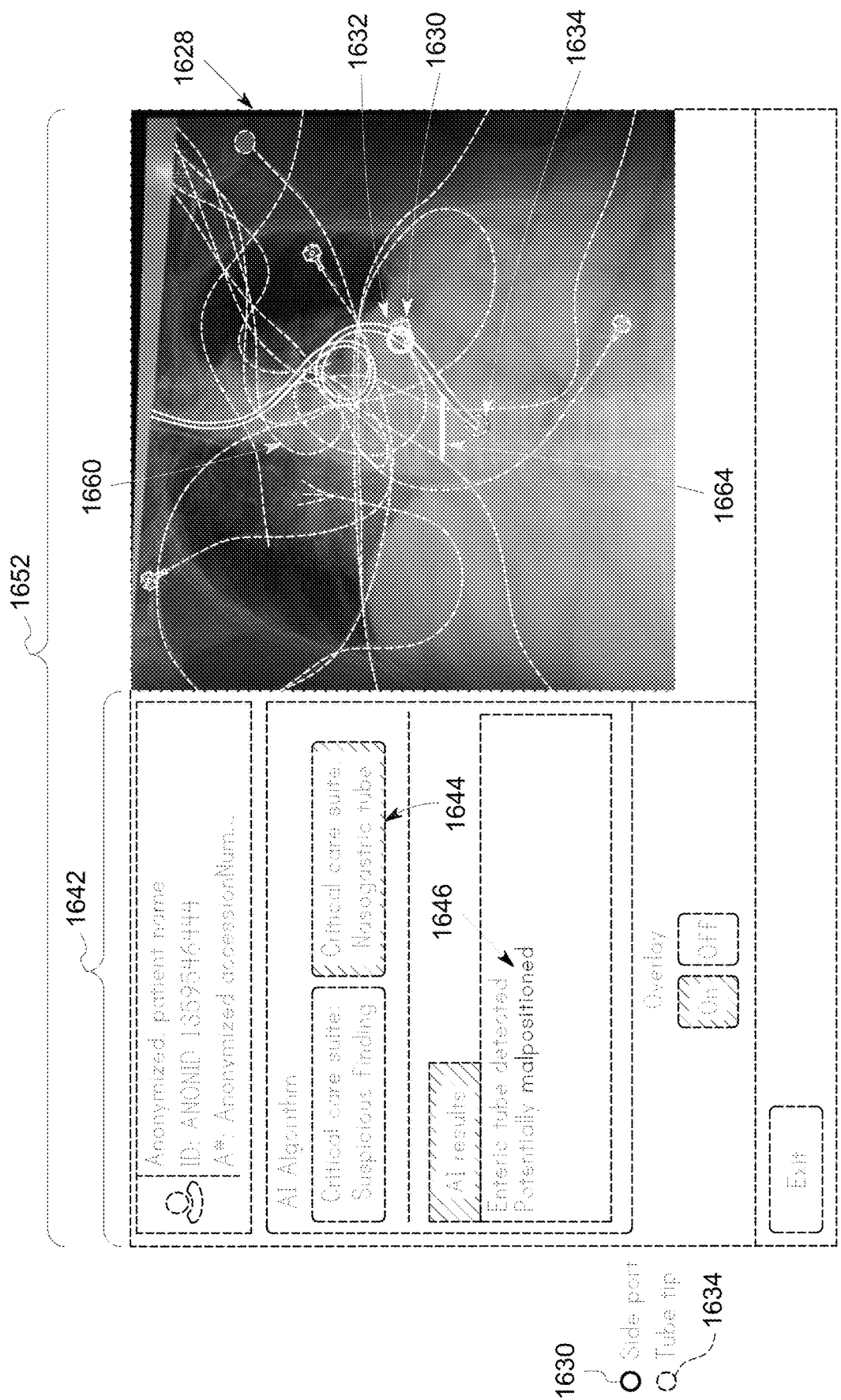
Figure 37:
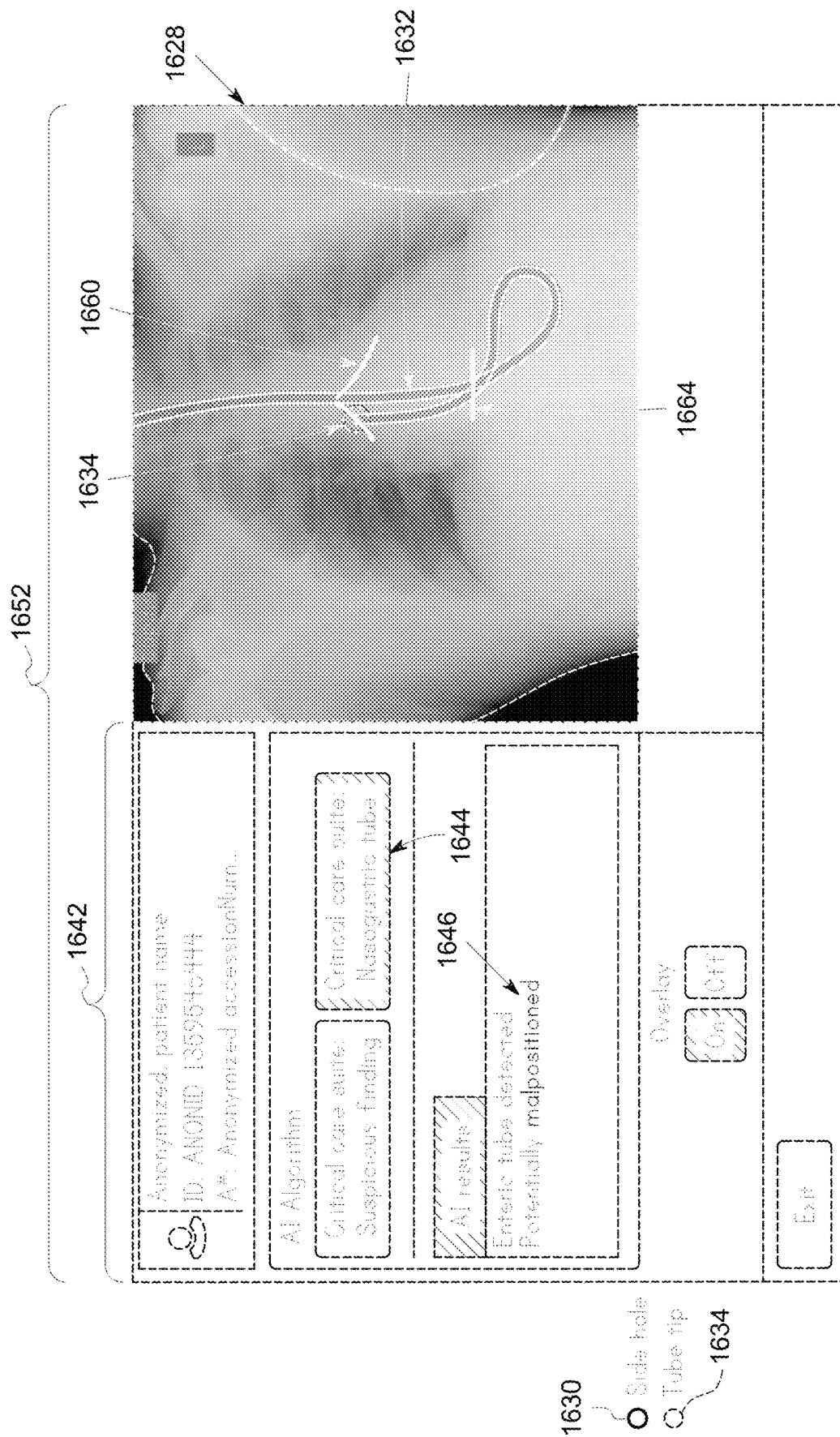
Figure 38:
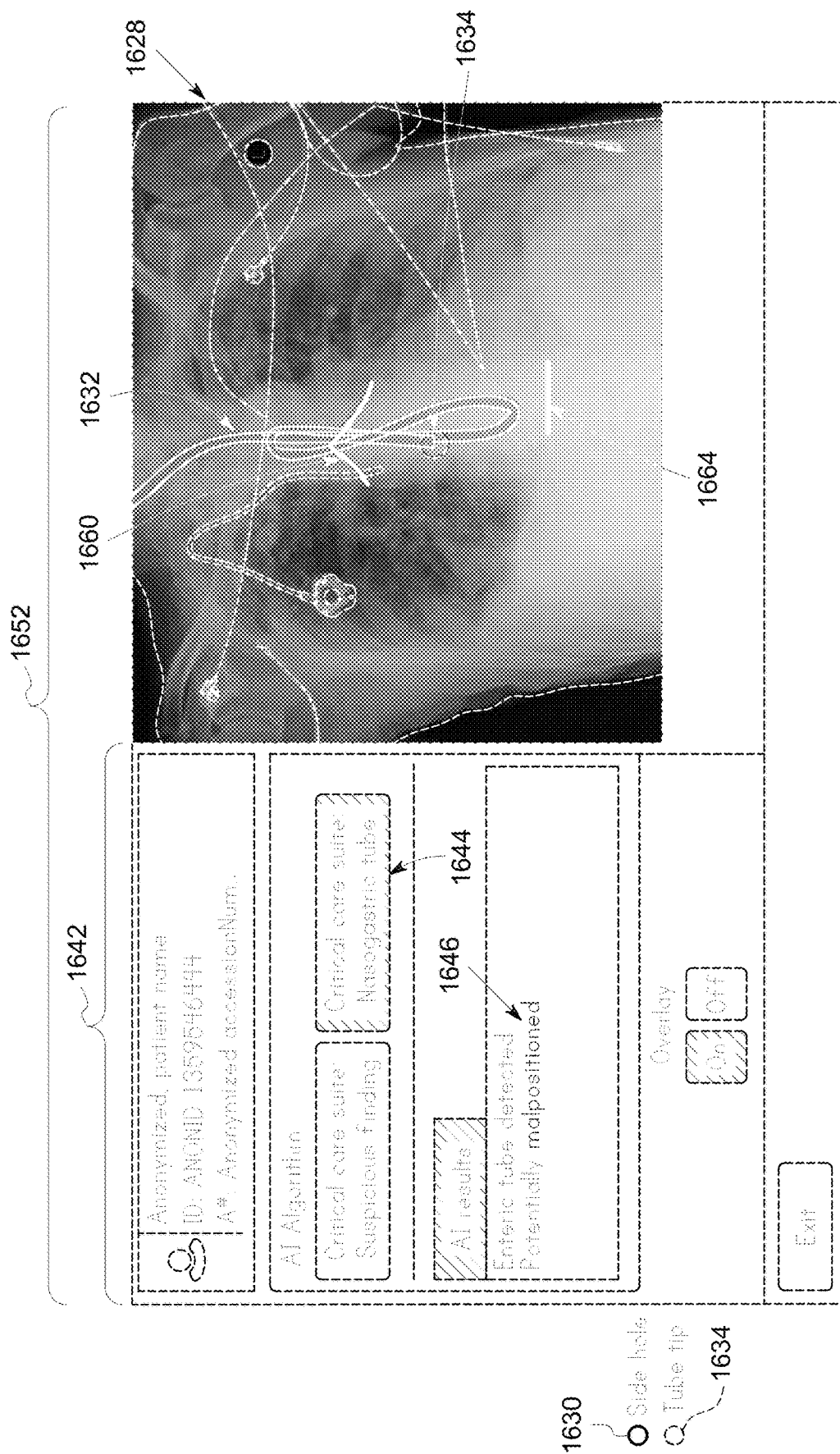

While the preceding examples illustrate expected or acceptable placements, the following examples illustrate malpositioned, borderline, or indeterminate tube placements. Turning to FIG. 31, an example is displayed of results and visualization provided for a malpositioned tube placement in which the side port is high (e.g., positioned above the diaphragm). To facilitate communication of the problematic aspect of the tube placement, one or both of the graphical marker 1630 corresponding to the side port and/or the graphical marker (e.g., dashed line) 1664 corresponding to the diaphragm may be color-coded (e.g., yellow or red). Similarly the text 1646 in the information block 1642 indicating whether the placement of the tube is proper or not may indicate that the tube is malpositioned. This text may also be color-coded (e.g., yellow or red) to indicate a problematic placement. Similarly, FIG. 32 depicts an example of results and visualization for a malpositioned tube placement where no side port is present and with a short placement with respect to the tip extending beyond the diaphragm. FIG. 33 depicts an example of results and visualization for a malpositioned tube placement where the tube tip is positioned above the carina. FIG. 34 depicts an example of results and visualization for a malpositioned tube placement where the tube 1632 is positioned within the esophagus. FIG. 35 depicts an example of results and visualization for a malpositioned tube placement where the tube 1632 is positioned within airways. FIG. 36 depicts an example of results and visualization for a malpositioned tube placement where the tube 1632 is positioned within the pleural cavity. FIG. 37 depicts an example of results and visualization for a malpositioned tube placement where the tube 1632 is positioned so as to return and re-ascend the esophagus. FIG. 38 depicts an example of results and visualization for a malpositioned tube placement where the tube 1632 is positioned so as to loop above the diaphragm.

Figure 39:
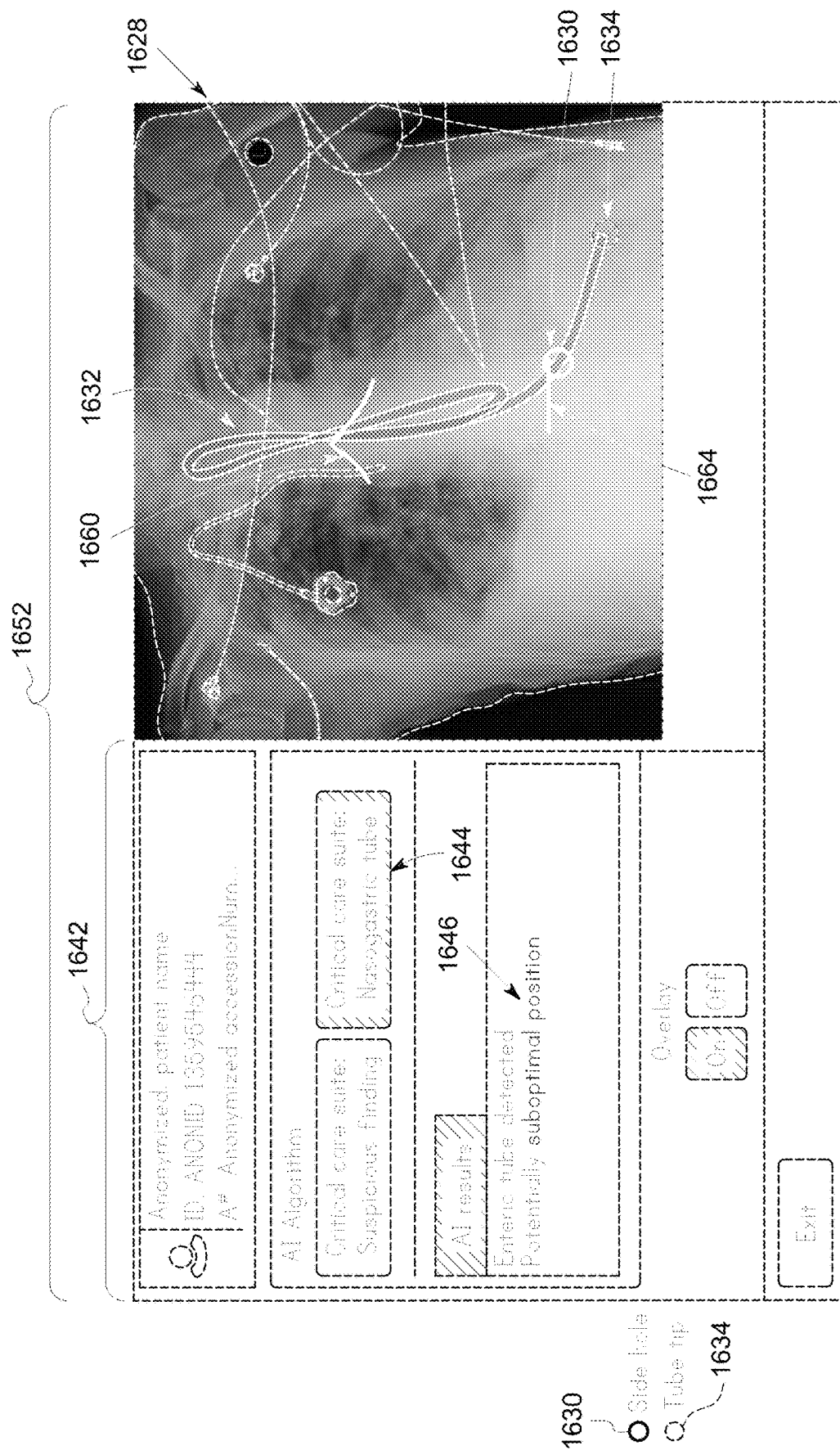
FIGS. 39-41 depict further schematic diagrams of a user interface having a combined image identifying a tube or line within a patient in a context where the tube is in a suboptimal position.
Figure 40:
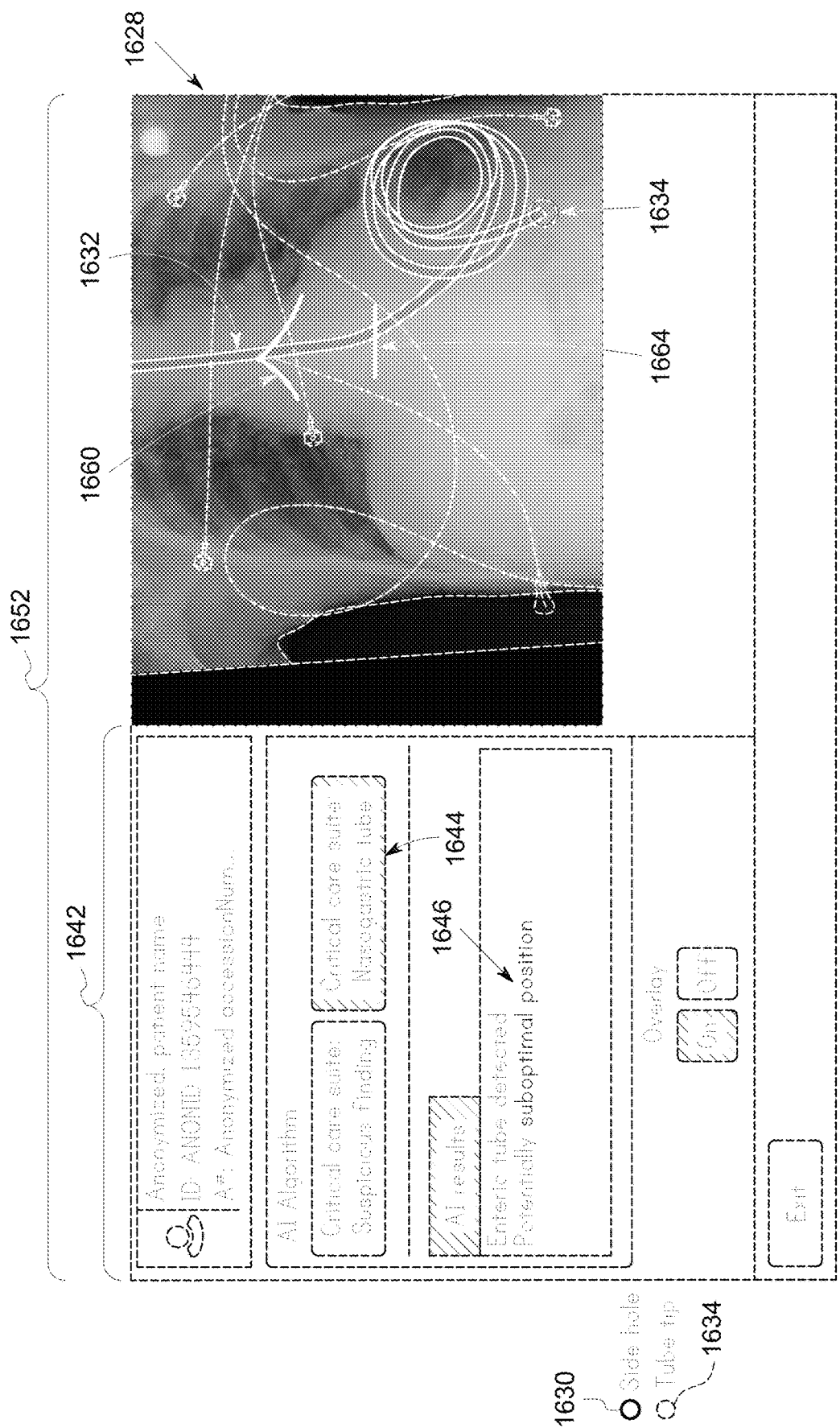
Figure 41:
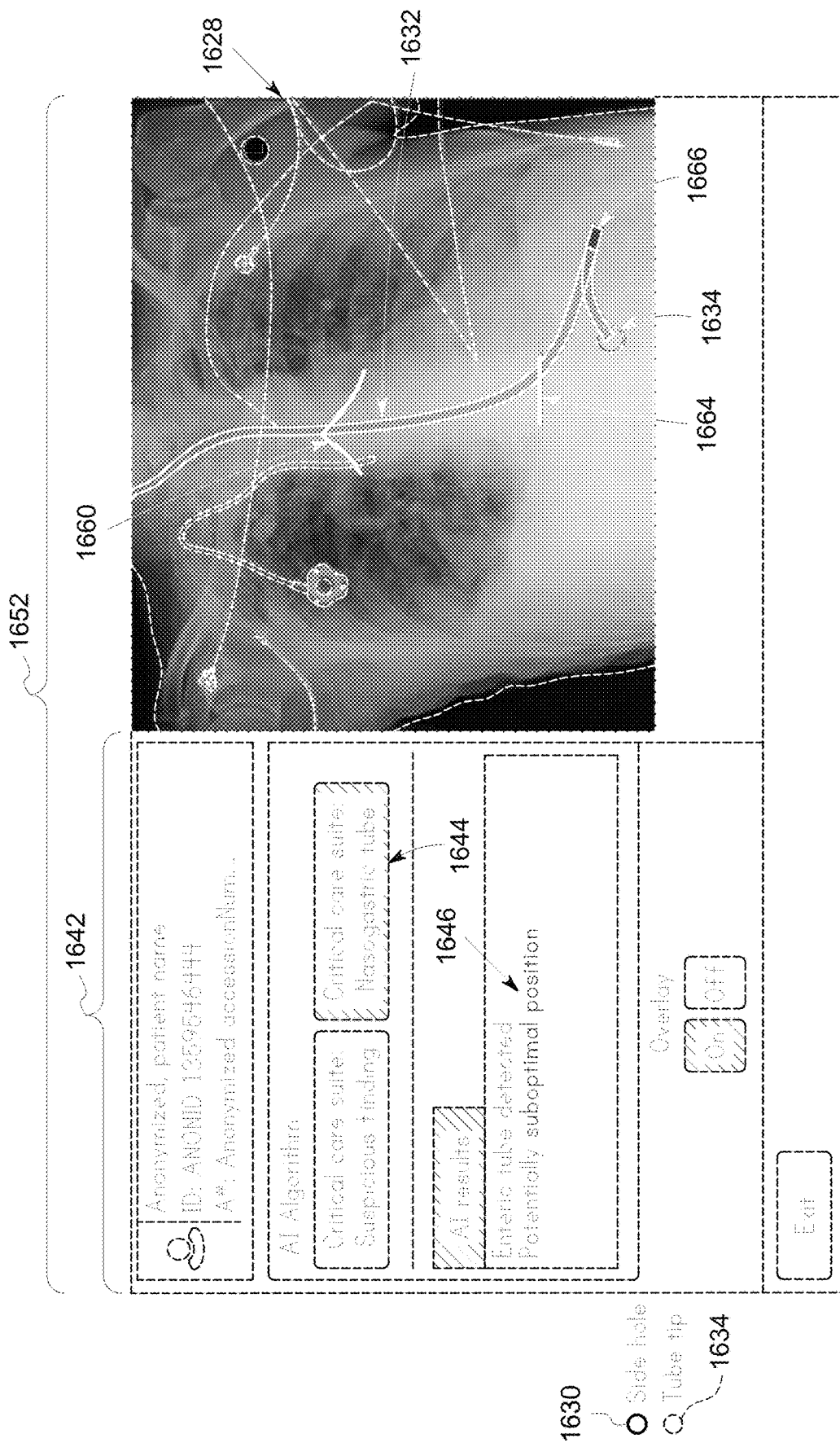

In the following examples, a suboptimal tube placement is illustrated in the context of the AI outputs and provided visualizations. Turning to FIG. 39, an example is displayed of results and visualization provided for one such suboptimal position in which a tube segment above the diaphragm loops, but the side port and tip placement is below the diaphragm. Similarly, FIG. 40 depicts an example of results and visualization for a suboptimal tube placement where a tube segment loops below the diaphragm and the overall tube placement is too deep. FIG. 41 depicts an example of results and visualization for a suboptimal tube placement where a tube segment loops is kinked below the diaphragm. To facilitate communication of the problematic aspect of the tube placement, the problematic segment 1666 of the tube 1632 may be color-coded (e.g., yellow or red).

Figure 42:
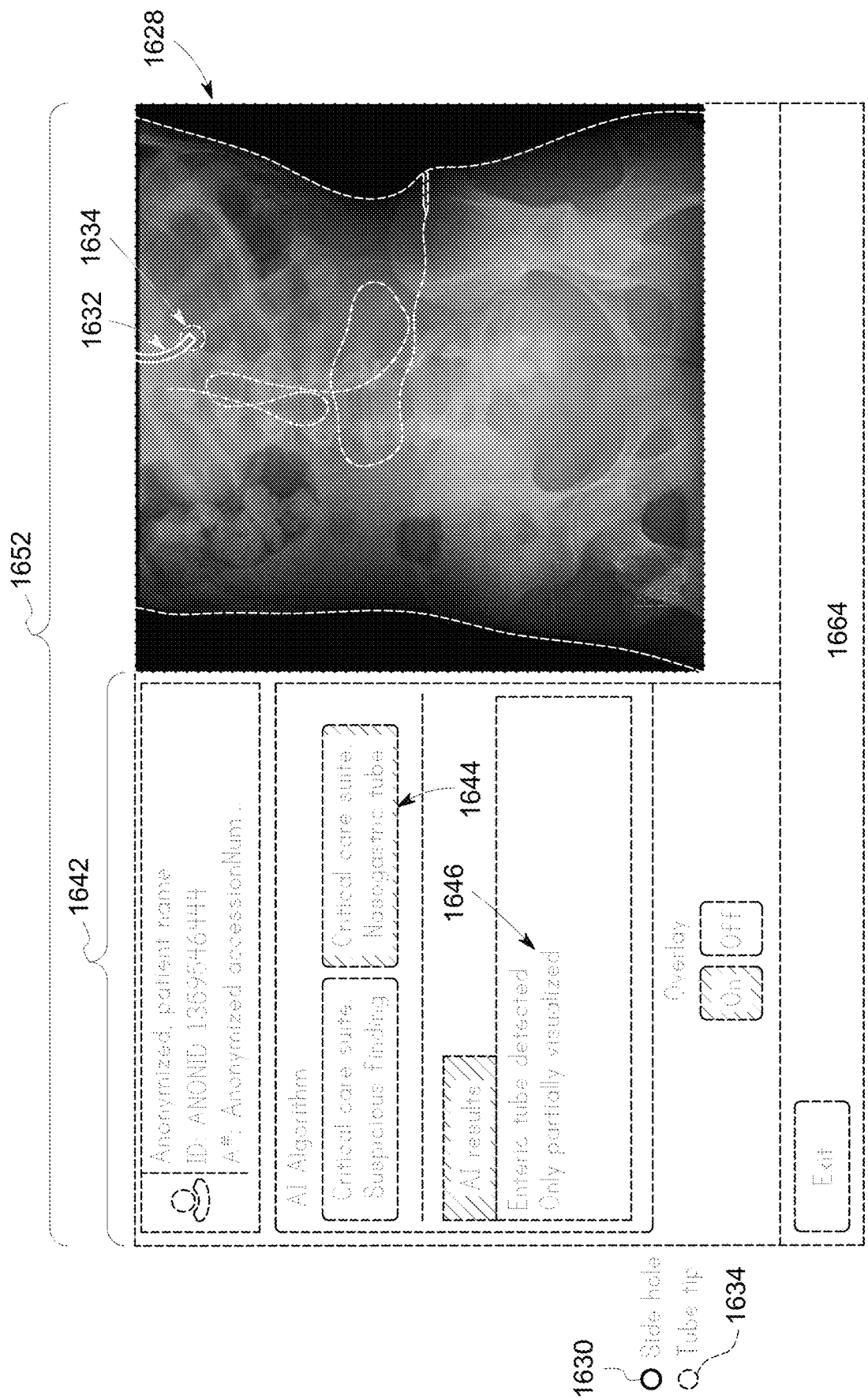
FIGS. 42-44 depict further schematic diagrams of a user interface having a combined image identifying a tube or line within a patient in a context where the tube is partially visualized.
Figure 43:
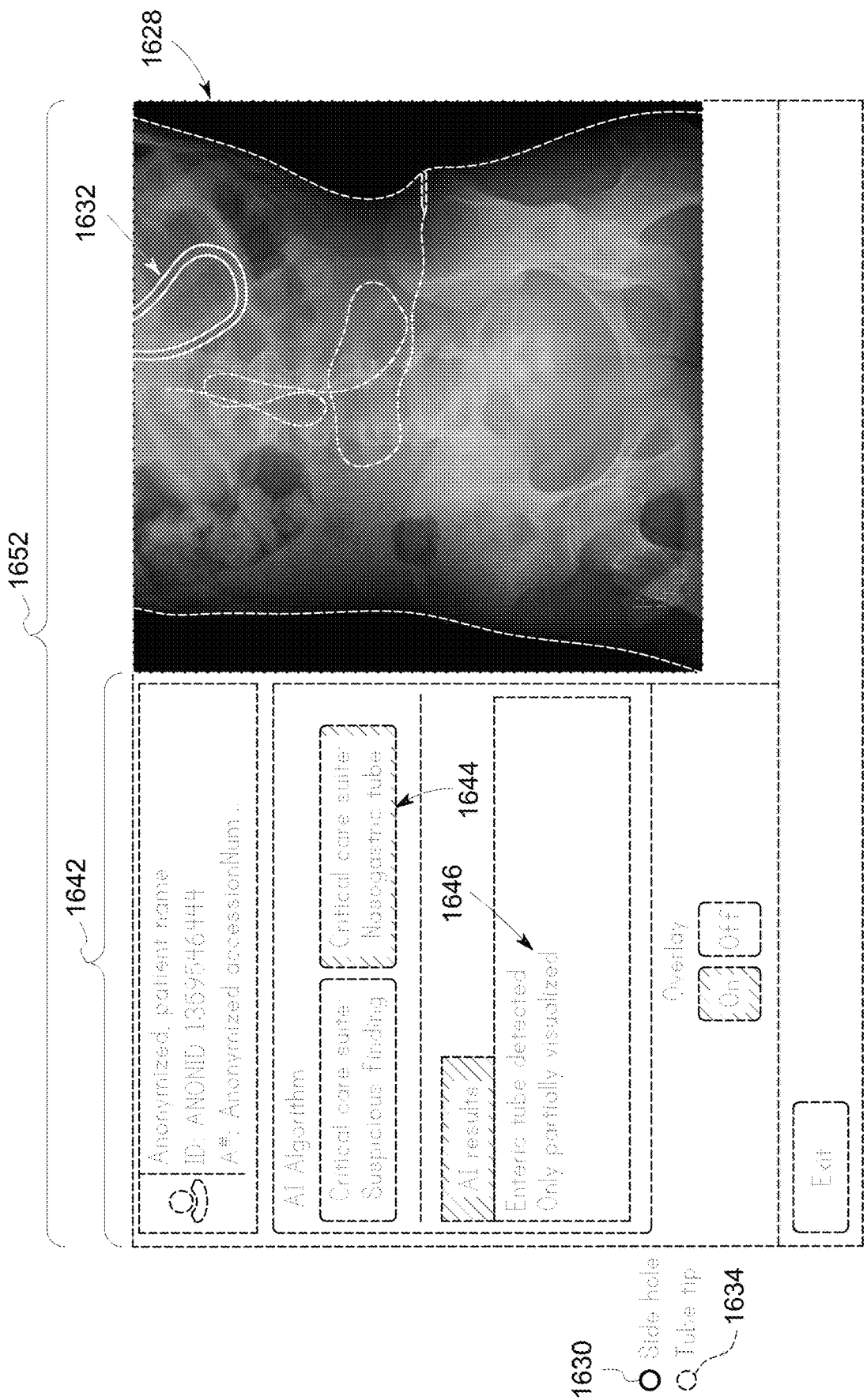
Figure 44:
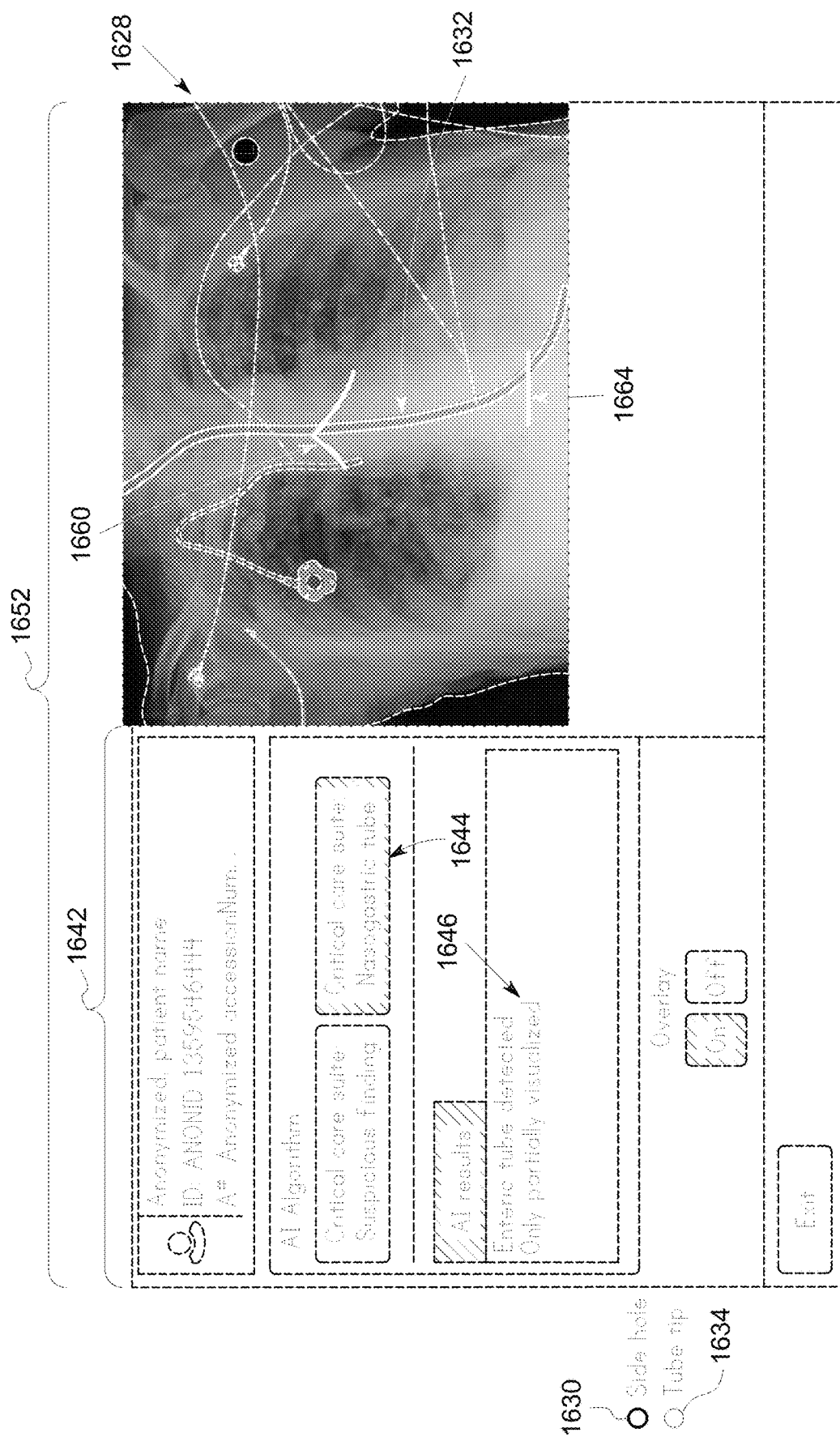

In the following examples, the tube is only partially visualized in the image data. Turning to FIG. 42, an example is displayed of results and visualization provided for one such partially visualized tube in which the tube tip is below the diaphragm but for a limited or short length. FIG. 43 depicts an example of results and visualization for a partially visualized tube where tube ascends back up from below the diaphragm to terminate out of the image. FIG. 44 depicts an example of results and visualization for a partially visualized tube where tube extends beyond the image frame.

Figure 45:
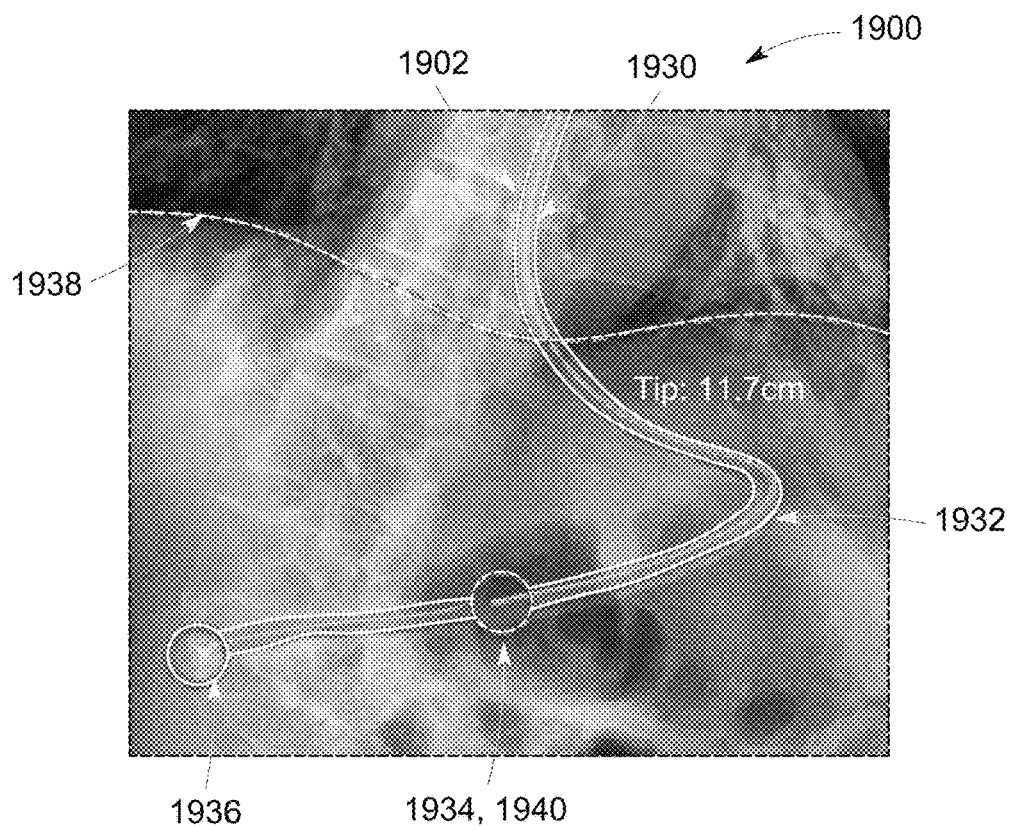
FIGS. 45-48 are examples of combined images including graphical markers to identify features of a tube or line and a reference or anatomical landmark within a region of interest.
Figure 46:
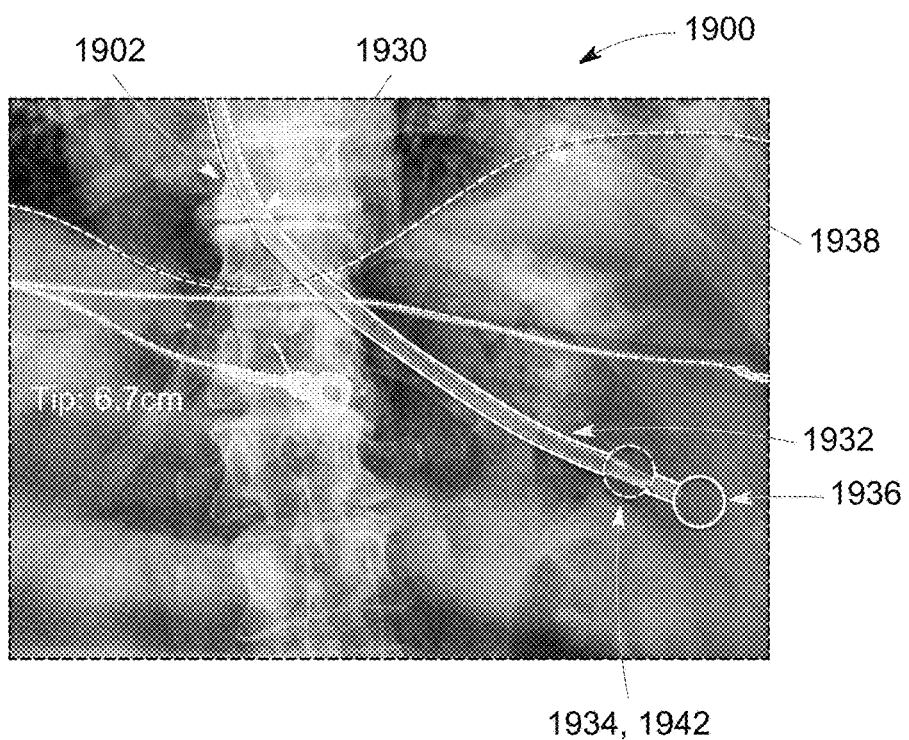
Figure 47:
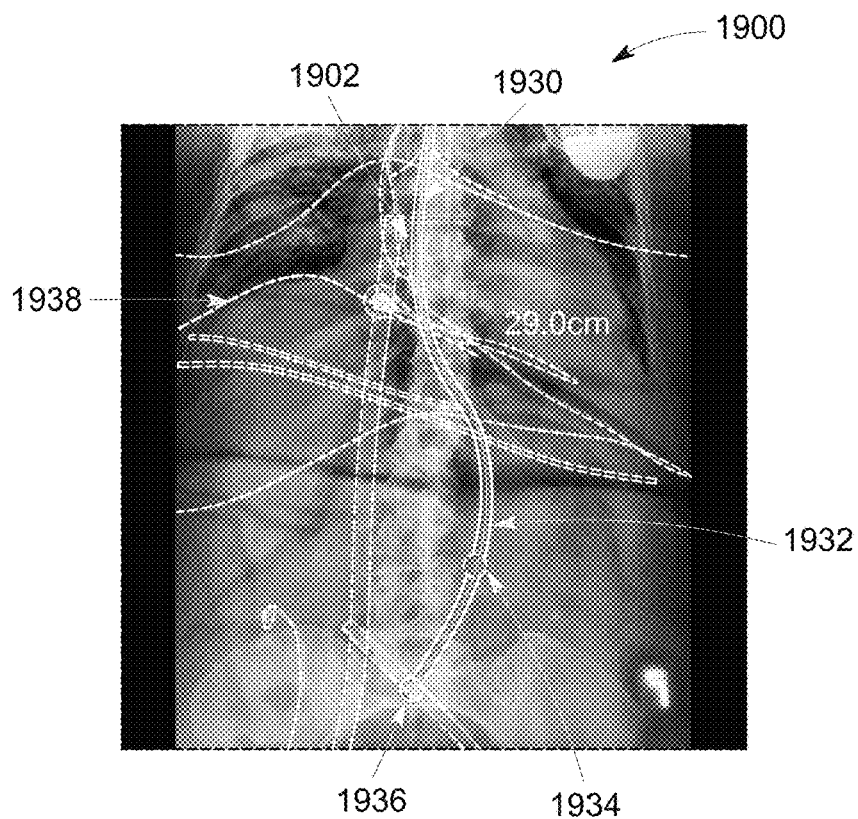
Figure 48:
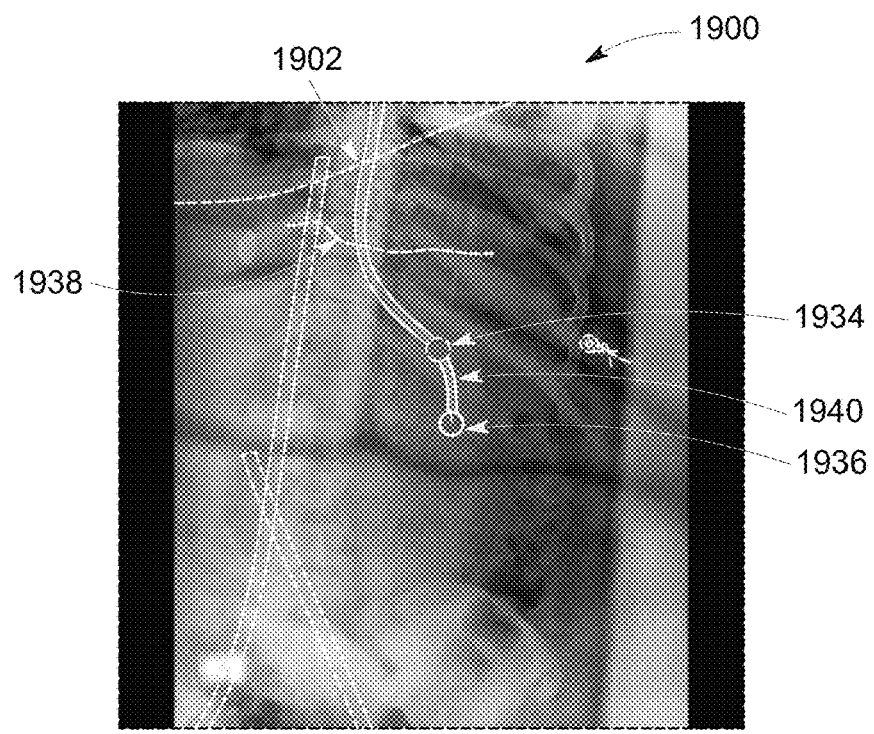

As discussed herein, indication of proper tube placement and/or positional deviation of the tube may be provided via one or more of the graphical markers in the combined image. In particular, one or more features of the tube, such as an end and/or tip, one or more ports (e.g., side port(s), end port(s)), surface(s), particular portions, and/or borders of the tube, and/or features of a reference or anatomical landmark may be overlaid with the one or more graphical markers to enhance visual contrast of these features. By way of example, and turning to FIGS. 45-48, examples are displayed of visualization of the one or more features of the tube 1902 and/or references or anatomical landmarks in the combined image 1900. In particular, FIGS. 45-47 depict examples of visualization of a proximal portion 1930 of the tube, a distal portion 1932 of the tube, one or more ports 1934 (e.g., side port, end port) of the tube 1902, an end or tip 1936 of the tube 1902, and a diaphragm edge 1938. In particular, in FIGS. 45-47 the proximal portion 1930 of the tube 1902 located above the diaphragm is highlighted in a first color, illustrated as a line with no shading, whereas the distal portion 1932 of the tube 1902 located below the diaphragm is highlighted in a second color, illustrated as a shaded line, different than the first color. Additionally, the one or more ports 1934 of the tube 1902, such as the depicted side port 1940 of FIG. 45 and the depicted end port 1942 of FIG. 46 are overlaid by a dashed outline of a circle, where the side port and the end port may be visible within the dashed outline of the respective circle. Further, as depicted in FIGS. 45-48, the end and/or tip 1936 of the tube 1902 may be overlaid with a solid outline of a circle, where the end and/or tip 1936 may be visible within the solid outline of the respective circle. FIG. 48 depicts an example of a portion 1940 of the tube 1902 extending between the one or more ports 1934 and the end and/or tip 1936 of the tube 1902 (e.g., a portion of the tube 1902 beyond the side port) as highlighted (e.g., color-coded) in a different color, illustrated as a shaded line, than a remaining portion (e.g., proximal portion) of the tube 1902, illustrated as a line with no shading. The features may be highlighted and/or color-coded (e.g., via the graphical markers) to provide contrast and improved visualization of relevant features of the tube and/or the reference or anatomical landmark in the combined image 1900.

Figure 49:
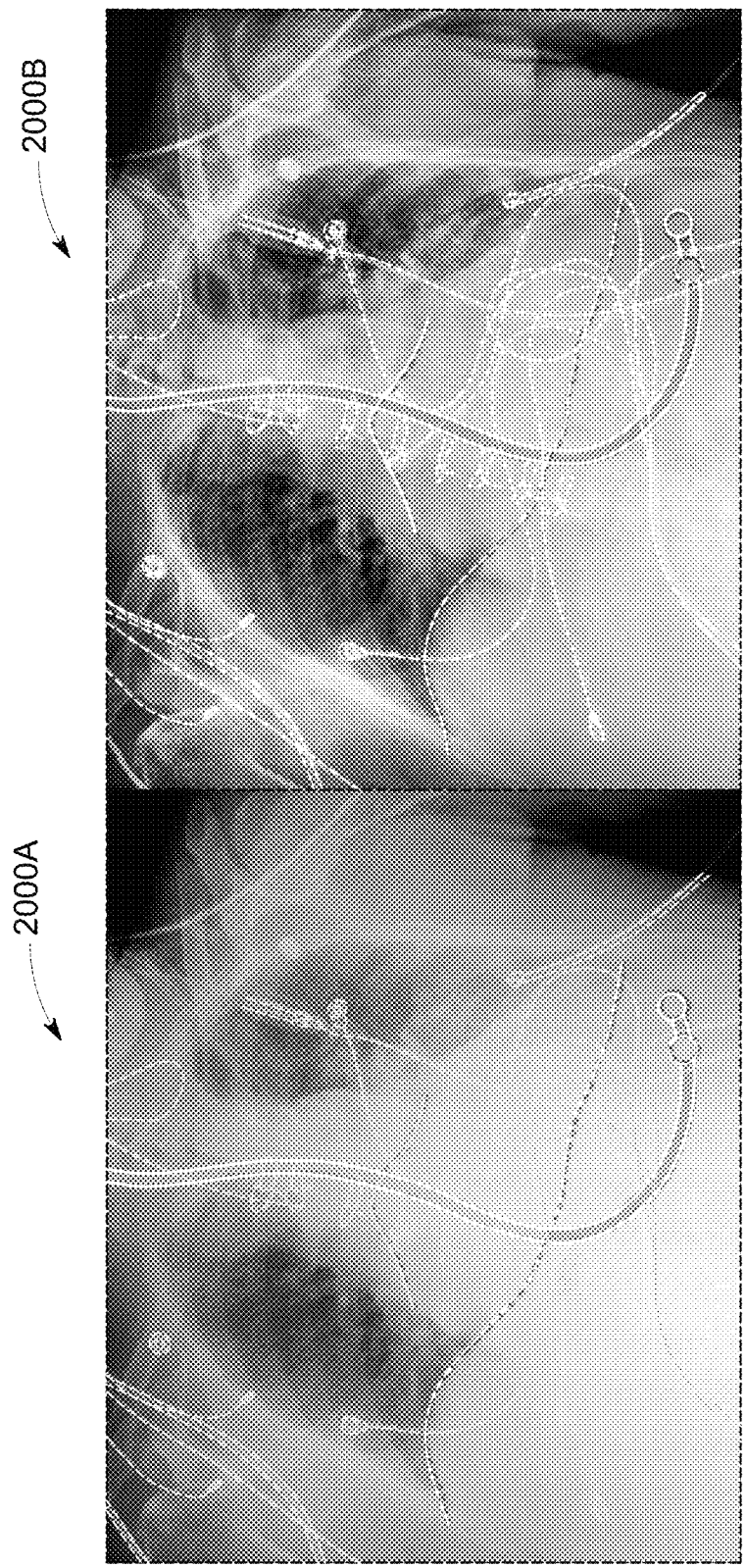
FIG. 49 is an example of a combined image with enhanced local contrast.

Furthermore, as discussed herein, the contrast of the image of the region of interest (e.g., the current images, the one or more previously stored images, the received image) may be adjusted (e.g., increased) to enhance visibility of the one or more features of the tube and/or features of the region of interest including features of the reference or anatomical landmark and/or one or more addition medically placed tubes or lines. By way of providing an example, FIG. 49 depicts an original combined image 2000A of a region of interest and an enhanced combined image 2000B in which the contrast of the combined image (e.g., the background image, the features of the region of interest) has been increased to enable increased visibility of the features of the image, such as a detected tube or line, a previously placed tube or line, and/or a reference or anatomical landmarks. The original combined image may undergo image processing, such as Contrast Limited Adaptive Histogram Equalization (CLAHE), unsharp masking, or another contrast or line enhancement techniques, to increase (e.g., change, adjust) local contrast and enhance visibility of the tube or line. Enhancing the contrast of the image and/or overlaid graphical markers may aid in verifying the detection and identification of the features of the tube or line and/or the references or anatomical landmarks and/or characterization of the placement of the tube or line by the AI-based feature and techniques described herein.

Figure 50:
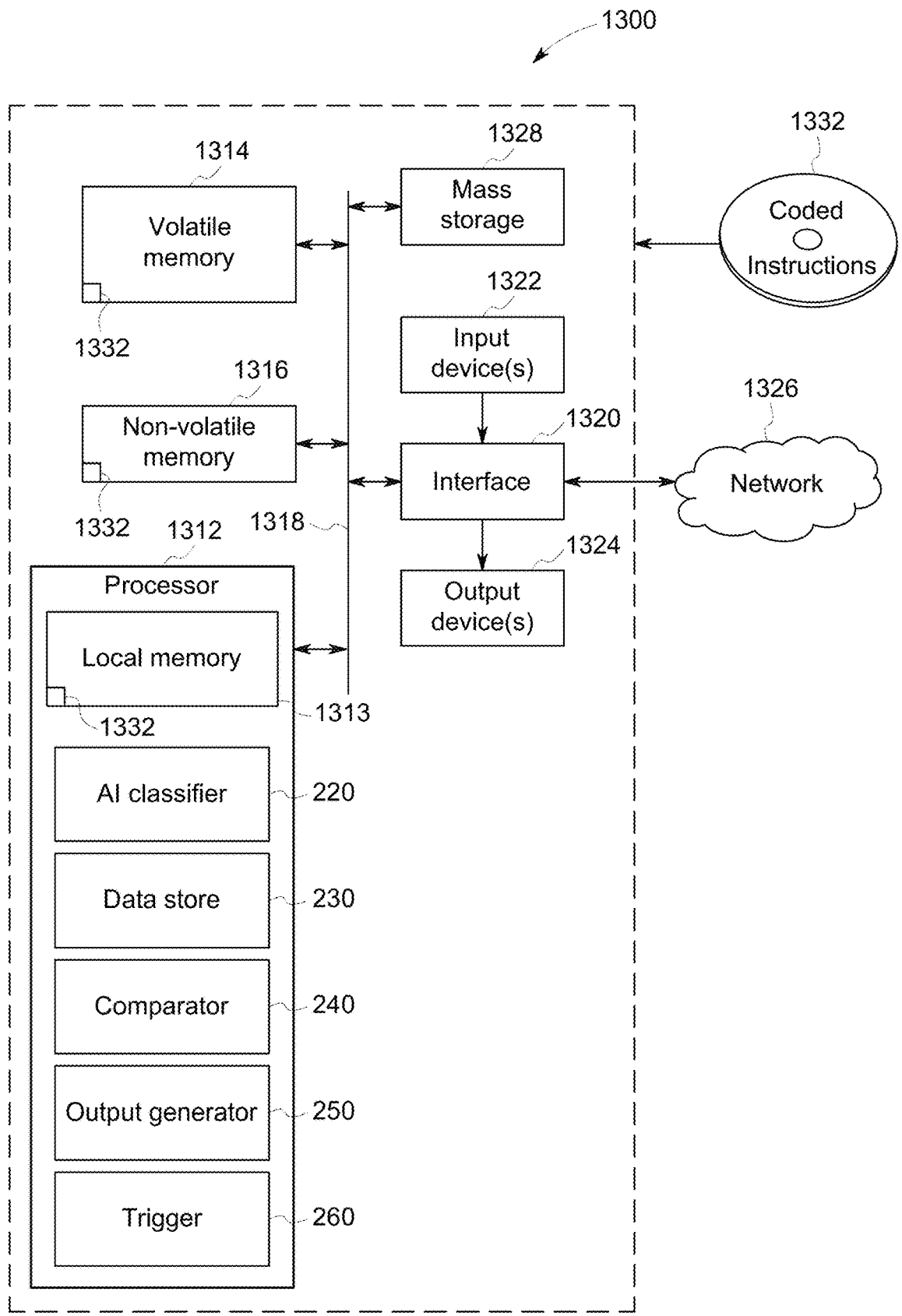
FIG. 50 is a schematic diagram of an embodiment of a processor platform structured to execute the example machine readable instructions to implement components disclosed and described herein.

FIG. 50 is a block diagram of an example processor platform 1300 structured to executing the processor-executable instructions to implement the example components disclosed and described herein. The processor platform 1300 can be, for example, a server, a personal computer, a mobile device (e.g., a cell phone, a smart phone, a tablet such as an iPad™), a personal digital assistant (PDA), an Internet appliance, or any other type of computing device.

The processor platform 1300 of the illustrated example includes a processor 1312. The processor 1312 of the illustrated example is hardware. For example, the processor 1312 can be implemented by integrated circuits, logic circuits, microprocessors or controllers from any desired family or manufacturer.

The processor 1312 of the illustrated example includes a local memory 1313 (e.g., a cache). The example processor 1312 of FIG. 50 executes processor-executable instructions to implement the systems, infrastructure, displays, and associated methods of FIGS. 1-16 such as the example data source 210, AI classifier 220, data store 230, comparator 240, output generator 250, trigger 260, etc. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a clock controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, a sensor, a microphone, a camera (still or video, RGB or depth, etc.), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

Coded instructions may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods, apparatus, and articles of manufacture have been disclosed to monitor, process, and improve operation of imaging and/or other healthcare systems using a plurality of deep learning and/or other machine learning techniques.

Thus, certain examples facilitate image acquisition and analysis at the point of care such as via an imaging device at the point of patient imaging. If images should be re-taken, further analysis done right away, and/or other criticality explored sooner, rather than later, the example systems, apparatus, and methods disclosed and described herein can facilitate such action to automate analysis, streamline workflow, and improve patient care.

Certain examples provide a specially-configured imaging apparatus that can acquire images and operate as a decision support tool at the point of care for a critical care team. Certain examples provide an imaging apparatus that functions as a medical device to provide and/or facilitate diagnosis at the point of care to detect radiological findings, etc. The apparatus can trigger a critical alert for a radiologist and/or critical care team to bring immediate attention to the patient.

In certain examples, a mobile device and/or cloud product enables a vendor-neutral solution, proving point of care alerts on any digital x-ray system (e.g., fully integrated, upgrade kit, etc.). In certain examples, embedded AI algorithms executing on a mobile imaging system, such as a mobile x-ray machine, etc., provide point of care alerts during and/or in real-time following image acquisition, etc.

By hosting AI on the imaging device, a mobile x-ray system can be used in rural regions without hospital information technology networks, or even on a mobile truck that brings imaging to patient communities, for example. Additionally, if there is long latency to send an image to a server or cloud, AI on the imaging device can instead be executed and generate output back to the imaging device for further action. Rather than having the x-ray technologist moved onto the next patient and the x-ray device no longer at the patient's bedside with the clinical care team, image processing, analysis, and output can occur in real time (or substantially real time given some data transfer/retrieval, processing, and output latency) to provide a relevant notification to the clinical care team while they and the equipment are still with or near the patient. For trauma cases, for example, treatment decisions need to be made fast, and certain examples alleviate the delay found with other clinical decision support tools.

Mobile X-ray systems travel throughout the hospital to the patient bedside (e.g., emergency room, operating room, intensive care unit, etc. Within a hospital, network communication may be unreliable in "dead" zones of the hospital (e.g., basement, rooms with electrical signal interference or blockage, etc.). If the X-ray device relies on building Wi-Fi, for example, to push the image to a server or cloud which is hosting the AI model and then wait to receive the AI output back to the X-ray device, then patient is at risk of not having reliability in critical alerts when needed. Further, if a network or power outage impacts communications, the AI operating on the imaging device can continue to function as a self-contained, mobile processing unit.

Examples of alerts generated for general radiology can include critical alerts (e.g., for mobile x-ray, etc.) such as tubes and line placement, pleural effusion, lobar collapse, pneumoperitoneum, pneumonia, etc.; screening alerts (e.g., for fixed x-ray, etc.) such as tuberculosis, lung nodules, etc.; quality alerts (e.g., for mobile and/or fixed x-ray, etc.) such as patient positioning, clipped anatomy, inadequate technique, image artifacts, etc.

Thus, certain examples improve accuracy of an artificial intelligence algorithm. Certain examples factor in patient medical information as well as image data to more accurately predict presence of a critical finding, an urgent finding, and/or other issue.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

Technical effects of the disclosed subject matter include providing systems and methods that utilize AI (e.g., deep learning networks) to determine whether or not a medically placed tube or line is properly placed within a region of interest (e.g., relative to a reference or anatomical landmark). The systems and methods may provide feedback in real time that in a more accurate and quicker manner determine if a medically placed tube or line is misplaced. Thus, enabling fast intervention, if needed, to move the tube or line to the appropriate location for patient safety.

This written description uses examples to disclose the subject matter, including the best mode, and also to enable any person skilled in the art to practice the subject matter, including making and using any devices or systems and performing any incorporated methods. The patentable scope of the disclosed subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A medical image processing system, comprising:
   a display;
   a processor; and
   a memory storing processor-executable code that when executed by the processor causes acts to be performed comprising:
      receiving a first image of a patient with an enteric tube or line disposed within a region of interest;
      receiving a second image of the patient with the enteric tube or line disposed within the region of interest, wherein the second image is taken at a different time than the first image;
      receiving first positional information associated with the enteric tube or line within the first image and second positional information associated with the enteric tube or line within the second image;
      comparing the first positional information to the second positional information;
      determining a positional change of the enteric tube or line based on the comparison of the first positional information to the second positional information;
      generating a combined image by combining the first image and the second image, wherein the combined image comprises one or more positional indications associated with the enteric tube or line in an anatomic context derived based at least in part on one or more anatomic reference landmarks within the first image, the second image, or both; and
      displaying the combined image comprising the enteric tube or line within the combined image and an indication of the positional change on the display.

2. The medical image processing system of claim 1, wherein the processor-executable code when executed by the processor causes acts to be performed comprising:
   detecting the enteric tube or line within the first image and the second image; and
   detecting one or more anatomic reference landmarks within the first image and the second image.

3. The medical image processing system of claim 2, wherein the processor-executable code when executed by the processor causes acts to be performed comprising: calculating one or more measured distances of the enteric tube or line relative to a respective anatomic reference landmark, and wherein the first positional information, the second positional information, or both comprise the one or more measured distances.

4. The medical image processing system of claim 2, wherein the processor-executable code when executed by the processor causes acts to be performed comprising: determining whether the enteric tube or line is properly placed relative to a respective anatomic reference landmark.

5. The medical image processing system of claim 4, wherein the processor-executable code when executed by the processor causes acts to be performed comprising: displaying an indication with the combined image when the enteric tube or line is misplaced relative to the respective anatomic reference landmark.

6. The medical image processing system of claim 2, wherein the one or more anatomic reference landmarks comprise a carina, a diaphragm, an airway, a stomach, lungs, a midline, or an edge of an airway.

7. The medical image processing system of claim 2, wherein detecting the enteric tube or line within the image or images comprises utilizing one or more deep learning network models to detect the enteric tube or line within the first image, the second image, or both.

8. The medical image processing system of claim 2, wherein generating the combined image comprises superimposing a graphical overlay over the enteric tube or line, the one or more anatomic reference landmarks, or both to facilitate visualization of the enteric tube or line with in the region of interest.

9. The medical image processing system of claim 8, wherein the graphical overlay comprises one or more graphical markers indicating one or more features of the enteric tube or line, the one or more anatomic reference landmarks, proper or improper placement of the enteric tube or line, one or more measured distances of the enteric tube or line relative to the one or more anatomic reference landmarks, or any combination thereof.

10. The medical image processing system of claim 9, wherein the one or more features of the enteric tube or line comprises a tip of the enteric tube or line, one or more ports, or both.

11. The medical image processing system of claim 1, wherein the enteric tube or line comprises a nasogastric tube, a nasoduodenal tube, a nasojejunal tube, an orogastric tube, an oroduodenal tube, or an orojejunal tube.

12. A method for medical image processing, comprising:
receiving, via a processor, a first image of a patient with an enteric tube or line disposed within a region of interest;
receiving, via the processor, a second image of the patient with the enteric tube or line disposed within the region of interest, wherein the second image is taken at a different time than the first image;
receiving, via the processor, first positional information associated with the enteric tube or line within the first image and second positional information associated with the enteric tube or line within the second image;
comparing, via the processor, the first positional information to the second positional information;
determining, via the processor, a positional change of the enteric tube or line based on the comparison of the first positional information to the second positional information;
generating, via the processor, a combined image by combining the first image and the second image, wherein the combined image comprises one or more positional indications associated with the enteric tube or line in an anatomic context derived based at least in part on one or more anatomic reference landmarks within the first image, the second image, or both; and
causing, via the processor, display of the combined image comprising the enteric tube or line within the combined image and an indication of the positional change on a display.

13. The method of claim 12, wherein a contrast of the first image, the second image, or both is changed, via the processor, using one or more image processing techniques.

14. The method of claim 12, comprising:
detecting, via the processor, the enteric tube or line within the first image and the second image; and
detecting, via the processor, one or more anatomic reference landmarks within the first image and the second image.

15. The method of claim 14, wherein generating the combined image comprises superimposing, via the processor, one or more graphical markers on the combined image, wherein the one or more graphical markers indicate one or more features of the enteric tube or line, the one or more anatomic reference landmarks, or both.

16. The method of claim 15, further comprising: calculating, via the processor, one or more measured distances of the enteric tube or line relative to a respective anatomic reference landmark, and wherein generating the combined image comprises superimposing one or more graphical indicators on the combined image that indicates the one or more measured distances, wherein the first positional information, the second positional information, or both comprises the one or more measured distances.

17. The method of claim 14, comprising determining, via the processor, whether the enteric tube or line is properly placed relative to a respective anatomic reference landmark.

18. The method of claim 14, wherein detecting the enteric tube or line within the image or images comprises utilizing, via the processor, one or more deep learning network models to detect the enteric tube or line within the image or images.

19. A medical image processing system, comprising:
a display;
a processor; and
a memory storing processor-executable code that when executed by the processor causes:
receiving a first image comprising a first perspective of a patient with at least a portion of an enteric tube or line disposed within the first image;
receiving a second image comprising a second perspective of the patient with at least a portion of the enteric tube or line disposed within the second image;
detecting one or more features of the enteric tube or line within the first image and the second image;
detecting one or more anatomic reference landmarks within the first image and the second image;
generating a combined image by combining the first image and the second image, wherein the combined image comprises one or more positional indications associated with the enteric tube or line in an anatomic context derived based at least in part on a detected position of the one or more features of the enteric tube or line relative to the one or more anatomic reference landmarks in the first perspective, the second perspective, or both; and
displaying the combined image comprising the enteric tube or line within the combined image on the display.

20. The medical image processing system of claim 19, wherein the processor-executable code when executed by the processor causes acts to be performed comprising:
calculating a first measured distance of a first detected enteric tube or line relative to a first detected anatomic reference landmark of the first image and a second measured distances of a second detected enteric tube or line relative to a second detected anatomic reference landmark of the second image, wherein the second detected anatomic reference landmark is associated with the first detected anatomic reference landmark, and
wherein generating the combined image comprises combining first measured distance and the second measured distance to produce a 3-Dimensional (3D) positional indication associated with the enteric tube or line.

\* \* \* \* \*